(12) United States Patent
Shaw et al.

(10) Patent No.: US 11,499,911 B2
(45) Date of Patent: Nov. 15, 2022

(54) SYSTEMS AND METHODS FOR DETECTING THERMODYNAMIC PHASE OF CLOUDS WITH OPTICAL POLARIZATION

(71) Applicant: MONTANA STATE UNIVERSITY, Bozeman, MT (US)

(72) Inventors: Joseph A. Shaw, Bozeman, MT (US); Laura M. Eshelman, Owens Cross Roads, AL (US)

(73) Assignee: MONTANA STATE UNIVERSITY, Bozeman, MT (US)

( * ) Notice: Subject to any disclaimer, the term of this patent is extended or adjusted under 35 U.S.C. 154(b) by 0 days.

(21) Appl. No.: 17/097,979

(22) Filed: Nov. 13, 2020

(65) Prior Publication Data
US 2021/0148811 A1  May 20, 2021

Related U.S. Application Data

(60) Provisional application No. 62/935,746, filed on Nov. 15, 2019.

(51) Int. Cl.
  *G01N 21/21* (2006.01)
  *G01J 4/04* (2006.01)
  (Continued)

(52) U.S. Cl.
  CPC ............. *G01N 21/21* (2013.01); *G01J 4/04* (2013.01); *G01N 21/538* (2013.01); *G06T 7/40* (2013.01);
  (Continued)

(58) Field of Classification Search
  CPC ...... G01N 21/21; G01N 21/211; G01N 21/47; G01N 21/4738; G01N 21/4795;
  (Continued)

(56) References Cited

U.S. PATENT DOCUMENTS

| | | | |
|---|---|---|---|
| 5,612,901 A * | 3/1997 | Gallegos | G06T 7/181 382/163 |
| 6,678,632 B1 * | 1/2004 | Iannarilli, Jr. | G01N 21/21 702/153 |

(Continued)

OTHER PUBLICATIONS

Dahl, L. M. et al., "Cloud Thermodynamic Phase Detection Using an All-Sky Imaging Polarimeter," Proc. SPIE 10407, Polarization Science and Remote Sensing VIII, 104070O (Aug. 30, 2017); doi: 10.1117/12.2274354 SPIE Optical Engineering + Applications Conference, 2017, San Diego, CA. Downloaded From: https://www.spiedigitallibrary.org/conference-proceedings-of-spie on Nov. 2, 2020.

(Continued)

*Primary Examiner* — Gordon J Stock, Jr.
(74) *Attorney, Agent, or Firm* — The Marbury Law Group PLLC

(57) ABSTRACT

A method and system for imaging thermodynamic phase of clouds includes obtaining a spatially-resolved polarimetric image of a region of the sky containing a cloud using a multipixel image sensor having multiple channels corresponding to different wavelength bands, determining a value of the Stokes $S_1$ polarization parameter of incident light on each pixel corresponding to a portion of the image containing the cloud for multiple channels corresponding to different wavelength bands, and determining the thermodynamic phase of the cloud within the image based on the values of the Stokes $S_1$ polarization parameter. The Stokes $S_1$ polarization parameter values determined for a first channel corresponding to a first wavelength band is used to determine a liquid thermodynamic phase, and the Stokes $S_1$ polarization parameter values determined for a second channel corresponding to a second, shorter wavelength band is used to determine an ice thermodynamic phase.

4 Claims, 47 Drawing Sheets

(51) Int. Cl.
  *G06T 7/40*      (2017.01)
  *G01N 21/53*     (2006.01)
  *G01N 15/00*     (2006.01)
  *G01J 4/00*      (2006.01)
  *G01N 21/47*     (2006.01)

(52) U.S. Cl.
  CPc ............ *G01J 2004/001* (2013.01); *G01N 2015/0026* (2013.01); *G01N 2015/0046* (2013.01); *G01N 2021/218* (2013.01); *G01N 2021/4792* (2013.01); *G06T 2207/30192* (2013.01)

(58) Field of Classification Search
  CPC ...... G01N 21/49; G01N 21/53; G01N 21/538; G01N 21/55; G01N 2015/0023; G01N 2015/0026; G01N 2015/0042; G01N 2015/0046; G01N 15/02; G01N 15/0205; G01N 15/0211; G01N 15/06; G01N 15/1434; G01N 2201/0697; G01N 2201/06113; G01N 2201/12; G01N 2021/1793; G01N 2021/1795; G01N 2021/216; G01N 2021/218; G01N 2021/4792; G01N 2021/4709; G01S 7/4865; G01S 7/4803; G01S 7/4815; G01S 7/499; G01S 17/95; B64D 15/20; B64D 47/04; G08B 19/02; G01W 1/00; G06V 20/13; G06T 2207/30192; G01J 2004/001; G01J 2004/002; G01J 2004/004; G01J 2004/005; G01J 2004/007; G01J 2004/008; G01J 4/00; G01J 4/01; G01J 4/02; G01J 4/04; G01J 3/447
  See application file for complete search history.

(56) References Cited

U.S. PATENT DOCUMENTS

| | | | | |
|---|---|---|---|---|
| 7,038,789 | B1 * | 5/2006 | Carrieri | G01J 3/2823 356/491 |
| 7,420,675 | B2 * | 9/2008 | Giakos | G01J 3/447 356/367 |
| 7,760,334 | B1 * | 7/2010 | Evans | G01S 7/4802 356/141.5 |
| 7,986,408 | B2 * | 7/2011 | Ray | B64D 15/20 356/342 |
| 8,144,325 | B2 * | 3/2012 | Ray | B64D 15/20 356/342 |
| 10,249,025 | B2 * | 4/2019 | Reinhardt | G01S 17/18 |
| 10,395,113 | B2 * | 8/2019 | Aycock | G01V 8/10 |
| 10,540,571 | B2 * | 1/2020 | Hoover | G02B 27/283 |
| 10,739,189 | B2 * | 8/2020 | Pacala | G01J 1/4204 |
| 2001/0048078 | A1 * | 12/2001 | Stair | G01N 21/21 250/221 |
| 2014/0336953 | A1 * | 11/2014 | Johnson | G01N 21/538 702/24 |
| 2020/0116836 | A1 * | 4/2020 | Pacala | G01J 3/2823 |

OTHER PUBLICATIONS

Eshelman, L. M. et al., "All-sky Polarization Imaging of Cloud Thermodynamic Phase," Optics Express, vol. 27, No. 3, pp. 3528-3541, (2019). doi.org/10.1364/OE.27.003528.

Knobelspiesse, K. et al., "Cloud Thermodynamic Phase Detection with Polarimetrically Sensitive Passive Sky Radiometers," Atmos. Meas. Tech., vol. 8, pp. 1537-1554, (2015) doi:10.5194/amt-8-1537-2015.

Eshelman, M.J. et al., Cloud thermodynamic phase detection using an all-sky imaging polarimeter, Appl. Optics (submitted 2018).

Tyo, S.J. et al., "Review of passive imaging polarimetry for remote sensing applications," Appl. Opt. 45, 5453-5469 (2006).

Tauc, M.J. et al., "Cloud thermodynamic phase detection with a 3-channel shortwave infrared polarimeter", Proc. SPIE 10655 Polarization: Measurement Analysis and Remote Sensing XIII, pp. 1065500 (2018).

Ma, T. et al., "An Evaluation of Skylight Polarization Patterns for Navigation," Sensors 15, 5895-5973 (2015).

Aycock, T. et al., "Passive optical sensing of atmospheric polarization for GPS denied operations," Proc. SPIE 9838, 98380Y (2016).

Zhao, H. et al., "Polarization patterns under different sky conditions and a navigation method based on the symmetry of the AOP map of skylight," Opt. Express 26, 28589-28603 (2018).

Pust, N.J. et al., "Dual-field imaging polarimeter using liquid crystal variable retarders," Appl. Opt. 45, 5470-5478 (2006).

Pust, N.J. et al., "Digital all-sky polarization imaging of partly cloudy skies," Appl. Opt. 47, H190-H198 (2008).

Dahlberg, A.R. et al., "Effects of surface reflectance on skylight polarization measurements at the Mauna Loa Observatory," Opt. Express 19, 16008-16021 (2011).

Pust, N.J. et al., "Wavelength dependence of the degree of polarization in cloud-free skies: simulations of real environments," Optics Express 20(14), 15559-15568 (2012).

Pust, N.J., "Comparison of full-sky polarization and radiance observations to radiative transfer simulations which employ AERONET products," Opt. Express 19, 18602-18613 (2011).

Shaw, J.A. et al., "Effects of wildfire smoke on atmospheric polarization," Proc. SPIE 9099, Polarization: Measurement, Analysis, and Remote Sensing XI, 909907 (2014).

Bates, D.R., "Rayleigh scattering by air," Planet. Space Sci. 32, 785-790 (1984).

Boesche, E. et al., "Effect of aerosol microphysical properties on polarization of skylight: sensitivity study and measurements," Appl. Opt. 45, 8790-8805 (2006).

Kreuter, A. et al., "Measuring the influence of aerosols and albedo on sky polarization," Atmospheric Research 98, 363-367, (2010).

Horváth, G. et al., "Ground-based full-sky imaging polarimetry of rapidly changing skies and its use for polarimetric cloud detection," Appl. Opt. 41, 543-559 (2002).

Lenoble, J. et al., "A successive order of scattering code for solving the vector equation of transfer in the earth's atmosphere with aerosols," Journal of Quantitative Spectroscopy and Radiative Transfer 107, 479-507 (2007).

Eshelman, L. M. et al., "The VIS-SWIR spectrum of skylight polarization," Appl. Opt. 57, 7974-7986 (2018).

Coulson, K. L., "Characteristics of skylight at the zenith during twilight as indicators of atmospheric turbidity, 1: Degree of polarization," Appl. Opt. 19(20), 3469-3480 (1980).

Pomozi, I. et al., "Fine structure of the celestial polarization pattern and its temporal change during the total solar eclipse of Aug. 11, 1999," Rem. Sens. Env. 76, 181-201 (2000).

Horváth, G. et al., "Neutral points of skylight polarization observed during the total eclipse on Aug. 11, 1999," Appl. Opt. 42(3), 465-475 (2003).

Sipocz, B. et al., "Spatiotemporal change of sky polarization during the total solar eclipse on Mar. 29, 2006 in Turkey: polarization patterns of the eclipsed sky observed by full-sky imaging polarimetry," Appl. Opt 47(34), H1-H10 (2008).

Ramanathan, V. et al., "Cloud-Radiative Forcing and Climate: Results from the Earth Radiation Budget Experiment," Science 243, 57 (1989).

Boucher, O et al., In Climate Change 2013: The Physical Science Basis. Contribution of Working Group I to the Fifth Assessment Report of the Intergovernmental Panel on Climate Change, Cambridge Univ. Press, (2013).

Rossow, W. B. et al., "Advances in Understanding Clouds from ISCCP," Bulletin of the American Meteorological Society 80, 2261-2287 (1999).

Deepak, A. et al., "Significance of higher-order multiple scattering for laser beam propagation through hazes, fogs, and clouds," Appl. Opt. 21(3), 439-447 (1982).

Jaruwatanadilok, S. et al., "Optical imaging through clouds and fog," IEEE Trans. Geosci. Rem. Sens. 41(8), 1834-1843 (2003).

(56) References Cited

OTHER PUBLICATIONS

Arnon, S. et al., "Adaptive optical transmitter and receiver for space communication through thin clouds," Appl. Opt. 36(9), 1987-1993 (1997).
Courvoisier, F. et al., "Ultraintense light filaments transmitted through clouds," Appl. Phys. Lett. 83(2), 213-215 (2003).
Arnon, S. et al., "Analysis of optical pulse distortion through clouds for satellite to earth adaptive optical communication," J. Modern Optics 41(8), 1591-1605 (1994).
Piazzolla, S. et al. "Statistics of link blockage due to cloud cover for free-space optical communications using NCDC surface weather observation data," Proc. SPIE 4635, 138-149 (2002).
Key, J. R. et al., "Cloud Particle Phase Determination with the AVHRR," J. Appl. Meteor. 39, 1797-1804 (2000).
Platnick, S. et al., "The MODIS cloud products: algorithms and examples from Terra," IEEE Transactions on Geoscience and Remote Sensing 41, 459-473 (2003).
Chiu, J.C. et al., "Cloud droplet size and liquid water path retrievals from zenith radiance measurements: examples from the Atmospheric Radiation Measurement Program and the Aerosol Robotic Network," Atmos. Chem. Phys. 12, 10313-10329 (2012).
Sassen, K., "The Polarization Lidar Technique for Cloud Research: A Review and Current Assessment," Bulletin of the American Meteorological Society 72, 1848-1866 (1991).
Seldomridge, N.L. et al., "Dual-polarization lidar using a liquid crystal variable retarder," OPTICE 45, 106202-106210 (2006).
Stillwell, R.A. et al., "Improved cloud-phase determination of low-level liquid and mixed-phase clouds by enhanced polarimetric lidar," Atmos. Meas. Tech., 11, 835-859, (2018).
LaCour, A., "Greenland Clouds Observed in CALIPSO-GOCCP: Comparison with Ground-Based Summit Observations," Journal of Climate 30, 6065-6083, (2017).
Sekelsky, S.M. et al., "Cloud observations with a polarimetric 33 GHz and 95 GHz radar," Meteorology and Atmospheric Physics 59, 123-140 (1996).
Norgren, M.S. et al., "Observed aerosol suppression of cloud ice in low-level Arctic mixed-phase clouds," Atmos. Chem. Phys. 18, 13345-13361, (2018).
Strabala, K.I. et al., "Cloud properties inferred from 8-12-μm data," J. Appl. Meteor. 33, 212-229 (1994).
Turner, D.D. et al., "Cloud Phase Determination Using Ground-Based AERI Observations at SHEBA," Journal of Applied Meteorology 42, 701-715 (2003).
Baum, B.A. et al., "Remote sensing of cloud properties using MODIS airborne simulator imagery during Success. 2. Cloud thermodynamic phase," J. Geophys. Res., 105(D9), 11781-11792 (2000).
Knap, W.H. et al., "Cloud thermodynamic-phase determination from near-infrared spectra of reflected sunlight," J. Atmos. Sci. 59, 83-96 (2002).
Pilewskie, P. et al., "Cloud phase discrimination by reflectance measurements near 1.6 and 2.2 μm," J. Atmos. Sci. 44, 3419-3421 (1987).
Daniel, J.S. et al., "Cloud liquid water and ice measurements from spectrally resolved near-infrared observations: A new technique," J. Geophys. Res. 107(D21), 4599, doi: 10.1029/2001JD000688 (2002).

Shaw, J.A. et al., "Continuous outdoor operation of an all-sky polarization imager," Proc. SPIE 7672, 76720A (2010).
Miller, M.A et al., "Active and passive SWIR imaging polarimetry," Proc. SPIE 4481, 87-99 (2002).
Driggers, R.G. et al., "What good is SWIR? Passive day comparison of VIS, NIR, and SWIR," Proc. SPIE 8706, 87060L (2013).
Hansen, M.P. et al., "Overview of SWIR detectors, cameras, and applications," Proc. SPIE 6939, 693901 (2008).
Stark, B. et al., "Shortwave infrared (SWIR) imaging systems using small Unmanned Aerial Systems (sUAS)," 2015 International Conference on Unmanned Aircraft Systems (ICUAS), 495-501 (2015).
Lindsay, D. et al., "Large format high operability low cost infrared focal plane array performance and capabilities," Proc. SPIE 8154, Infrared Remote Sensing and Instrumentation XIX, 81540S (2011).
Lu, S. et al., "Interpretation of Mueller matrices based on polar decomposition," J. Opt. Soc. Am. A 13, 1106-1113 (1996).
Schutgens, N.A.J. et al., "On the relationship between stokes parameters q and u of atmospheric ultraviolet/visible/near-infrared radiation," J Geophys Res: Atmos 109, (2004).
Dubovik, O. et al., "A flexible inversion algorithm for retrieval of aerosol optical properties from Sun and sky radiance measurements," J. Geophys. Res. 105(D16), 20673-20696, (2000).
Li, Z. Li, K. Li, L. Blarel and M. Wendisch, "A method to calculate Stokes parameters and angle of polarization of skylight from polarized CIMEL sun/sky radiometers," J Quant Spectrosc Radiat Transfer 149, 334-346 (2014).
Gál, J., "Polarization patterns of the summer sky and its neutral points measured by full-sky imaging polarimetry in Finnish Lapland north of the Artic Circle," Proc. R. Soc. Lond. A 457, 1385-1399 (2001).
Babinet, D., "Sur un nouveau point neuter dans l'atmosphère," C. R. Acad. Sci. Paris 11, 618-620 (1840).
Brewster, D., "On the polarization of the atmosphere," Philos. Mag. J. Sci. 31, 444-454 (1847).
Horváth, G. et al., , "First observation of the fourth neutral polarization point in the atmosphere," J. Opt. Soc. Am. A 19, 2085-2099 (2002).
Ghonima, M.S. et al., "A method for cloud detection and opacity classification based on ground based sky imagery," Atmos. Meas. Tech. Discuss. 5, 4535-4569 (2012).
EShelman, L.M. et al., "All-sky polarization measurements of the total solar eclipse on Aug. 21, 2017," Proc. SPIE 10655, Polarization: Measurement, Analysis, and Remote Sensing XIII, 106550L (2018).
Shupe, M.D., "A ground-based multisensor cloud phase classifier," Geophys. Res. Lett. 34, L22809, (2007).
Eloranta, E.W., "High spectral resolution lidar. Lidar: Range-Resolved Optical Remote Sensing of the Atmosphere," Springer-Verlag, (2005).
Dahl, L.M., "The Visible-to-Short-Wave-Infrafred Spectrum of Skylight Polarization," Professional Paper Submitted in Partial Fulfillment of the Requirements for the degree of Master of Science in Electrical and Computer Engineering, Montana State University, Bozeman, Montana, Jul. 2015.

* cited by examiner

Instrument → Solar Principal Plane

SYSTEMS AND METHODS FOR DETECTING THERMODYNAMIC PHASE OF CLOUDS WITH OPTICAL POLARIZATION

GOVERNMENT SUPPORT

This invention was made with Government support under Grant No. FA9550-14-1-0140 awarded by the U.S. Air Force Office of Scientific Research. The Government has certain rights in the invention.

FIELD

The present disclosure relates generally to the field optical imaging and sensing technology, and in particular, to the detection of cloud thermodynamic phase using optical polarization.

BACKGROUND

Clouds cover approximately 60 percent of Earth's surface and they play a significant role in the climate system, as they can regulate surface precipitation, shade the Earth's surface, and increase the greenhouse effect; however, they are one of the biggest sources of uncertainty in weather and climate models. Through absorption and scattering, clouds also strongly attenuate optical beams propagating through the atmosphere for communication or sensing. The absorption and scattering of clouds, as well as their net warming or cooling effect, depends on their physical properties, such as height, optical thickness, size, shape, and thermodynamic phase (if they contain ice crystals or liquid particles). Retrievals of cloud properties from satellite, airborne, and ground-based measurements also require cloud phase to be determined, so there is great interest in new or improved methods of remotely sensing cloud thermodynamic phase.

Cloud thermodynamic phase has been measured previously using both active and passive instruments. Active cloud lidar and mm-wave radar systems with polarization sensitivity can distinguish between ice and water clouds. For example, the polarization state of light scattered from polyhedral ice crystals is altered so that there is a significant fraction of cross-polarized light (i.e., light oriented perpendicular to the transmitted light polarization state), whereas light undergoing single scattering by liquid water droplets retains its transmitted polarization state (i.e., the cross-polarized signal is effectively zero).

Cloud phase also can be retrieved from passive measurements of radiance emitted or scattered by clouds at wavelengths with a different imaginary refractive index (i.e. absorption) for liquid and ice. These methods use one or more channel with absorption that is higher for ice than for liquid and one channel with nearly equal absorption for both ice and liquid. For example, this has been done with thermal infrared channels at 8.5, 11, and 12 µm, 3.7, 11, and 12 µm, and with a continuous spectrum between 11 and 19 µm. Another method added a visible channel at 0.65 µm and shortwave infrared (SWIR) channels at 1.63 and 1.90 µm, along with thermal IR channels at 8.5, 11, and 12 µm. A SWIR method used channels at 1.64 and 1.70 µm and a near-infrared method relied on spectra in the wavelength range of 850-1050 nm, in which ice absorption was found to be higher than water absorption for certain parts and lower in other parts.

Recently, it was reported by Knobelspiesse, et al., "Cloud thermodynamic phase detection with polarimetrically sensitive passive sky radiometers," Atmos. Meas. Tech. 8, 1537-1554 (2015), ("Knobelspiesse et al." hereafter) that the direction of linear polarization (expressed by the sign of the Stokes $S_1$ polarization vector) could be useful for determining cloud thermodynamic phase with a passive ground-based polarimeter. Knobelspiesse et al. found that a positive $S_1$ value indicates a liquid cloud, while a negative $S_1$ value indicates an ice cloud. The stokes $S_1$ parameter is sometimes called "Q" as the second Stokes parameter in a system that refers to these parameters as I, Q, U, and V. An initial validation of simulation results was provided using zenith-pointing, polarization-sensitive Cimel radiometers from the NASA Aerosol Robotic Network (AERONET). Their simulations suggested that the optimal measurement for cloud thermodynamic phase was not at the zenith, but in a direction in the solar principal plane approximately 55° from the sun.

SUMMARY

According to an embodiment of the present disclosure, a method for imaging a thermodynamic phase of at least one cloud includes obtaining a spatially-resolved polarimetric image of a region of the sky containing the at least one cloud using a multipixel image sensor having multiple channels corresponding to different wavelength bands, determining a value of a Stokes $S_1$ polarization parameter of incident light on each pixel corresponding to a portion of the image containing the at least one cloud for multiple channels corresponding to different wavelength bands, and determining the thermodynamic phase of the at least one cloud within the image based on the values of the Stokes $S_1$ polarization parameter, wherein the Stokes $S_1$ polarization parameter values determined for a first channel corresponding to a first wavelength band is used to determine a liquid thermodynamic phase, and the Stokes $S_1$ polarization parameter values determined for a second channel corresponding to a second wavelength band is used to determine an ice thermodynamic phase, and the first wavelength band has an average wavelength that is longer than the average wavelength of the second wavelength band.

According to an additional embodiment of the present disclosure, a system for imaging a thermodynamic phase of at least one cloud includes a polarimeter including a multipixel image sensor having multiple channels corresponding to different wavelength bands that is configured to obtain a spatially-resolved polarimetric image of a region of the sky containing the at least one cloud, and a processor coupled to the polarimeter and configured to determine a value of the Stokes $S_1$ polarization parameter of light incident on each pixel corresponding to a portion of the image containing the at least one cloud for multiple channels corresponding to different wavelength bands, and to determine the thermodynamic phase of the at least one cloud within the image based on the values of the Stokes $S_1$ polarization parameter, where the Stokes $S_1$ polarization parameter values determined for a first channel corresponding to a first wavelength band is used to determine a liquid thermodynamic phase, and the Stokes $S_1$ polarization parameter values determined for a second channel corresponding to a second wavelength band is used to determine an ice thermodynamic phase, and the first wavelength band has an average wavelength that is longer than the average wavelength of the second wavelength band.

Figure 56:
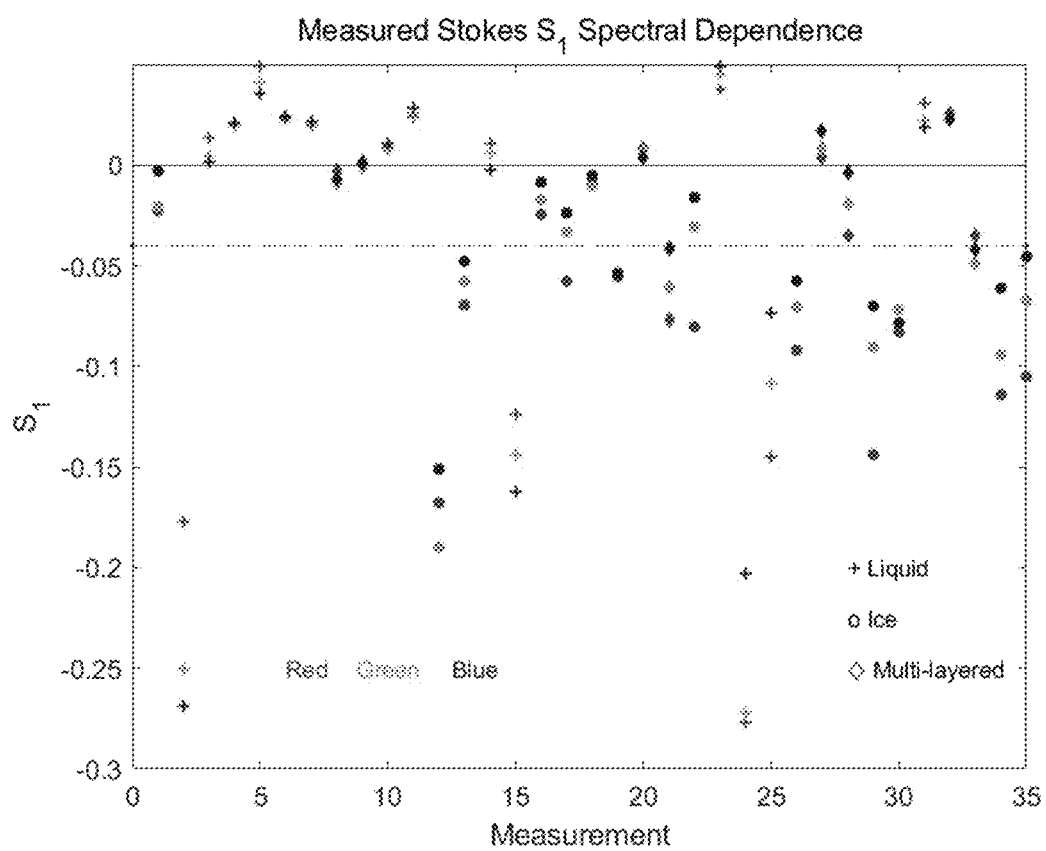

FIG. 56 is a plot showing multi-wavelength measurements from the three-camera Nikon polarimeter validated with a dual-polarization lidar at the zenith. Liquid clouds are represented by the plus (+) symbols, ice clouds are represented by the unfilled circles (o), and multi-phase clouds are represented by diamonds (+). Ice clouds were found to have negative $S_1$ values where liquid clouds were found to have positive $S_1$ values.

Figure 57:
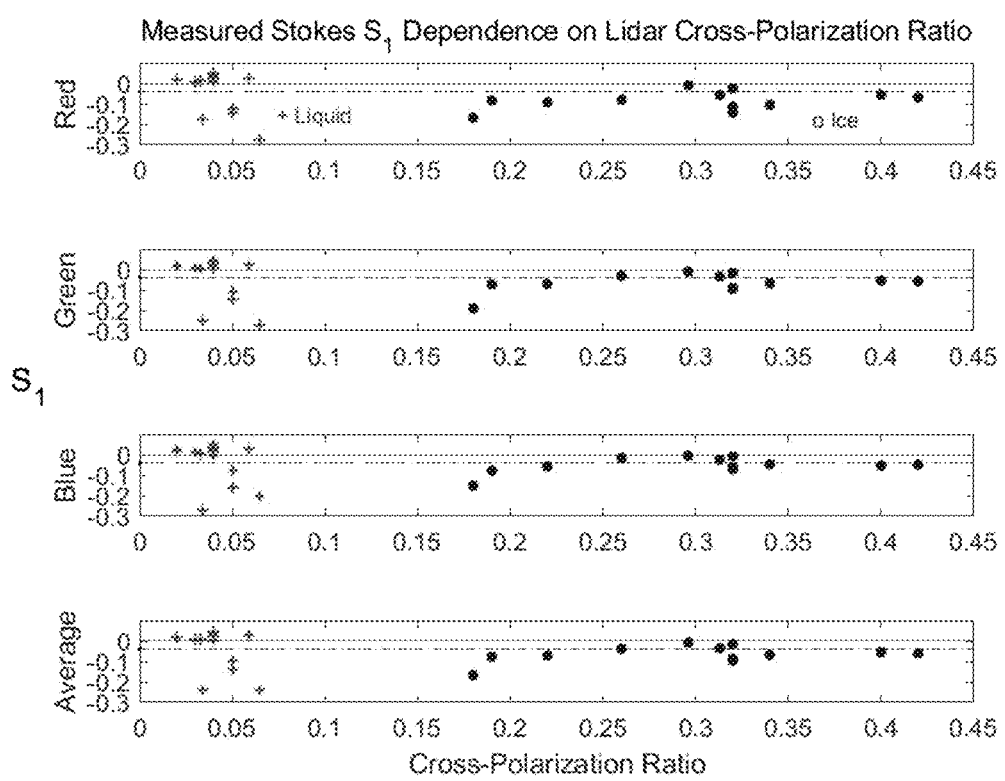

FIG. 57 are plots showing the observed relationship between the Stokes $S_1$ parameter in the scattering plane and the lidar's cross-polarization ratio at the zenith for each wavelength. Liquid clouds are represented by the red plus (+) symbols, ice clouds are represented by the blue, filled circles (o). The Stokes $S_1$ measurements were made with the three-camera Nikon polarimeter. Negative verified liquid $S_1$ values correspond to measurements recorded at scatter angles greater than 79°.

Figure 58:
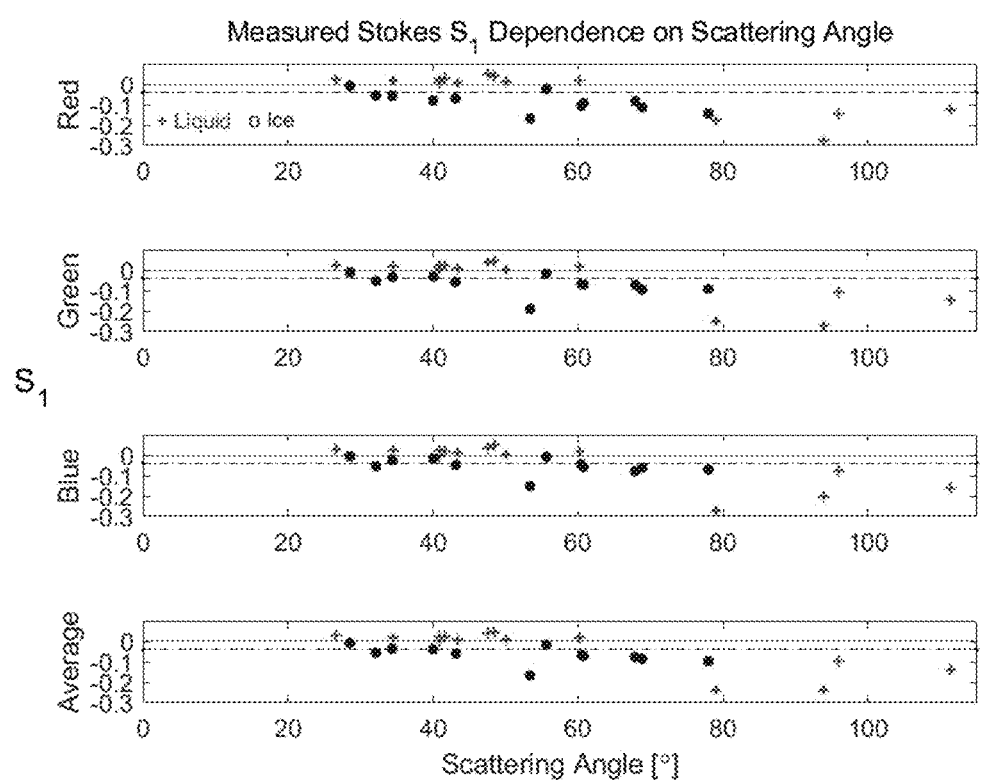

FIG. 58 are plots showing the observed relationship between the Stokes $S_1$ parameter in the scattering plane at the zenith and the corresponding scattering angle for each wavelength. The Stokes $S_1$ measurements were made with the three-camera Nikon polarimeter.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The present invention can "comprise" (open ended) or "consist essentially of" the components of the present invention as well as other ingredients or elements described herein. As used herein, "comprising" means the elements recited, or their equivalent in structure or function, plus any other element or elements which are not recited. The terms "having" and "including" are also to be construed as open ended unless the context suggests otherwise. As used herein, "consisting essentially of" means that the invention may include ingredients in addition to those recited in the description and/or claim, but only if the additional ingredients do not materially alter the basic and novel characteristics of the claimed invention.

Any and all ranges recited herein include the endpoints, including those that recite a range "between" two values. Terms such as "about," "generally," "substantially," "approximately" and the like are to be construed as modifying a term or value such that it is not an absolute, but does not read on the prior art. Such terms will be defined by the circumstances and the terms that they modify as those terms are understood by those of skill in the art. This includes, at very least, the degree of expected experimental error, technique error and instrument error for a given technique used to measure a value. Unless otherwise indicated, as used herein, "a" and "an" include the plural, such that, e.g., "a medium" can mean at least one medium, as well as a plurality of mediums, i.e., more than one medium.

Where used herein, the term "and/or" when used in a list of two or more items means that any one of the listed characteristics can be present, or any combination of two or more of the listed characteristics can be present. For example, if a composition of the instant invention is described as containing characteristics A, B, and/or C, the composition can contain A feature alone; B alone; C alone; A and B in combination; A and C in combination; B and C in combination; or A, B, and C in combination.

Various embodiments of the present disclosure relate to methods and systems for imaging the thermodynamic phase of clouds. In one embodiment, a polarimeter that measures at least one polarization parameter of light includes a multipixel image sensor having multiple channels corresponding to different wavelength bands. The multipixel image sensor may obtain, for each wavelength band, a spatially-resolved polarimetric image of a region of the sky containing at least one cloud. The multipixel image sensor may include a two-dimensional array of photosensitive elements that detect the intensity of the light that impinges on each pixel. The multipixel image sensor may utilize complementary metal-oxide semiconductor (CMOS) or charged-coupled device (CCD) imaging technology, for example. The multipixel image sensor may include optical filters and/or wavelength-sensitive detector elements to detect an image in multiple different wavelength bands, where each image may be output in a separate channel. The wavelength bands may be in the visible or near infrared wavelength ranges. In one embodiment, each of the wavelength bands may be in a range between 380 nm and 780 nm. Each of the wavelength bands may be separate from other wavelength bands, or may have a wavelength spectrum that partially overlaps with the wavelength spectrum of one or more additional wavelength bands. In one embodiment, a first wavelength band may have an average wavelength between 620 nm and 750 nm, and a second wavelength band may have an average wavelength between 450 nm and 495 nm. The average wavelengths of the first and second wavelength bands may be separated from one another by at least 10 nm, such as by 50-100 nm, or by greater than 100 nm.

In embodiments, the multipixel image sensor may include one or more digital cameras, which may have red, green, and blue (RGB) output channels corresponding to, respectively, wavelength bands in the red, green, and blue visible light spectra.

The polarimeter may also include optical elements that enable the multipixel image sensor to measure a polarization state of light incident on the multipixel image sensor in each of the wavelength bands, including the value of the Stokes $S_1$ polarization parameter (also known as the Q parameter) of the Stokes vector $\vec{S}$ of the incident light. The incident light may include sunlight that is scattered by a cloud before the scattered sunlight light impinges on the multipixel image sensor.

The polarimeter may also include a processor coupled to the multipixel and configured to determine a value of the Stokes $S_1$ polarization parameter of light incident on each pixel corresponding to a portion of the image that contains a cloud. For each of these pixels, the value of the Stokes $S_1$ polarization parameter may be determined for multiple channels corresponding to different wavelength bands. The processor may also be configured to determine a thermodynamic phase of one or more clouds within the image based on the values of the Stokes $S_1$ polarization parameter, wherein the Stokes $S_1$ polarization parameter values determined for a first channel corresponding to a first wavelength band is used to determine a liquid thermodynamic phase, and the Stokes $S_1$ polarization parameter values determined for a second channel corresponding to a second wavelength band is used to determine an ice thermodynamic phase, and the first wavelength band has an average wavelength that is longer than the average wavelength of the second wavelength band. The polarimeter according to various embodiments may also identify multi-layered ice and liquid phase clouds based on the values of the Stokes $S_1$ polarization parameter.

In some embodiments, the value of the Stokes $S_1$ polarization parameter may be determined by measuring an Angle of Polarization (AoP) of the incident light in an instrument plane of the multipixel image sensor, transforming the AoP measured in the instrument plane to a scattering plane at each pixel, and determining the value of the Stokes $S_1$ polarization parameter for each pixel with the AoP referenced to the scattering plane. The scattering plane may be a plane that includes both the incident and scattered light rays as well as the pixel upon which the scattered light ray impinges. Thus, the scattering plane may be unique for each pixel of the multipixel image sensor, and may also be dependent on the current position of the sun in the sky. In an alternative embodiment, the Stokes $S_1$ polarization parameter may be determined without transforming the AoP measured in the instrument plane to a scattering plane. For example, a computer algorithm, such as an artificial intelligence algorithm, may be configured or trained to perform the determination while using the Stokes $S_1$ polarization parameters in a non-scattering-plane reference.

In some embodiments, the thermodynamic phase of the one or more clouds may be determined by comparing the value of the Stokes $S_1$ polarization parameter to a threshold value, where values greater than the threshold value indicate liquid phase and values less than the threshold value indicate ice phase. In one embodiment, the threshold value for the Stokes $S_1$ polarization parameter may be −0.04. The threshold value may be the same for each pixel of the multipixel image sensor, or may vary between pixels. For example, the threshold value for different pixels of the multipixel image sensor may vary as a function of the scatter angle of the light impinging on the pixel.

In some embodiments, the polarimeter may be a division-of-time polarimeter, meaning that the polarimeter obtains a series of measurements sequentially in time while varying at least one optical property of the light impinging on the multipixel image sensor to retrieve a Stokes image in which each pixel contains a Stokes vector for that part of the observed scene. In one example, a rotating polarizer may be optically coupled to the multipixel image sensor to vary the polarization of the light impinging on the multipixel image sensor. In another example, at least one liquid crystal variable retarder (LCVR) may be used to electronically vary the retardance seen by the incident light before it impinges on the multipixel image sensor.

In other embodiments, polarimeter may be a division-of-aperture polarimeter that may include a plurality of multipixel image sensors that capture images of the same scene simultaneously or in rapid succession (e.g., within 10 seconds, such as within 5 seconds or within 1 second), where each image sensor includes optics that modify at least one property of the incident light relative to the light received at the other image sensors. In one example, the polarimeter may include multiple multipixel image sensors, such as digital cameras, that are spatially registered so that the field of view of the detector elements on each focal plane are well aligned. Each multipixel image sensor may be optically coupled to a fixed linear polarizer, where each linear polarizer may have a different orientation relative to a camera axis of each of the multiple multipixel image sensors. For example, a first multipixel image sensor may have a linear polarizer oriented at 0° relative to a common reference, a second multipixel image sensor may have a linear polarizer oriented at 60° relative to the common reference, and a third multipixel image sensor may have a linear polarizer oriented at 120° relative to the common reference. The images obtained by each multipixel image sensor may be combined to provide a spatially-resolved polarimetric image.

In some embodiments, pixels corresponding to a portion of the image containing a cloud may be determined based on a ratio of polarimetric intensity values measured with red and blue wavelength channels.

A polarimeter according to various embodiments may be a ground-based polarimeter. The polarimeter may obtain a spatially-resolved polarimetric image of a region of the sky, where the region may cover an angular range of at least about 10° of the sky in at least one of the zenith and azimuth directions, such as greater than 50°, including greater than 90°, greater than 120°, and greater than 150°, such as 10° to 180°, in at least one of the zenith and azimuth directions. In some embodiments, the polarimeter may be an "all-sky" or "full-sky" imager that may obtain a spatially-resolved polarimetric image that covers an angular range of at least 150°, such as 180°, in the zenith direction and may cover an angular range of at least 180°, such as 180° to 360° degrees, in the azimuth direction. An optical system, which may include a fisheye lens, may focus incident light over the field-of-view onto a focal plane of the multipixel image sensor.

The polarimeter according to various embodiments may determine cloud thermodynamic phase over a measurement range within the field of view of the polarimeter. The measurement range may have an angular range of at least 50° of the sky in the zenith and/or azimuth directions. The measurement range may be dependent on the location of the sun in the sky and the scatter angle of the light received at the multipixel image sensor. In one embodiment, the measurement range may include a region of sky that is between about 10° and 70° away from the sun.

Light propagates as a transverse electromagnetic wave that can be detected by humans in the visible spectrum between approximately 380 nm and 740 nm. Not directly observable by humans is polarization, which represents the orientation of the electric field vector of light in a plane normal to the propagation direction. With a polarization-sensitive instrument, polarization can be observed in the natural environment through reflection, emission, and scattering processes. Rainbows and glories, halos, sun glints, skylight, and the reflection of light from smooth surfaces exhibit unique polarization characteristics. Various sensing and surveillance applications exploit scattered, reflected, or emitted polarization to detect objects on the ground, in the air, and in space because polarization provides an added dimension beyond intensity and color. Environmental remote sensing applications use ground-based, airborne, and spaceborne polarimeters to retrieve aerosol and cloud properties, which are important parameters needed in current weather and climate models. Polarimeters are also being designed to detect the presence of liquid droplets on extrasolar terrestrial planets. Based on observing insects and birds who use polarization for navigation, polarization imagers are now being designed as navigational systems that use the angle of polarization as a polarized light compass. This is critical for when GPS is degraded or denied. All-sky polarimetry is also now being used as a calibration source to determine polarization cross-talk properties of large telescopes. For a day-to-day example, polarized sunglasses are used to remove glare from light reflecting from smooth surfaces.

In applications such as these, it is important to understand how partially polarized skylight can vary with environmental factors, such as aerosols, clouds, underlying surface reflectance, and scattering geometry, so that polarization measurements can be interpreted correctly. Therefore, in previous work at Montana State University, a physics-based understanding of how polarized skylight depends on atmospheric and surface parameters was developed. This work concentrated primarily on understanding the visible-to-near-infrared (Vis-to-NIR) degree of linear polarization (DoLP) in wavelengths bands centered from 450 nm to 780 nm during daytime (the DoLP is a quantity that measures the fraction of intensity attributable to linearly polarized light). In this disclosure, a physics-based understanding of the Stokes parameters and angle of polarization (AoP) with respect to the instrument, scattering, and solar principal planes is developed to more accurately predict cloud thermodynamic phase.

Visible-to-Shortwave-Infrared-Skylight Polarization

Figure 1:
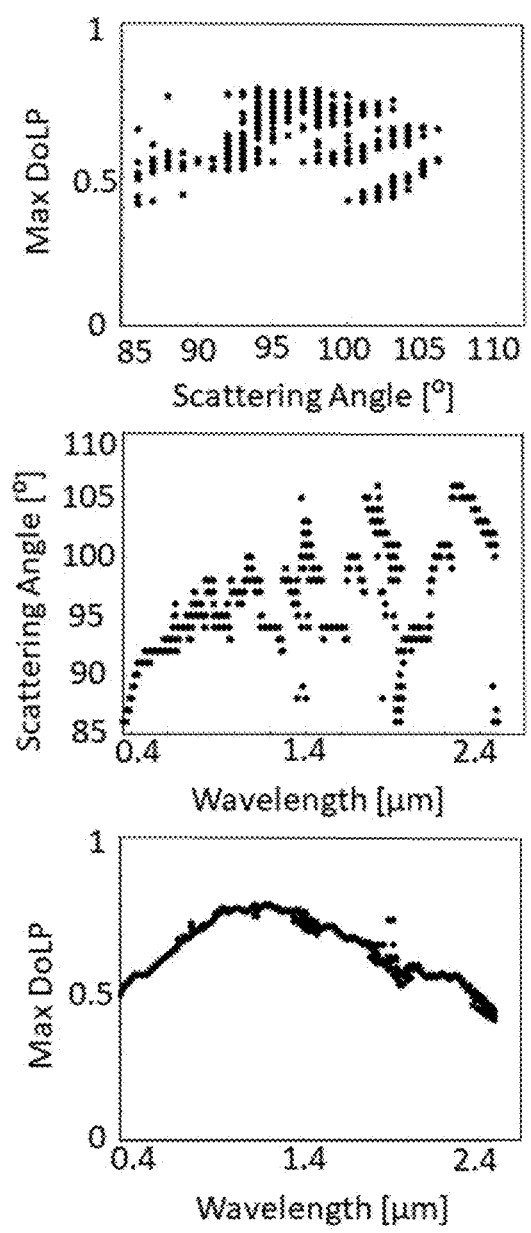
FIG. 1 are plots of radiative transfer simulations showing the relationship between scattering angle, wavelength, and maximum Degree of Linear Polarization (DoLP) for a moderately-hazy environment on 18 Aug. 2014 with zero surface reflectance. The input aerosol parameters (optical depth, volume size distribution, and index of refraction) were retrieved from AERONET. The solar azimuth and zenith angles were 118° and 49°, respectively. The maximum DoLP varied with wavelength and scattering angle (compared to the prediction that maximum DoLP occurs at a 90° scattering angle). Due to molecular anisotropy, the maximum DoLP in the real atmosphere is less than 1, and the location of the maximum DoLP varies spectrally between scattering angles of 86° and 106°.

Other than polarization that can be detected by resolving sunspots or the solar limb, the spatially integrated sunlight is randomly polarized. At visible and shortwave infrared wavelengths for Earth-based observers, polarization in nature arises primarily from the scattering of sunlight in the atmosphere and from reflection at smooth surfaces. For a clear-sky environment, Rayleigh scattering dominates for particles much smaller than the optical wavelength (e.g., the molecules of gases such as nitrogen and oxygen that make up the atmosphere). A single Rayleigh scattering event produces 100% linearly polarized light at angles 90° from the sun, with a polarization vector oriented orthogonal to the scattering plane defined by incident and scattered light. The degree of linear polarization for Rayleigh scattering varies according to $$DoLP = DoLP_{max}\left(\frac{1-\cos^2\theta}{1+\cos^2\theta}\right), \quad (1)$$

where $\theta$ is the scattering angle defined by incident and scattered rays and $DoLP_{max}$ is the maximum degree of polarization (which is 1 for the theoretical Rayleigh scattering case). Due to molecular anisotropy, the maximum DoLP in the real atmosphere is less than 1, and the location of the maximum DoLP varies spectrally between scattering angles of 86° and 106°, as observed in FIG. 1. As the sun appears to move through the sky, the band of maximum polarization also changes position in the sky, always remaining oriented approximately 90° from the sun's location. In the rare conditions of a pure Rayleigh scattering atmosphere, the skylight degree of polarization generally increases with wavelength since scattered irradiance is inversely proportional to the fourth power of the wavelength, thus reducing multiple scattering at longer wavelengths.

The maximum degree of polarization can be reduced by multiple scattering from atmospheric aerosols, clouds, and underlying surface reflectance. By using a measurement-driven successive orders of scattering (SOS) radiative transfer model, validated with an all-sky polarimeter, Pust and Shaw found skylight polarization to vary from the VIS-NIR spectrum for real environments (see N. J. Pust, and J. A. Shaw, "Wavelength dependence of the degree of polarization in cloud-free skies: simulations of real environments," Optics Express 20(14), 15559-15568 (2012)). In this spectral range they found skylight polarization to have a strong dependence on the aerosol optical depth and surface reflectance. The individual quantitative contribution of aerosol content and surface reflectance on skylight polarization was further studied in the VIS-to-SWIR spectrum by Eshelman and Shaw using the same radiative transfer model, modified to include spectral extrapolations of aerosol optical depth out to 2.5 μm and hand-held surface reflectance measurements (see L. M. Eshelman and J. A. Shaw, "The VIS-SWIR spectrum of skylight polarization," Appl. Opt. 57, 7974-7986 (2018)). Through simulations with the SOS radiative transfer model, skylight polarization in the VIS-to-NIR was found to have a strong dependence on the aerosol optical depth while skylight polarization in the SWIR varied primarily with the aerosol volume size distribution. In fact, at SWIR wavelengths, the DoLP in a cloud-free atmosphere was found to actually increase when the air became smoky. The simulations showed that for wavelengths where the aerosol optical depth was greater than the Rayleigh optical depth (typically wavelengths ≤1 μm), the predicted DoLP generally decreased with wavelength, but only after rising to a level that was much higher for a smoky atmosphere than for clean air (the rate of decrease depended on the aerosol size distribution).

Cloud Thermodynamic Phase Detection

As discussed previously, there is great interest in new or improved methods of remotely sensing cloud thermodynamic phase. Previously, cloud thermodynamic phase has been measured using both active and passive instruments, such as active cloud lidar and mm-wave radar systems. Cloud phase also can be determined from passive measurements of radiance emitted or scattered by clouds at wavelengths with a different imaginary refractive index (i.e. absorption) for liquid and ice. These methods use one or more channel with absorption that is higher for ice than for liquid and one channel with nearly equal absorption for both ice and liquid.

Knobelspiesse et al. showed that the direction of linear polarization (expressed by the sign of the Stokes $S_1$ polarization vector) should be useful for determining cloud thermodynamic phase with a passive ground-based polarimeter. Knobelspiesse et al. found that a positive $S_1$ value indicates a liquid cloud, while a negative $S_1$ value indicates an ice cloud. Initial validation of simulation results were provided using zenith-pointing, polarization-sensitive Cimel radiometers from the NASA Aerosol Robotic Network (AERONET). These simulations suggested that the optimal measurement for cloud thermodynamic phase was not at the zenith, but in a direction in the solar principal plane approximately 55° from the sun. Previous work at MSU looked into detecting clouds using the AoP (see N. J. Pust and J. A. Shaw, "Digital all-sky polarization imaging of partly cloudy skies," Appl. Opt. 47, H190-H198 (2008)); however, in the band of maximum polarization, clouds were hard to distinguish and a clear connection between cloud phases was not studied.

Whereas previous research on sky polarization has emphasized the measurement and use of the DoLP, the AoP reference plane became a significant aspect of the work presented in this disclosure. For accurate prediction of cloud thermodynamic phase, the AoP (and the related Stokes $S_1$ and $S_2$ parameters) needed to be rotated from the instrument plane to the scattering plane that is unique for every pixel in the all-sky image and for every solar position.

Stokes Parameters

Polarized light can be described by the Stokes vector $\vec{S}$, containing the parameters $S_0$, $S_1$, $S_2$, and $S_3$ (also referred to as I, Q, U, V). The Stokes parameters can be defined by $$S_0 = I_{0°} + I_{90°}, \tag{1}$$

$$S_1 = I_{0°} - I_{90°}, \tag{2}$$

$$S_2 = I_{45°} - I_{135°}, \tag{3}$$

$$S_3 = I_R - I_L, \tag{4}$$

where I represents the observed irradiance, the angles denote the direction of the transmission axis of a linear polarizer with respect to a common reference plane (all with zero phase difference), and the subscripts R and L represent right- and left-handed circular polarization states. By definition, all Stokes parameters have units of irradiance (W m$^{-2}$), although a full radiometric calibration is not always necessary and Stokes parameters are often determined from relative intensity measurements. In terms of what a polarimeter according to the present disclosure may measure, the Stokes parameter $S_0$ represents the total radiance (W m$^{-2}$ sr$^{-1}$), with the Stokes parameters $S_1$, $S_2$ and $S_3$ representing the difference between 0° and 90° polarization, the difference between linear +45° and −45° polarization, and the difference between right- and left-hand circularly polarized light, respectively. In Earth's atmosphere for nearly all conditions, the amount of circularly polarized light is negligible.

Mueller Matrices

The Mueller matrix is a mathematical tool for describing how partially polarized light is altered by propagation along a path or through an optical element or system. It represents the diattenuation, retardance, and depolarization properties of a system. A Mueller matrix can be used to relate the output Stokes vector with the input Stokes vector. Equation 5 shows the use of a standard Mueller matrix to transform an input Stokes vector from an original input polarization state to a potentially different output polarization state:

$$\begin{bmatrix} S_0 \\ S_1 \\ S_2 \\ S_3 \end{bmatrix}_{output} = \begin{bmatrix} m_{00} & m_{01} & m_{02} & m_{03} \\ m_{10} & m_{11} & m_{12} & m_{13} \\ m_{20} & m_{21} & m_{22} & m_{23} \\ m_{30} & m_{31} & m_{32} & m_{33} \end{bmatrix} \begin{bmatrix} S_0 \\ S_1 \\ S_2 \\ S_3 \end{bmatrix}_{input}. \tag{5}$$

For lossless free-space propagation, the diagonal elements $m_{00}$, $m_{11}$, $m_{22}$, and $m_{33}$ are equal to 1, with the other elements equal to 0. By normalizing all the elements by $m_{00}$, the unpolarized system transmittance can be factored out of the equation. The elements $m_{01}$, $m_{02}$, and $m_{03}$ are related to the diattenuation in a material which describes the change of the transmitted irradiance as a function of the incident polarization state. This property causes materials to allow one polarization component to pass, while absorbing the orthogonal component. The elements $m_{10}$, $m_{20}$, and $m_{30}$ are related to polarizance, which describes the degree of polarization of the exiting light for unpolarized incident light. Finally, all elements including and to the right of $m_{11}$, $m_{21}$, and $m_{31}$ describe the retardance of the system or propagation path. A calibration Mueller matrix was created for each visible all-sky polarimeter. This was used to reconstruct the Stokes vector of the incident light from the instrument-influenced measured Stokes vector, following the methods presented by Pust and Shaw (see N. J. Pust and J. A. Shaw, "Dual-field imaging polarimeter using liquid crystal variable retarders," Appl. Opt. 45, 5470-5478 (2006)).

Derived Quantities (DoLP, AoP)

Figure 2:
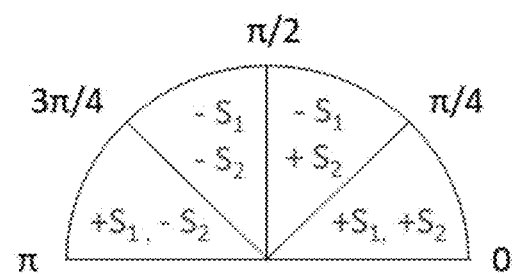
FIG. 2 illustrates the relationships between the Angle of Polarization (AoP) ($\chi$) and the Stokes $S_1$ and $S_2$ parameters.

The Stokes parameters can be used to derive the Degree of Linear Polarization, DoLP and the Angle of Polarization, AoP. The DoLP, $$DoLP = \frac{\sqrt{s_1^2 + s_2^2}}{s_0}, \; 0 \leq DoLP \leq 1, \tag{6}$$

is a quantity that measures the fraction of intensity attributable to linearly polarized light. When the DoLP equals 1, the light is completely linearly polarized. A DoLP value of 0 indicates randomly polarized light. The AoP, $$AoP = \chi = \frac{1}{2} \cdot \tan^{-1}\left(\frac{s_2}{s_1}\right), \; 0 \leq \chi \leq \pi, \tag{7}$$

indicates the angle between the plane of polarization and the plane of reference. The relationships between the AoP and the signs of the Stokes parameters $S_1$ and $S_2$ are listed in Table 1 and shown in FIG. 2. The AoP is measured counterclockwise from the reference axis in FIG. 2.

TABLE 1

| $S_3 = 0$ | $S_1 > 0$ | $S_1 = 0$ | $S_1 < 0$ |
|---|---|---|---|
| $S_2 > 0$ | tan (2χ) > 0<br>cos (2χ) > 0<br>0 < χ < π/4 | tan (2χ) doesn't exist<br>cos (2χ) = 0<br>χ = π/4 | tan (2χ) < 0<br>cos (2χ) < 0<br>π/4 < χ < π/2 |
| $S_2 = 0$ | tan (2χ) = 0<br>cos (2χ) > 0<br>χ = 0 | tan (2χ) doesn't exist<br>cos (2χ) = 0<br>χ uncertain | tan (2χ) = 0<br>cos (2χ) < 0<br>χ = π/2 |
| $S_2 < 0$ | tan (2χ) < 0<br>cos (2χ) > 0<br>3π/4 < χ < π | tan (2χ) doesn't exist<br>cos (2χ) = 0<br>χ = 3π/4 | tan (2χ) > 0<br>cos (2χ) < 0<br>π/2 < χ < 3π/4 |

Table 1 shows the relationships between the AoP (χ) and the Stokes $S_1$ and $S_2$ parameters. The sign of $S_1$ varies with χ according to cos(2χ).

Polarization Angle Reference Planes

In a single-Rayleigh-scattering environment, the skylight AoP and DoLP have a distinct pattern that rotates through the sky in time, based on the position of the sun. A maximum band of polarization occurs approximately 90° from the sun, with the direction of polarization oriented perpendicular to the scattering plane defined by the incident and scattered light. For each pixel, the measured linear Stokes parameters, $S_1$ and $S_2$, and the derived AoP can be referenced to the instrument, scattering, and solar principal planes (to be defined later), while the Stokes $S_0$ and derived DoLP are independent of reference frame.

Instrument Plane Reference

Figure 3:
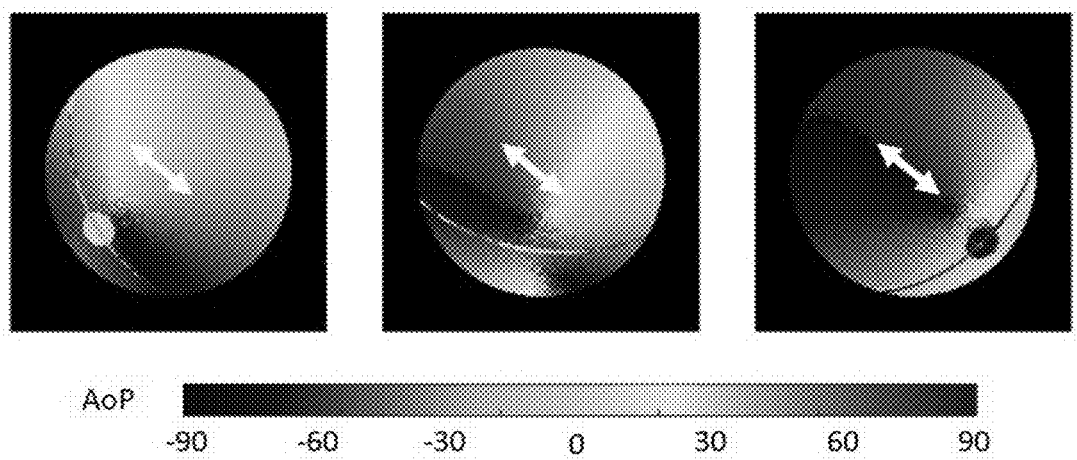
FIG. 3 shows AoP images referenced to the instrument plane with solar azimuth and zenith angles corresponding to 123°, 183°, and 230°, and 45°, 32°, 42°, respectively. Measurements were recorded in Rexburg, Id. on 21 Aug. 2017 at 17:00:03 (Left), 19:36:20 (Middle), and 21:34:06 (Right) UTC. The AoP was referenced to the axis of the internal polarizer (white arrow) and measured counterclockwise. The top of the image represents north and the right side of the image represents west.

In the instrument plane of reference, the recorded angle-dependent Stokes parameters, $S_1$ and $S_2$, and the derived AoP are referenced with respect to the axis of the instrument's internal polarizer, with the AoP measured counterclockwise from the reference axis. An example showing how the fixed-instrument AoP changes with solar position is given in FIG. 3, which shows AoP images referenced to the instrument plane with solar azimuth and zenith angles corresponding to 123°, 183°, and 230°, and 45°, 32°, 42°, respectively. The measurements shown in FIG. 3 were recorded in Rexburg, Id. on 21 Aug. 2017 at 17:00:03 (Left), 19:36:20 (Middle), and 21:34:06 (Right) UTC. The AoP was referenced to the axis of the internal polarizer (white arrow) and measured counterclockwise. The top of the image represents north and the right side of the image represents west.

Each all-sky image is oriented with north at the top and west to the right, as would be seen by an observer lying on the ground, looking up into the sky. The three all-sky images are for three different solar positions: the left-hand image is for morning (sun in the southeast), the center image is for midday (sun to the south), and the right-hand image is for afternoon (sun in the southwest). Displaying these measurements with respect to the instrument plane causes the AoP patterns to change with solar position (these patterns would remain constant with solar position if they were shown relative to the continually evolving scattering plane, to be discussed next).

While this measurement coordinate system does not provide a uniform AoP pattern, it can be beneficial for navigational applications. When referenced to the instrument plane, the orientation of the polarimeter can be found from the position of the sun in the measured AoP image, thereby providing a way to retrieve compass-based heading positions from the AoP image if the position of the sun is known.

Scattering Plane Reference

Figure 4:
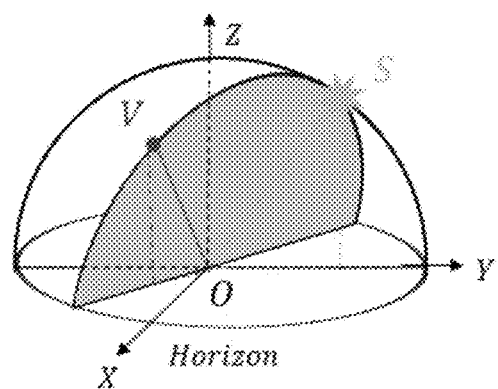
FIG. 4 illustrates the solar scattering plane, which contains the directions of incident light and scattered light in the viewing direction of the observer denoted by the gray plane (SOV).

To compare measured results in the entire AoP image with Rayleigh scattering theory, a transformation of the coordinate system is needed to align the reference plane to each pixel's unique scattering plane. The scattering plane, denoted by the gray plane SOV in FIG. 4, contains the direction of incident sunlight and scattered light in the viewing direction for the observer position. The scattering plane is unique for each pixel in the all-sky image. Once rotated into the scattering plane, the AoP and angle-dependent Stokes parameters have a uniform distribution throughout the sky and this pattern rotates with the solar position, as observed in FIG. 5, where the AoP is approximately 90° for each pixel in the all-sky image. Not expressing these angle-dependent polarization parameters relative to the scattering plane would present errors in the analysis of cloud thermodynamic phase and in the retrieval of aerosol parameters, both applications that rely on knowing the Stokes parameters referenced to the scattering plane.

Figure 5:
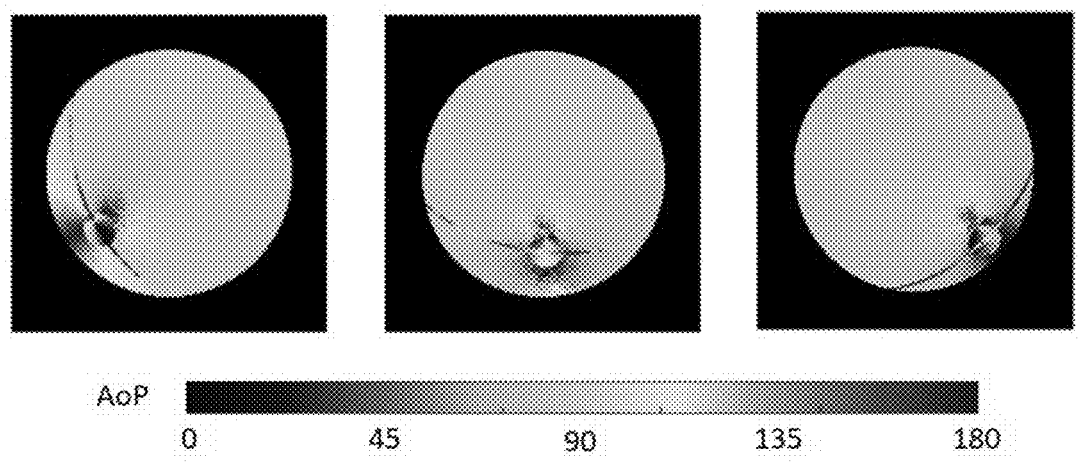
FIG. 5 shows AoP images referenced to the scattering plane with solar azimuth and zenith angles corresponding to 123°, 183°, and 230°, and 45°, 32°, 42°, respectively (from the same images as in FIG. 3). Measurements were recorded in Rexburg, Id. on 21 Aug. 2017 at 17:00:03 (Left), 19:36:20 (Middle), and 21:34:06 (Right) UTC. In this reference frame, the AoP distribution is uniform and rotates with the position of the sun. Neutral point locations are indicated by 90° changes in the AoP. The top of the image represents north and the right side of the image represents west.

Note also in FIG. 5 that neutral points are observed near the sun and are represented by a 90° change in AoP. Neutral points, locations with zero polarization, arise from multiple scattering creating polarization oriented parallel to the scattering plane, which offsets the polarization oriented perpendicular to the scattering plane (which arises from first-order scattering). In FIG. 5, neutral points exist just below and just above the sun.

Figure 6:
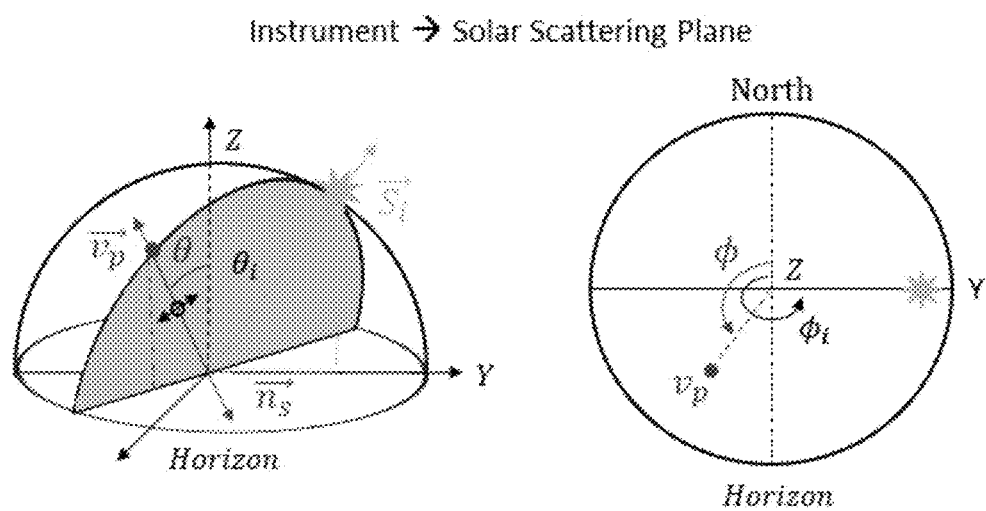
FIG. 6 illustrates the solar scattering plane with reference notation, where the solar scattering plane contains the directions of incident light ($\vec{S}_i$) and scattered light ($\vec{v}_p$) in the observer's viewing direction. The incident and scattered light is described by the zenith and azimuth angles, ($\theta_i$, $\phi_i$) and ($\theta$, $\phi$), respectively. The scattered light has a polarization vector orthogonal to the light ray. The scattering plane normal vector is $\vec{n}_s$.

Instrument→Scattering Plane Calculation. The method presented by Schutgens et al. (see N. A. J. Schutgens, L. G. Tilstra, P. Stammes, and F. M. Bréon, "On the relationship between stokes parameters q and u of atmospheric ultraviolet/visible/near-infrared radiation," J Geophys Res: Atmos 109, (2004)) was applied to transform the AoP measured in the instrument plane to an AoP referenced to the scattering plane at each pixel. Once the AoP was rotated, the normalized Stokes $S_1$ and $S_2$ parameters in the new reference frame (RF) could be calculated using Equations 8 and 9, $$\left(\frac{s_1}{s_0}\right)_{RF} = DoLP_{ins} * \cos(2 * AoP_{RF}), \quad (8)$$

$$\left(\frac{s_2}{s_0}\right)_{RF} = DoLP_{ins} * \sin(2 * AoP_{RF}), \quad (9)$$

where $DoLP_{ins}$ represents the DoLP in the instrument plane of reference. The calculations in this method were based on the single-scattering Rayleigh model, in which the AoP is perpendicular to the scattering plane that contains the source, the scattered light from the viewing direction, and the observation point. In FIG. 6, the incident and scattered light is described by the zenith and azimuth angles, $(\theta_i, \phi_i)$ and $(\theta, \phi)$, respectively. The azimuth angle for each view angle (pixel) of the polarimeter is referenced to north and is defined with respect to a right-hand coordinate reference, using the positive zenith direction as the axis of rotation. In practice, each pixel of the fisheye image may be related to its corresponding zenith and azimuth angles by performing a spatial calibration, as in further detail below.

Rotation of the AoP originally referenced to the instrument plane into a scattering-plane reference required calculation of the cross product $$\vec{n}_s = \vec{v}_p \times \vec{s}_L \quad (10)$$

of the incident light vector that points in the direction of the source $(\vec{s}_L)$ and the scattered light vectors that point in the viewing direction, $$\vec{v}_p = (\cos\varnothing \sin\theta, \sin\varnothing \sin\theta, \cos\theta). \quad (11)$$

Figure 7:
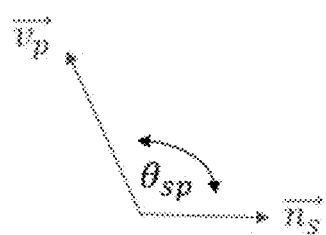
FIG. 7 illustrates that the angle between the light entering the system ($\vec{v}_p$) and the vector normal to the scattering plane ($\vec{n}_s$) is the angle of polarization referenced to the scattering plane which is found by taking the arccosine of the dot product of the two vectors, $\vec{v}_p$ and $\vec{n}_s$ as shown in Eq. (12).

This defines the scattering plane unique to each pixel in the image. The angle of polarization can be found using Equation 12, $$AoP_{sp} = \theta_{sp} = \arccosine\left(\frac{\vec{v}_p \cdot \vec{n}_s}{|\vec{v}_p||\vec{n}_s|}\right), \quad (12)$$

where $\vec{v}_p$ is again the light entering the system and $\vec{n}_s$ is the vector normal to the scattering plane. FIG. 7 shows the angle between these two vectors.

Principal Plane Reference

Figure 8:
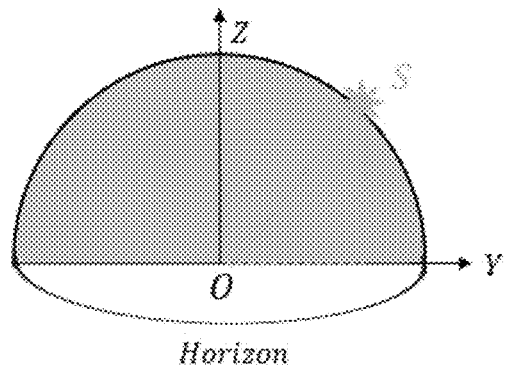
FIG. 8 is an illustration showing the solar principal plane that contains the incident light and local zenith denoted by the gray plane (SOZ).
Figure 9:
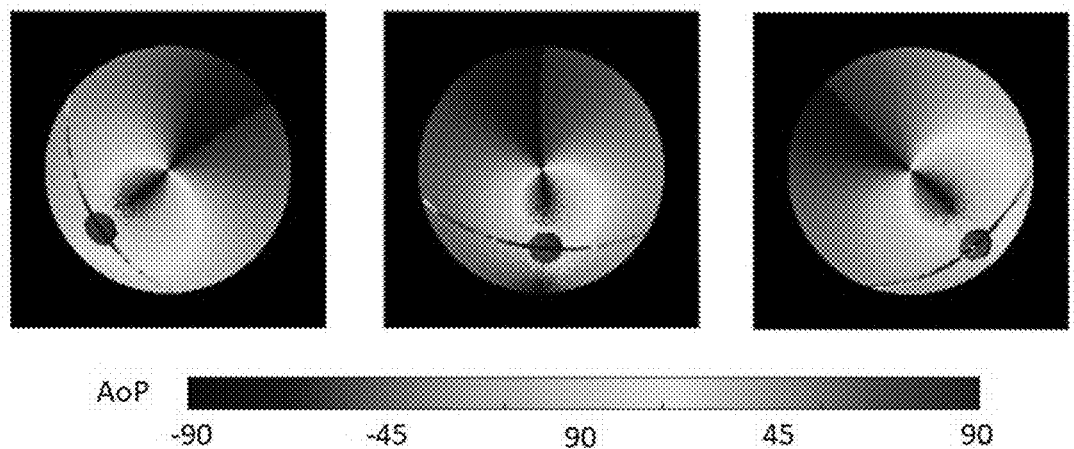
FIG. 9 shows AoP images referenced to the solar principal plane with solar azimuth and zenith angles corresponding to 123°, 183°, and 230°, and 45°, 32°, 42°, respectively (from the same images as in FIG. 3). Measurements were recorded in Rexburg, Id. on 21 Aug. 2017 at 17:00:03 (Left), 19:36:20 (Middle), and 21:34:06 (Right) UTC. In this reference frame, the AoP is measured clockwise from the solar principal plane. The top of the image represents north and the right side of the image represents west.

AoP measurements are also commonly aligned to the solar principal plane when analyzing multiple-scattering processes and in retrieving compass-based headings for navigational applications. For this reference frame, the scattered light $\vec{v}_p$ is referenced to the solar principal plane, which contains the incident light and local zenith, denoted by the gray plane SOZ in FIG. 8. This results in each instrument-frame AoP value being aligned to the solar principal plane, which creates a common reference coordinate system for all pixels. This results in a similar AoP pattern that rotates with the solar position, as shown in FIG. 9.

Figure 10:
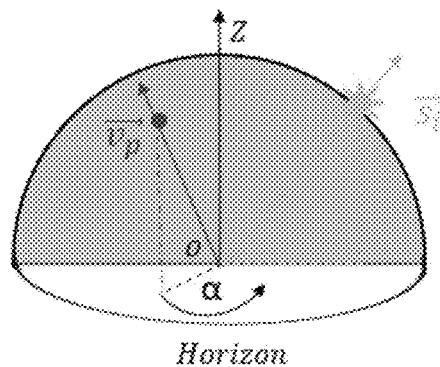
FIG. 10 is an illustration of the reference coordinate system with the solar principal frame represented by the gray plane. The reference coordinate system can be transformed by rotating each Stokes pixel referenced in the instrument plane by a counterclockwise rotation angle $\alpha$, which represents the azimuth angle measured from the solar principal plane to the rotated pixel.

Instrument→Solar Principal Plane Calculation. The method presented by Li et al. (see L. Li, Z. Li, K. Li, L. Blarel and M. Wendisch, "A method to calculate Stokes parameters and angle of polarization of skylight from polarized CIMEL sun/sky radiometers," J Quant Spectrosc Radiat Transfer 149, 334-346 (2014)) was used to transform the Stokes $S_1$ and $S_2$ parameters from the instrument plane to the solar principal plane by using a rotation Mueller matrix (Eq. 13). The AoP in the solar principal plane was then derived from the realigned Stokes parameters. The reference coordinate system was transformed by rotating each pixel from the instrument plane by a counterclockwise rotation angle α (FIG. 10).

$$\begin{bmatrix} S_0 \\ S_1 \\ S_2 \\ S_3 \end{bmatrix}_{principal\text{-}plane} =$$

$$L[\alpha] \cdot \begin{bmatrix} S_0 \\ S_1 \\ S_2 \\ S_3 \end{bmatrix} = \begin{bmatrix} 1 & 0 & 0 & 0 \\ 0 & \cos(2\alpha) & \sin(2\alpha) & 0 \\ 0 & -\sin(2\alpha) & \cos(2\alpha) & 0 \\ 0 & 0 & 0 & 1 \end{bmatrix} \begin{bmatrix} S_0 \\ S_1 \\ S_2 \\ S_3 \end{bmatrix}_{instrument}$$

(13)

Fisheye Lens Operation

When quantifying skylight polarization using all-sky polarimeters, the Stokes parameters are measured for each pixel at the focal plane and then converted to a Cartesian vector. The magnitude of this vector is the degree of polarization and the x and y components represent the direction of polarization. The amount of rotation the light vector experiences is determined by the zenith angle of the observed pixel. For light incident from the horizon, the rotation of the light direction vector is 90°, while light incident from the zenith is not rotated. Thus, the recorded AoP image is a projected version of the incoming AoP. By mathematically reversing the bending process of the lens, the initial AoP can be calculated. A mapping between the pixel locations on the image plane and the zenith angle of the incident light is needed to accurately describe the measured Stokes parameters and to rotate the Stokes parameters between different reference frames.

All-Sky Polarization Images

Figure 11:
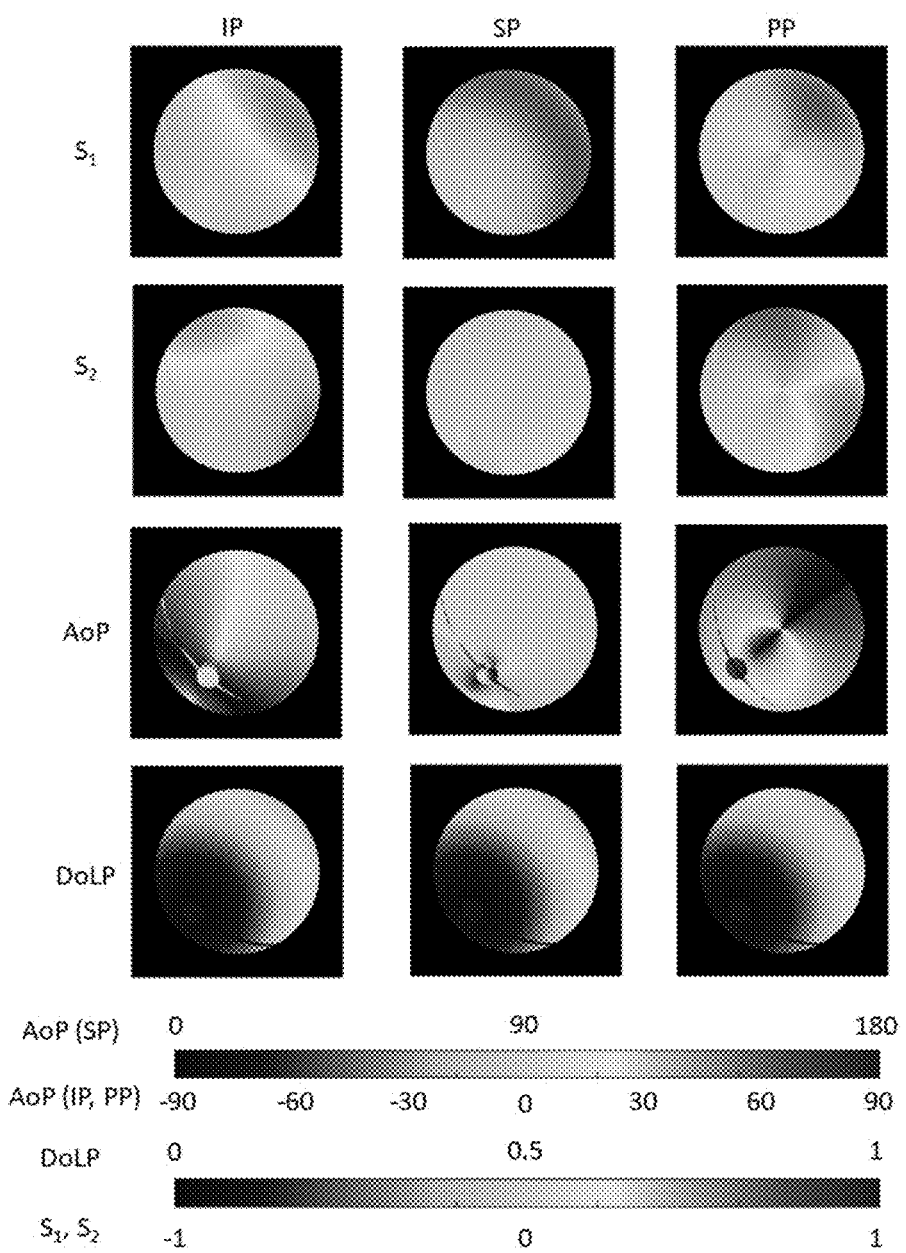
FIG. 11 shows measured all-sky 450 nm $S_1$, $S_2$, AoP, and DoLP images referenced to the instrument plane (IP), scattering plane (SP), and principal plane (PP). The images were recorded with an LCVR all-sky polarimeter at 17:00:03 UTC on 21 Aug. 2017 in Rexburg, Id. The solar azimuth angle and zenith angle were 123.1° and 45.0°, respectively. The top of the image represents north and the right side of the image represents west.

In FIG. 11, all-sky polarization Stokes $S_1$, $S_2$, AoP, and DoLP images can be viewed, referenced to the instrument plane (left column), scattering plane (middle column), and principal plane (right column). The images were recorded with the LCVR polarimeter in Rexburg, Id. (latitude: 43° 49'46.13" N; longitude: 111° 53'6.14" W) on 21 Aug. 2017. The all-sky images are oriented with north at the top and west to the right. The DoLP magnitude did not change in the different reference frames (row 4); however, noticeable differences between the $S_1$, $S_2$ and AoP images were observed, specifically in the measurement time series presented in FIG. 12. A clear-sky was observed through the measurement series; therefore, the skylight polarization was always polarized perpendicular to the scattering plane. As the solar geometry changed, the $S_1$, $S_2$, and AoP images referenced in the instrument, scattering, and solar principal planes changed.

For measurements referenced to the instrument plane (FIG. 12, rows 1-3), the $S_1$, $S_2$, and AoP images varied based on the position of the sun with respect to the orientation of the imager's reference polarizer. Referencing the polarization angles in the scattering plane created uniform $S_1$, $S_2$, and AoP images (FIG. 12, rows 4-6) that rotated with the solar position. The direction of polarization was observed to be perpendicular to the solar principal plane (in all pixels except in a small region near the sun where the signal could be saturated or otherwise affected by strong multiple scattering and related neutral points). In the principal plane reference, the magnitudes of the $S_1$, $S_2$, and AoP (FIG. 12, rows 7-9) were observed to be dependent on the solar position.

Neutral Points

A neutral point in an all-sky image represents a point where the measured DoLP is equal to zero. At a neutral point, the DoLP gradually increases with angular distance. The neutral points arise from multiple scattering in the atmosphere, which creates a polarization component oriented parallel to the scattering plane, offsetting the single-scattered polarization oriented perpendicular to the scattering plane. Neutral points arise when the intensities of the perpendicular and parallel light are equal. At a neutral point, the AoP switches 90° along the solar principal. For measurements referenced to the principal plane, the switch of AoP at the zenith is a result of the coordinate reference frame and is not from a neutral point. Neutral points vary with solar position, wavelength, and relate to the amount of atmospheric turbidity and the type of particles present in the atmosphere.

The main neutral points are called Arago, Babinet, and Brewster, after the scientists who first described or studied them. In 1809 Dominique Francois Jean Arago discovered partially linear polarization and observed a neutral point in the anti-solar direction. In 1840, Jacques Babinet discovered a second neutral point situated above the sun and in 1842, David Brewster predicted a third point below the sun at the same angular distance the Babinet point lies above the sun. Brewster confirmed his prediction experimentally in 1846. Horvath et al. measured a $4^{th}$ neutral point approximately opposite the Arago point along the anti-solar principal direction. The fourth neutral point can only be observed from the sky by an air- or space-borne observer, looking down.

Figure 13:
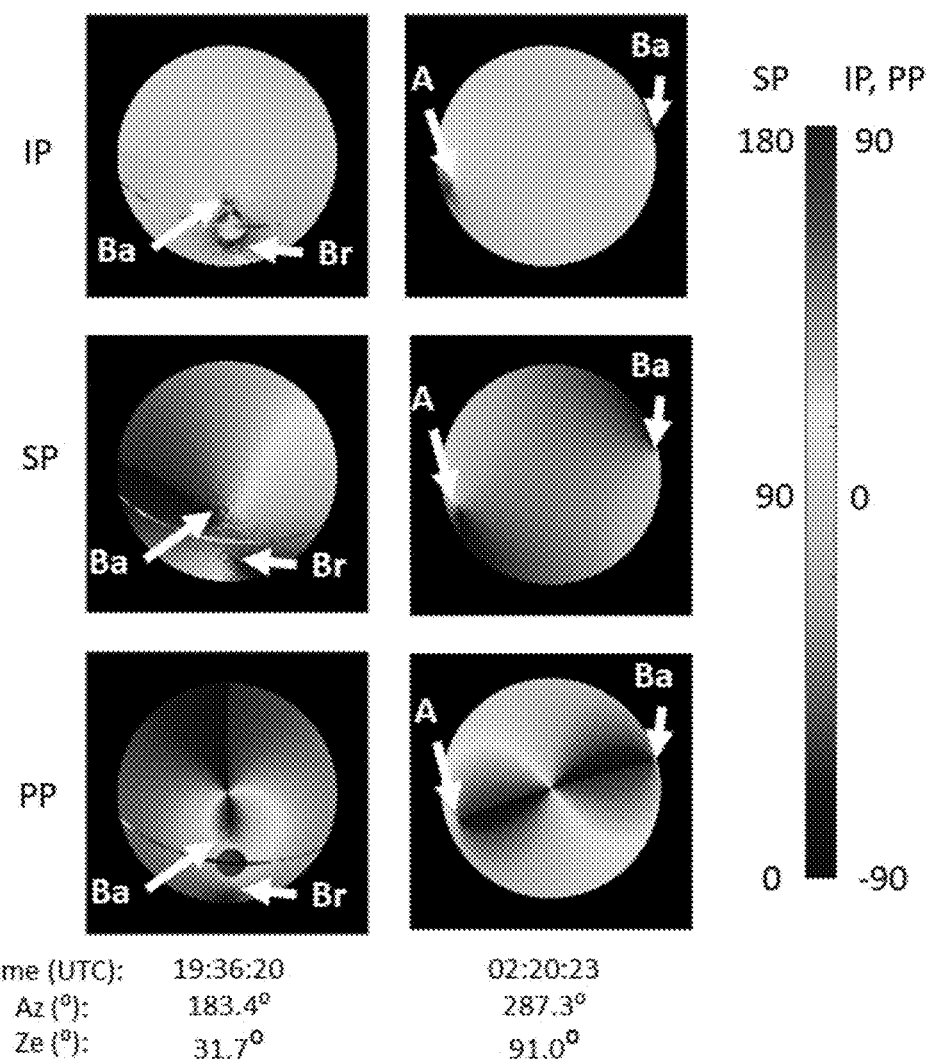
FIG. 13 shows the angle of polarization (AoP) referenced in the instrument plane (IP), scattering plane (SP), and principal plane (PP), respectively. The images on the left and right correspond to measurements made in Rexburg, Id. on 21 Aug. 2017. The Babinet (Ba) neutral point can be observed in both images. The Brewster (Br) neutral point can be observed for zenith angles less than 90°, where the Arago (A) neutral point can be observed for zenith angles greater than 90°. The top of the image represents north and the right side of the image represents west.

Measurements of the AoP from 21 Aug. 2017 are shown in FIG. 13 to illustrate the neutral point locations in the instrument-plane, scattering-plane, and principal-plane references. Examples are shown for daytime (left) and twilight (right). The Brewster (Br) neutral point can be observed for solar zenith angles less than 90°, where the Arago (A) neutral point can be observed for solar zenith angles greater than 90° (i.e., at twilight, with the sun below the horizon). As the solar zenith angle increases from 90°, the Babinet neutral point decreases in altitude, the Brewster neutral point vanishes, and the Arago point becomes observable.

In summary, to accurately predict cloud thermodynamic phase in accordance with various embodiments of the present disclosure, the AoP (and the related Stokes $S_1$ and $S_2$ parameters) should be rotated from the instrument plane to the scattering plane that is unique for every pixel in the all-sky image and for every solar position.

Figure 12:
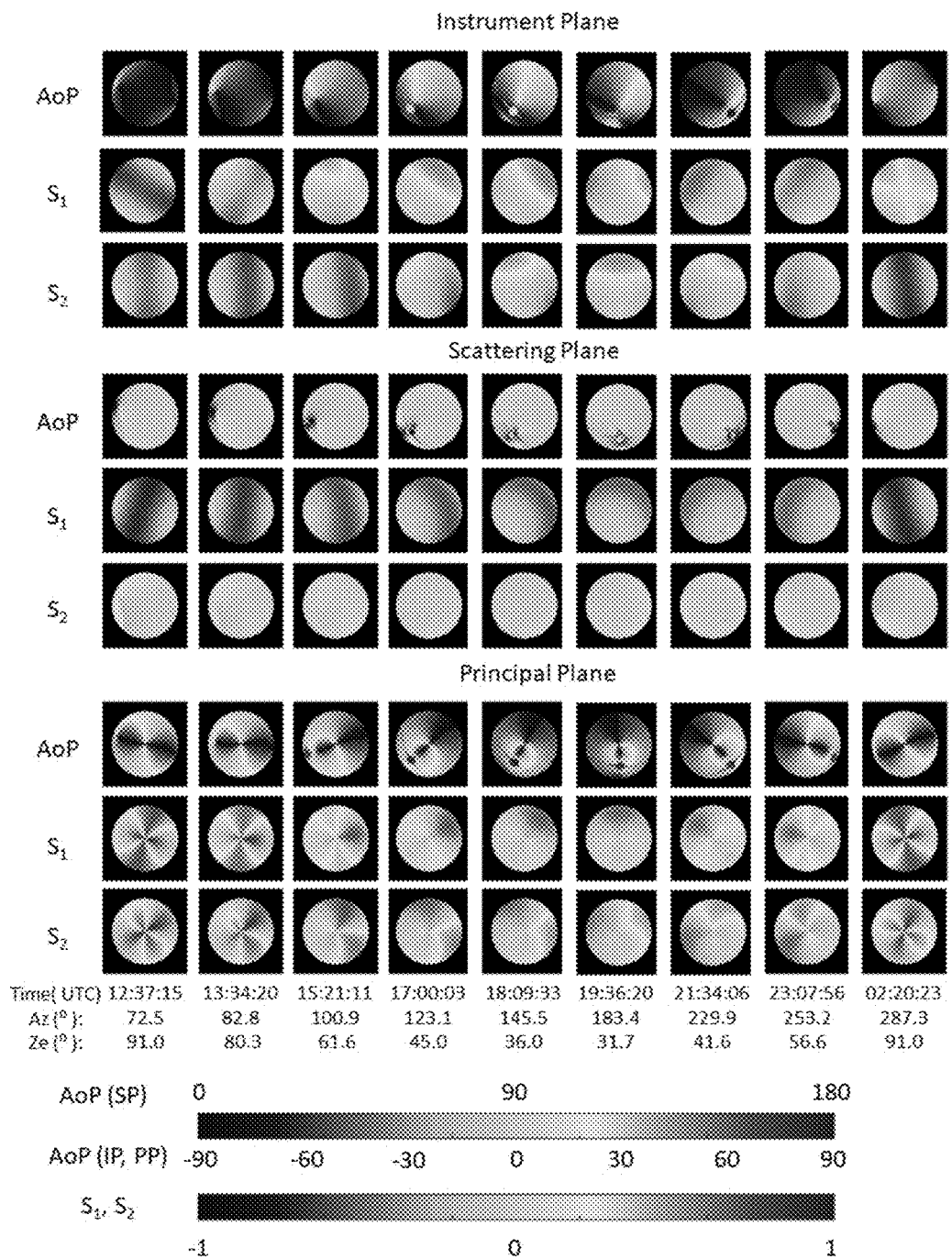
FIG. 12 is a time-series of measured AoP, $S_1$, and $S_2$ images recorded with the LCVR all-sky polarimeter (450 nm) referenced to the instrument plane (top panels), scattering plane (middle panels), and principal plane (bottom panels). The measurements were recorded in Rexburg, Id. on 21 Aug. 2017. Each column represents a separate measurement with the corresponding time and solar azimuth and zenith angles positioned below the column. The top of the image represents north and the right side of the image represents west.

In FIGS. 11 and 12, the $S_1$, $S_2$, and AoP images, referenced to the instrument, scattering, and principal planes, were observed to change as the sun moved from sunrise to sunset. Both the instrument and principal plane $S_1$, $S_2$, and AoP images were dependent on the solar scattering geometry. The instrument plane AoP was dependent on the solar position and the orientation of the imager's internal polarizer. As the solar position changed, the AoP referenced in the principal plane was aligned perpendicular to the scattering plane; however off-axis, the $S_1$, $S_2$, and AoP images varied. This off-axis variation was dependent on the solar scattering geometry. The $S_1$, $S_2$, and AoP values referenced in the scattering plane had a uniform distribution that rotated with the solar position.

By exploiting the direction of linear polarization in the measured AoP, which is dependent on the Stokes $S_1$ and $S_2$ parameters, azimuth sensing can be used to build GPS-independent navigational systems. The navigational systems rely on knowing the direction of polarization in order to obtain heading coordinates; therefore, measurements referenced to either the instrument or principal planes benefit these applications. For example, the AoP image referenced to the instrument plane can be used to determine the location of the polarimeter with respect to the solar principal plane. In the left image of FIG. 3, the measured AoP value of zero (along the solar principal plane), indicates that the polarimeter was perpendicular to the solar principal plane (since the AoP pattern in clear-sky is perpendicular to the scattering plane).

The Stokes $S_1$ parameter, when defined in the scattering plane, can be used to determine cloud thermodynamic phase and if referenced to the almucantar plane, the retrieval of aerosol parameters (aerosol particle size, shape, and the real part of the complex refractive index) can be inferred from the Stokes $S_1$ and $S_2$ parameters, which could help in identifying aerosol types. The almucantar plane contains a solar zenith angle with varying azimuth angles at a set zenith angle.

Polarimeters

Various examples described in this disclosure utilize different types of polarimeters operating in the visible and shortwave infrared. The shortwave infrared polarimeter and the visible LCVR-based polarimeter are division-of-time polarimeters, meaning that they take a series of measurements sequentially in time using different analyzers (i.e. rotating polarizers or electronically varied liquid crystal retardance) to retrieve a Stokes image in which each pixel contains a Stokes vector for that part of the observed scene. The time-sequential nature of the measurements obtained by these instruments can lead to significant polarization artifacts when the light fluctuates during a measurement sequence. This creates problems when trying to measure skylight polarization during dynamic lighting conditions in low-light conditions, such as twilight or a solar eclipse. Therefore, we developed two different visible three-camera all-sky polarimeters so that polarimetric images could be recorded over a dynamic range of lighting conditions. These three-camera polarimeters record three images simultaneously and are considered a division-of-aperture polarimeter. The detectors in this system must be spatially registered so that the field of view of the detector elements on each focal plane are well aligned. Below is a description of each of these polarimeter systems, their operating modes, and required calibrations.

SWIR Imaging Polarimeter

Figure 14:
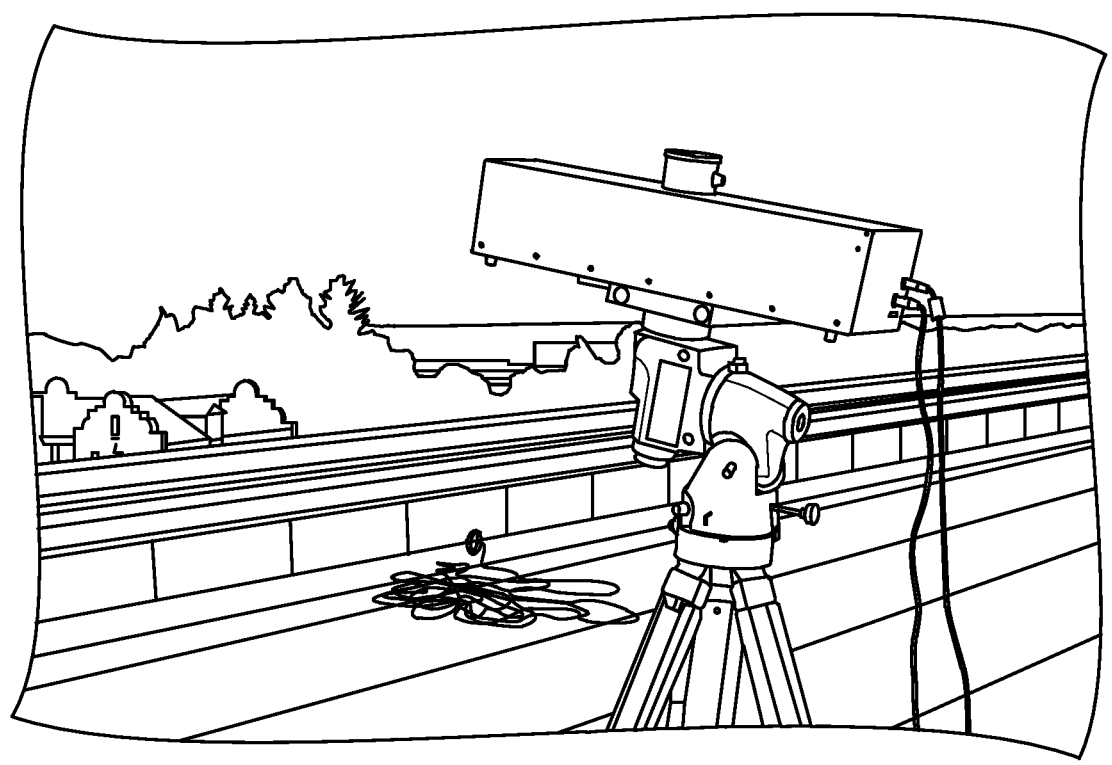
FIG. 14 is a photograph of a SWIR rotating-polarizer imaging polarimeter.

In L. M. Dahl, "The visible-to-short-wave-infrared spectrum of skylight polarization," Master's Professional Paper, https://scholarworks.montana.edu/xmlui/handle/1/9205, (2015), a successive-orders-of-scattering radiative transfer model was used to study skylight polarization in the shortwave infrared. In that dissertation, the SWIR imaging polarimeter shown in FIG. 14 was used to validate those models in a single band from 1.5 to 1.8 µm. This passive polarimeter was developed at Polaris Sensor Technologies (Huntsville, Ala.) and captures radiance images in units of W/(m² sr) at 0°, 45°, 90°, and 135° polarizer angles sequentially in time through a polarizer rotating continuously at a spin rate up to 120 revolutions per second. Once a measurement is completed, a non-uniformity correction is applied to the measured images and a post-processing algorithm computes a Stokes vector representing the polarization state for each pixel in the image. The focal plane array in this polarimeter is liquid-nitrogen cooled and its field of view is 9.1° by 7.3°.

Visible LCVR-Based all-Sky Polarimeter

A visible LCVR-based all-sky polarimeter at Montana State University, locally referred to as "Polly," was a primary tool used in studies of cloud thermodynamic phase, skylight polarization during the 2017 solar eclipse, and the effects of wildfire smoke on skylight polarization. This instrument uses a fisheye lens to image the sky with a field of view of approximately 160°. It is a ground-based imager that operates in 10-nm-wide wavelength bands centered at 450 nm, 490 nm, 530 nm, 670 nm, and 780 nm. This LCVR all-sky polarimeter has been an extremely valuable instrument that has been used to quantitatively relate skylight polarization to environmental parameters such as aerosols, clouds, and surface reflectance.

Figure 15:
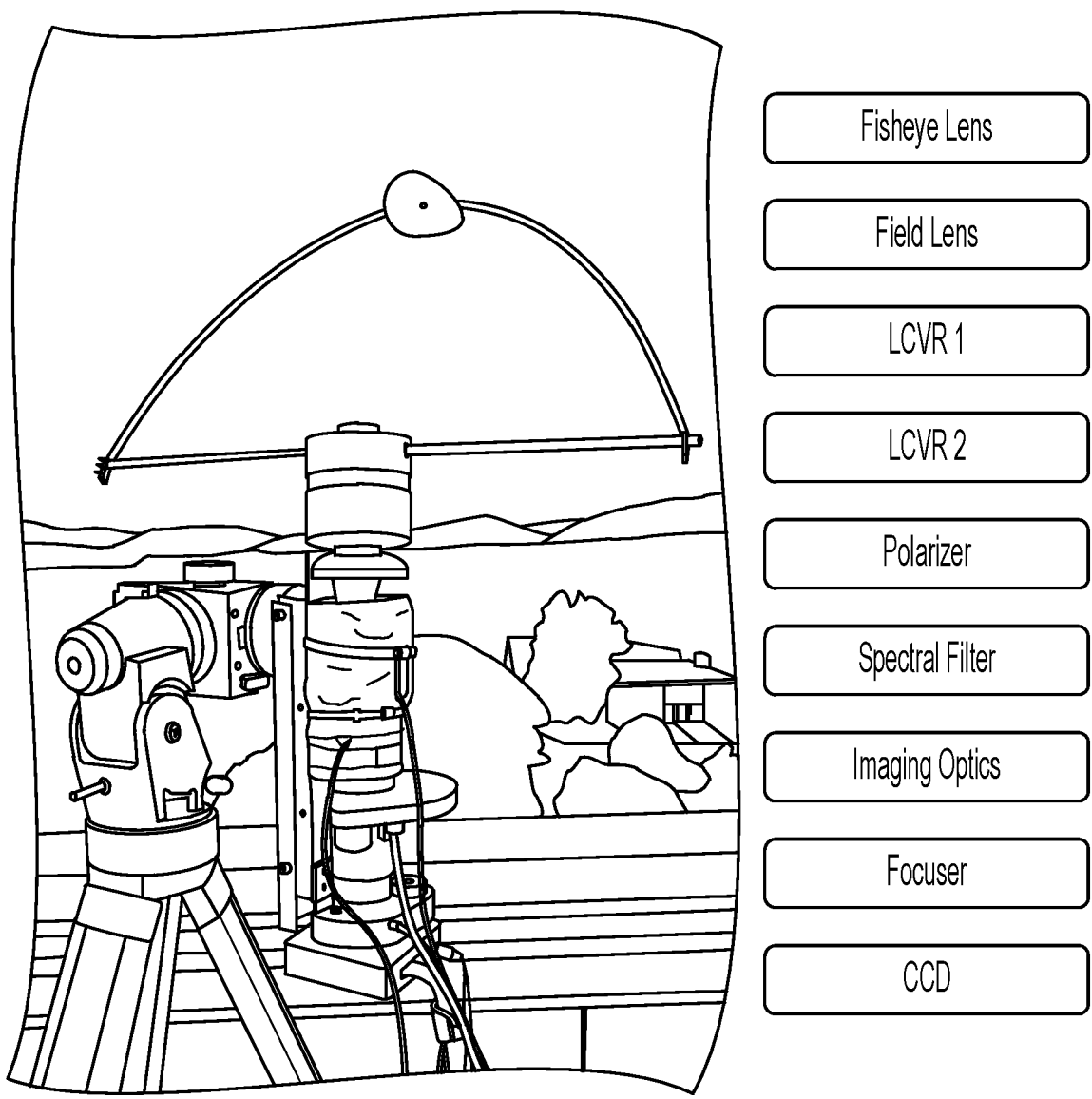
FIG. 15 is a photograph of a visible LCVR-based all-sky polarimeter with a schematic illustration of the internal components of the optics train of the visible LCVR-based all-sky polarimeter.

In this polarimetric imager, two liquid crystal variable retarders (LCVRs) are used to electronically vary the retardance seen by incoming light. Four sequential images are rapidly-acquired so that a full Stokes image can be measured in less than a few tenths of a second, at each wavelength. The LCVRs allowed rapid acquisition that enabled reliable measurements in partly cloudy skies by avoiding polarization artifacts from inter-frame cloud motion. This polarimeter relies on a full radiometric and polarimetric calibration. The polarimetric calibration was performed using an external rotating polarizer and an integrating sphere viewed at numerous angles to fully capture the imager's system matrix over the entire fisheye field of view. Maximum error for the Stokes $S_1$ and $S_2$ parameters was estimated as ±1.1% with 100% linear input. The LCVR polarimeter and a diagram explaining its internal components are shown in FIG. 15 (in this photo, the polarimeter was temporarily deployed without a weatherproof housing).

Polarimeter Redesign

This all-sky polarimeter system had been operating continuously since 2009 and in 2013, it needed repairs and upgrades to continue operation and to improve efficiency, reliability, and accuracy. System upgrades included replacing the original camera, focus wheel, filter wheel, and LCVR controller, performing a new fisheye radiometric and polarimetric calibration, and designing and building a new weatherproof, temperature-controlled case. The upgrades to this polarimeter, that are outlined in the following sections improved the overall sensitivity, data quality, and stability of the collected images and gave us the ability to take measurements during darker conditions, namely during twilight. After the changes were implemented, a full calibration was performed with the fisheye lens.

LCVR Improvements. Prior to the 2016 upgrades, if electrical power was removed from the LCVRs, the polarimeter calibration was lost. To fix this issue, a new dual-channel LCVR controller replaced the two original single-channel LCVR controllers, reducing the need to perform a full calibration every time power was removed from the system. With this improvement, the polarimeter could be moved between measurement sites and the calibration was found to be stable as long as the optical train was not changed.

Figure 16:
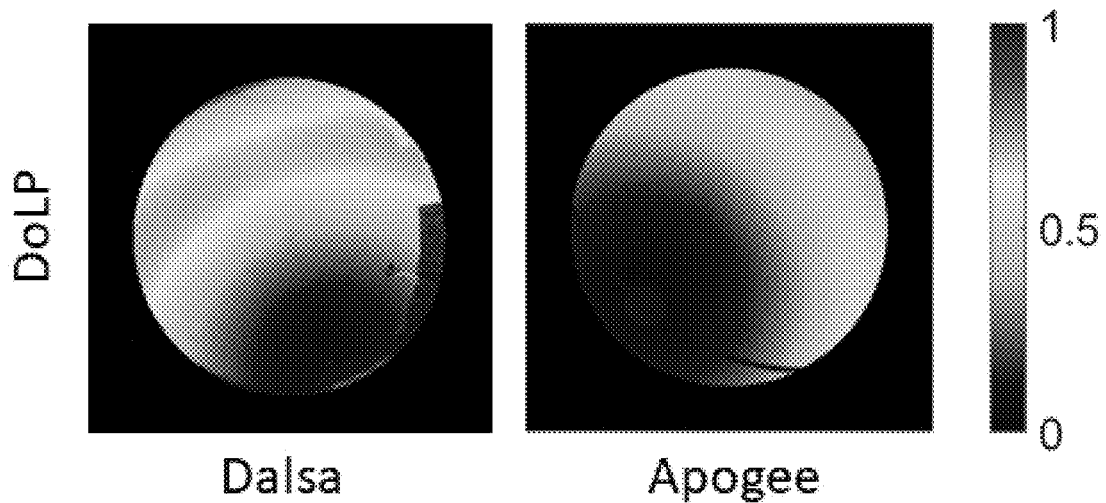
FIG. 16 shows LCVR-based all-sky DoLP images recorded by the DALSA (Left) and Apogee (Right) cameras on 18 Oct. 2005 and 21 Aug. 2017, respectively. The solar azimuth and zenith angles were (199°, 123°) and (33°, 45°), respectively. The top of the images are aligned to north, with the right side of the image aligned to west.

Camera Replacement. A new Apogee Alta F astronomical-grade 4-megapixel camera with cooling capabilities down to −20° C. replaced the previous DALSA 1-megapixel camera. This change was implemented as a result of fluctuations exhibited by the previous camera, which made maintaining calibration difficult. The Apogee camera quantum efficiency is twice that of the DALSA camera and it has significantly less spatial noise, as can be observed in the DoLP images in FIG. 16.

Figure 17:
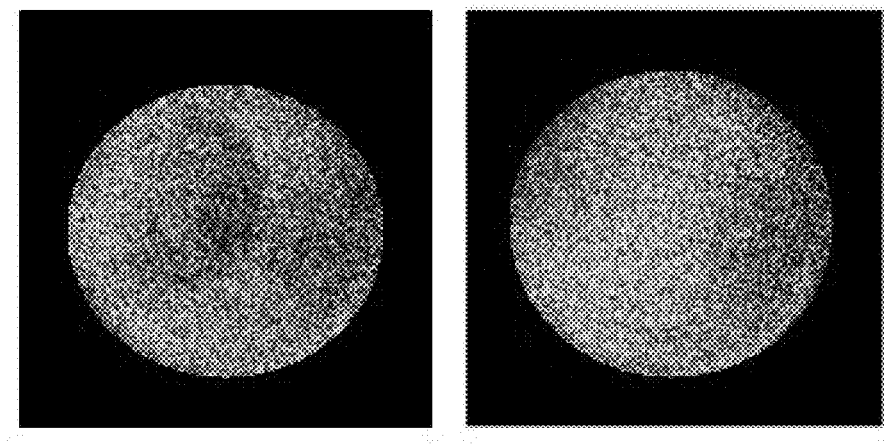
FIG. 17 shows an example of reflection artifacts from a reflective polarizer installed in the all-sky polarimeter's optical train to allow for "red edge" effect detection (left image) and the resulting image (right image) after the polarizer was tilted with respect to the optical axis.

Spectral Filter Replacement. To expand the spectral capabilities of this instrument from the visible to the near infrared, a 780-nm filter replaced the 700-nm filter. With this change, "red edge" effects and near-infrared polarization could be measured, the latter being especially useful for aerosol studies. This instrument can now measure skylight polarization in 10-nm-wide wavelength bands centered at 450 nm, 490 nm, 530 nm, 670 nm, and 780 nm. With the addition of the 780-nm channel, a second polarizer was added to the system because the original polarizer only performed properly to wavelengths up to 700 nm. Unfortunately, the use of this reflective polarizer caused reflections to appear as ghost images in the final optical image. To fix this issue, the second polarizer was tilted in the optical train to "steer" the ghost reflections into the black casing. FIG. 17 displays images before and after the second polarizer was tilted in the optical train.

Figure 18:
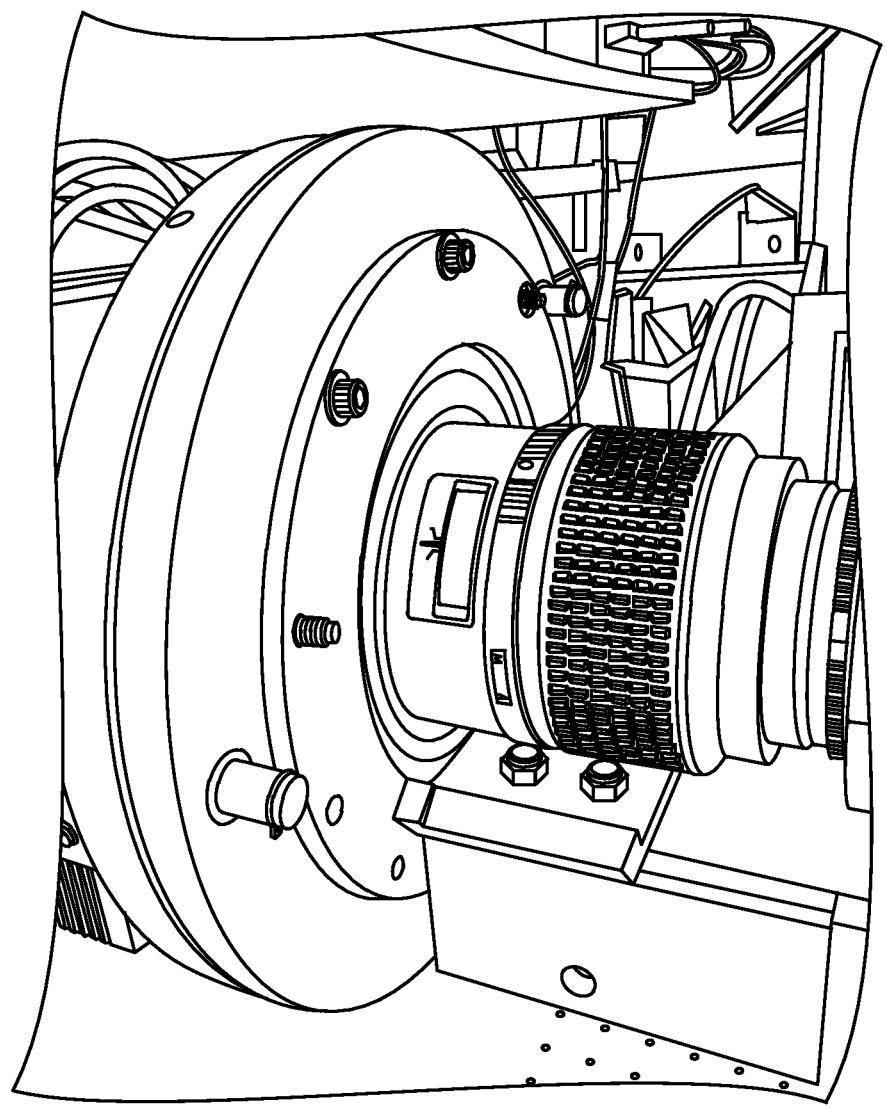
FIG. 18 is a photograph showing a 3D printed mount (blue) connecting the focuser and camera to the imaging lens and aluminum optical rail in an all-sky polarimeter.

Filter Wheel and Focuser Replacement. The internal filter wheel and focuser were replaced in 2013. A new mount had to be created to correctly position the focuser and camera with respect to the imaging lens and the aluminum rail holding the polarimeter's optical components (FIG. 18). The designed mount was initially created as a 3D print. The final mount was machined as an aluminum piece for strength and durability. FIG. 18 shows the 3D printed mount (blue).

Sun Occulter—Case Redesign

Figure 19:
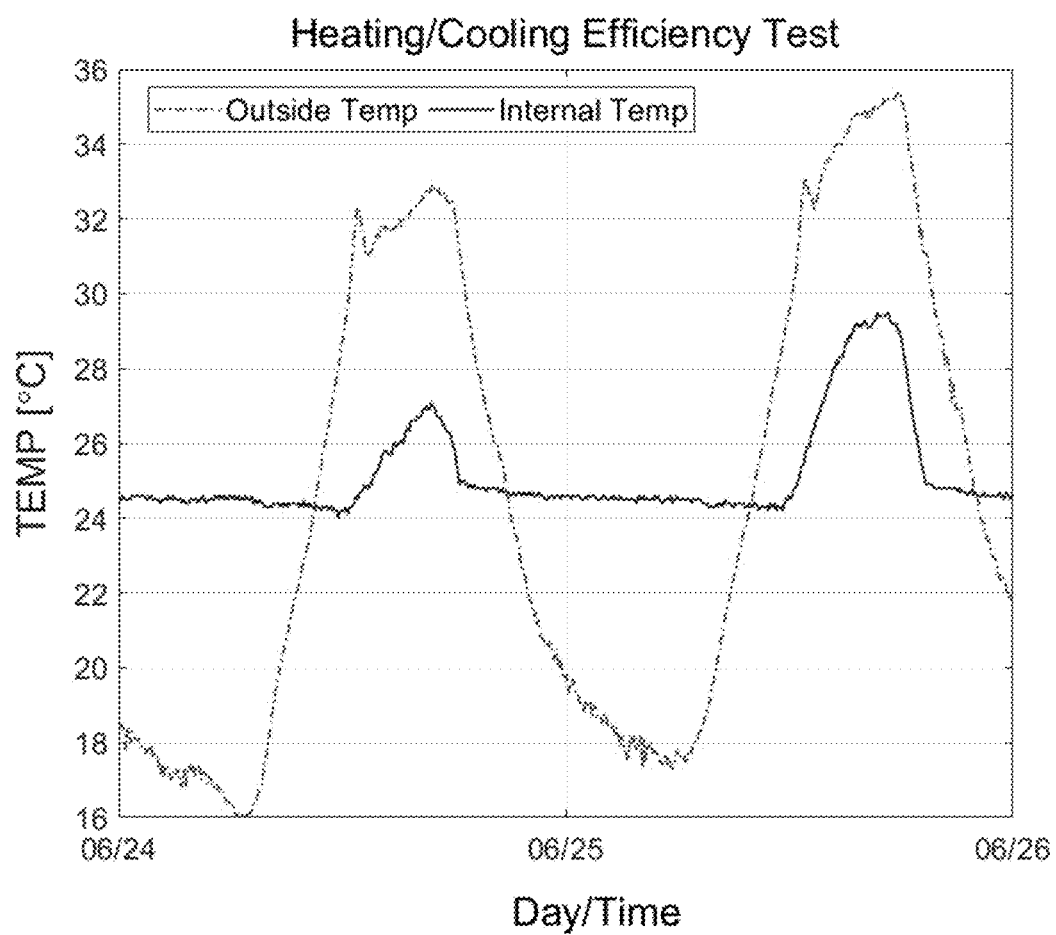
FIG. 19 is a plot showing internal temperature of a housing containing an all-sky polarimeter and the outside temperature measured during a two day test in June 2017.
Figure 20:
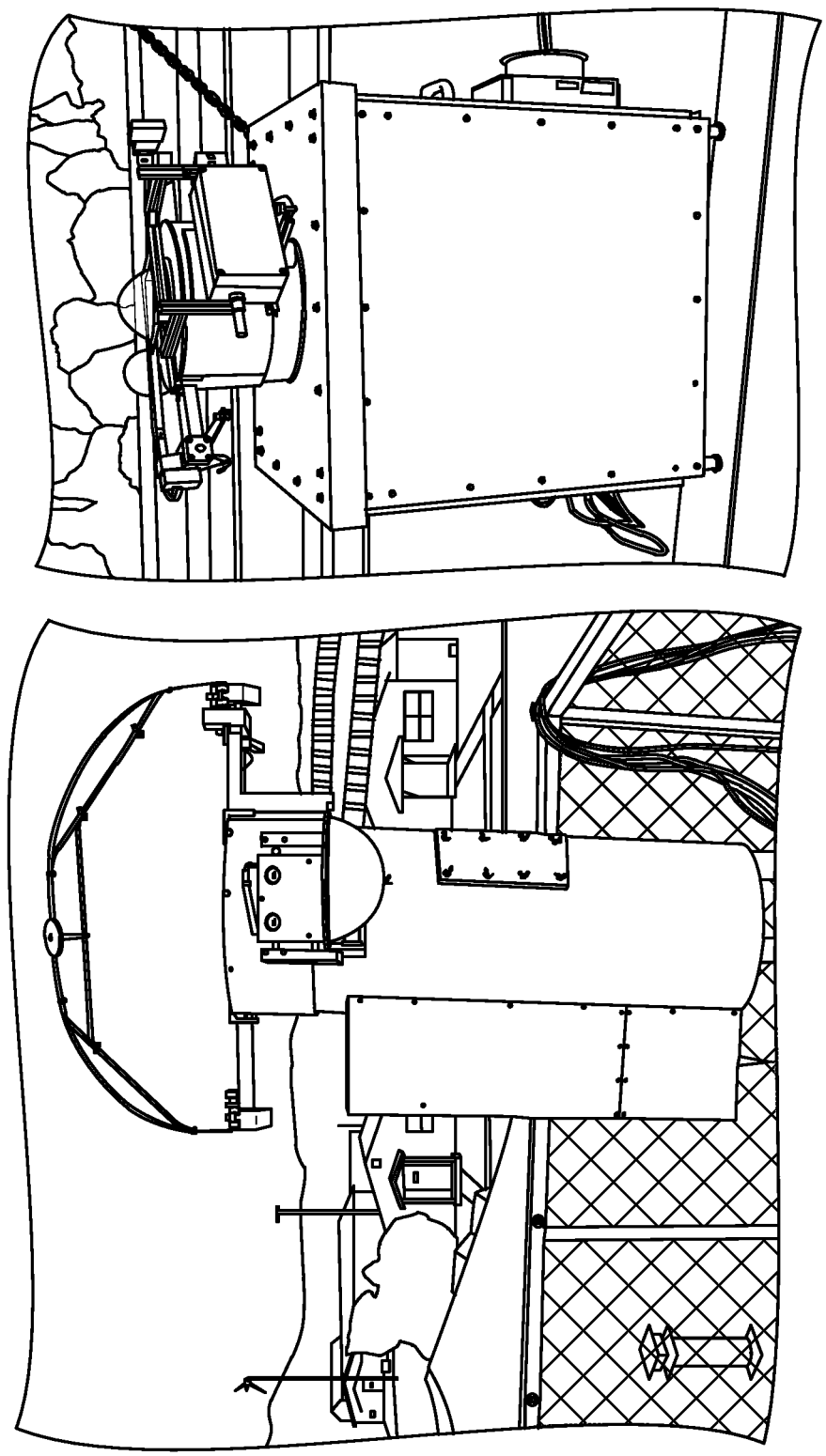
FIG. 20 are photographs showing an old LCVR all-sky polarimeter housing (left) and a new all-sky polarimeter housing (right).

To easily access the all-sky polarimeter and to run the all-sky polarimeter continually, the polarimeter's original tube housing was replaced with a new rectangular housing structure. This new housing included a removable panel on one side for easy access and new heating and cooling units to regulate the housing internal temperature. The original cable chain, which limited the azimuthal direction of the sun occulter, was replaced by an internal slip ring so the sun occulter could move 360°. A new housing structure was provided by upgrading the heating and cooling units and by updating the occulter code to work without the cable chain assembly. To test the new heating and cooling units, the polarimeter case temperature was studied under a variety of conditions; some tests were done inside of a solar simulator, and many others were conducted outdoors. The heaters were found to maintain the set temperature of 25° C. within the housing structure sufficiently well in cold weather; however, the coolers struggled to maintain the set temperature when the outside temperature was above approximately 30° C. This can be observed in FIG. 19 when the internal temperature of the housing containing the all-sky polarimeter rose above the set point temperature during a measurement in June of 2017. For the LCVRs to be operational and maintain calibration, the LCVR heaters needed to be maintained at an internal temperature of −40° C., which became difficult if the internal temperature of the housing dropped below 25° C.; therefore, as long as the heaters could maintain the set temperature, the cooling problems were not critical. Extra insulation improved the cooling efficiency, but an extra cooling element still needs to be added to the system to solve the issue completely. The previous and new housing can be viewed in FIG. 20.

Visible Three-Camera All-sky Polarimeters

Two separate all-sky polarimeter systems were built using three Nikon D700 cameras and three Sony α7s cameras, respectively. Both operate with standard red, green, and blue wavelength bands. Each camera is fitted with a fisheye lens and a linear polarizer to enable recording of polarized all-sky images. Neither the Nikon nor Sony system has yet been housed in a manner that would allow extended, unattended operation.

The visible three-camera Nikon all-sky polarimeter was initially designed to take measurements during the 2017 solar eclipse; however, it has also been used to detect cloud thermodynamic phase and it will be used to study sky polarization at night. This system is portable, robust, and easy to use. It is sensitive in low-light conditions and by using three DSLR cameras with polarization filters aligned to 0°, 60°, and 120°, simultaneous spectral and polarimetric image acquisition can be achieved.

An alternative system was also created using three mirrorless Sony α7s cameras. This system has an extended ISO sensitivity range beyond the performance of the Nikon cameras. Unless otherwise stated, the measurements presented in the following sections were made with the Nikon cameras. Camera characterization and calibration measurements are provided in this chapter for the Nikon system only.

Three-Camera All-Sky Polarimeter Design

Three cameras, each equipped with 180° field-of-view circular fisheye lenses (SIGMA 8 mm, F3.5, EX DG, Nikon F mount) and each containing a fixed linear polarizer orientated at 0°, 60°, or 120°, establish the visible three-camera all-sky polarimeters. The polarizer angles were selected to achieve good signal-to-noise ratio for all linear polarization elements in the recovered 3-element Stokes vector. The DoLP and AoP at each pixel of the all-sky images were calculated from the linear Stokes parameters, $$S_0 = \frac{2}{3}(I_{0°} + I_{60°} + I_{120°}), \tag{14}$$

$$S_1 = \frac{2}{3}[(I_{0°} - I_{60°}) + (I_{0°} - I_{60°})], \tag{15}$$

$$S_2 = \frac{2}{\sqrt{3}}(I_{0°} - I_{60°}) \tag{16}$$

corresponding to the polarizers oriented at 0°, 60°, and 120° relative to the camera axis (the polarizers were mounted at the back of the fisheye lens in each camera). The orientation of the reference axis is aligned perpendicular to the top and bottom axis of the camera.

Figure 21:
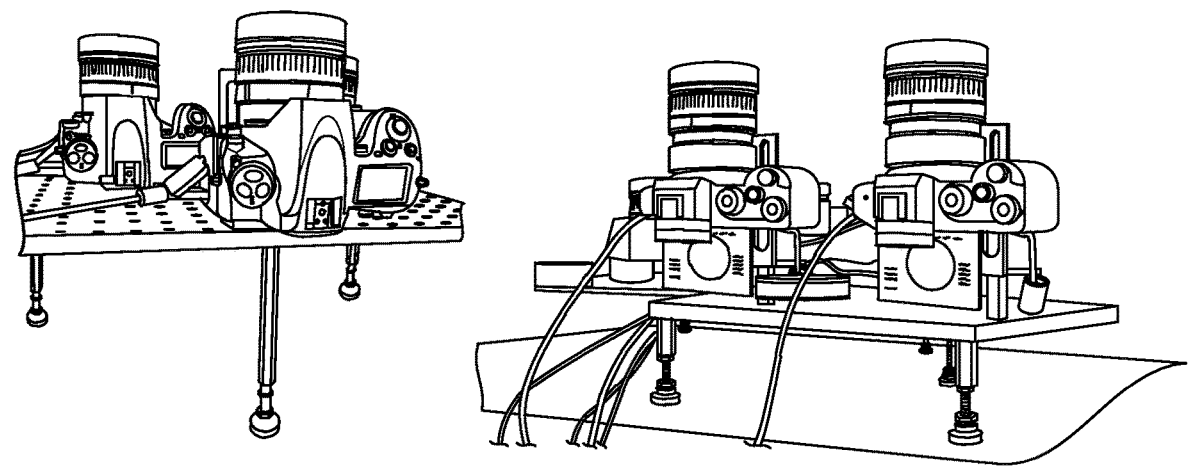
FIG. 21 are photographs showing a Nikon D700 three-camera all-sky polarization imaging system (left) and a Sony α7s 3-camera all-sky polarization imaging system (right).

Details for each camera are given in Table 2. Besides having good day-to-night sensitivity, these polarimetric systems could be controlled remotely by a computer as well as a manual trigger, allowing us to simultaneously trigger each camera with or without the computer. The camera systems can be seen in FIG. 21. For the Sony camera, we used an adapter (VELLO LAE-SE-NF, version 4) to couple the Nikon-mount fisheye lens to the E-mount on the Sony cameras.

TABLE 2

| Camera Comparison | Nikon D700 | Sony a7S |
| --- | --- | --- |
| Camera Type | DSLR | Mirrorless |
| Image Sensor Type | CMOS | CMOS |
| Sensor Size (mm) | 36.0 × 23.9 | 35.8 × 23.9 |
| Effective Pixels (Megapixels) | 12.1 | 12.2 |
| Total Pixels (Megapixels) | 12.9 | 12.4 |
| Bit Depth | 12 or 14 Bit | 14 Bit |
| Max Resolution | 4256 × 2832 | 4240 × 2832 |
| ISO Sensitivity | 200-6400 | 50-409600 |
| Shutter Speed Sensitivity (seconds) | 1/8000-30 | 1/8000-30 |
| Storage Media | Compact Flash | SD |
| GPS | Yes | No |
| Time with Seconds | Yes | No |
| Exposure Bracketing | Yes | Yes |
| Remote Control | Yes | Yes |
| Operating Temperature Range (° F.) | 32 to 104 | 32 to 104 |
| Lens Mount | F | E |

Camera Characterization

Figure 22:
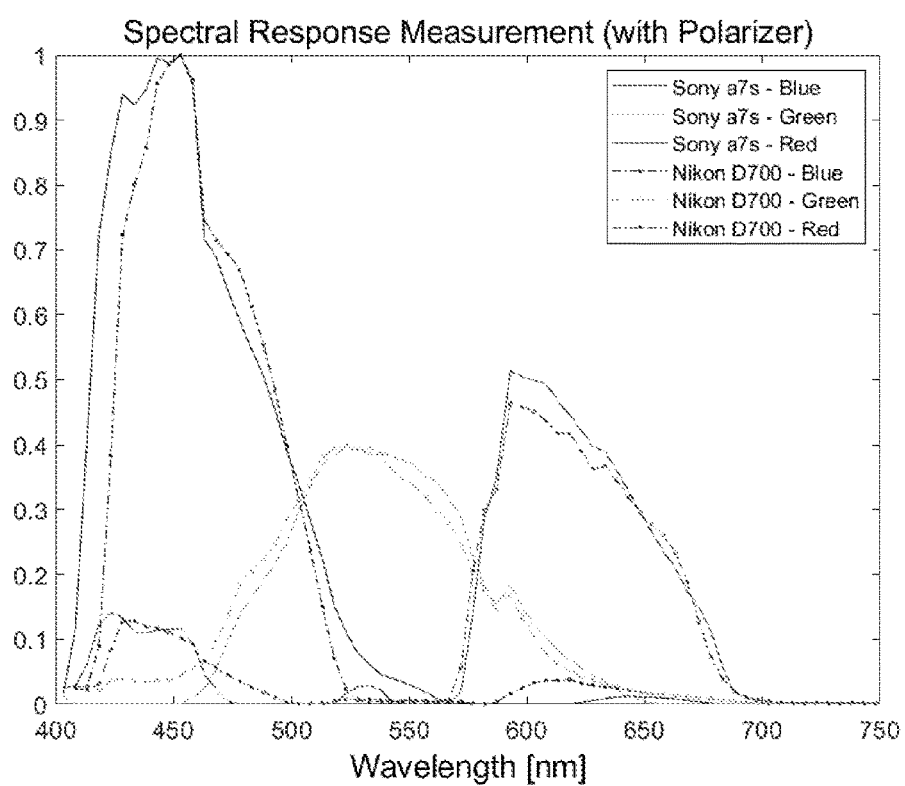
FIG. 22 is a plot of the relative spectral responses of the Sony α7s and the Nikon D700 cameras, with images recorded at an ISO setting of 50 and 100 for the Sony and Nikon cameras, respectively. The exposure time for both cameras was set to 1/8000 seconds. The monochromator was swept in 5-nm intervals.

To quantitatively interpret the images recorded in the red, green, and blue channels (so that we could compare our measurements with radiative transfer simulations and perform a radiometric calibration), the relative spectral response (RSR) of the Sony α7s and Nikon D700 cameras was measured using a tunable monochromator light source. RSR measurements were made with a polarizer inserted between the camera and fisheye lens. For each image, the brightness of each channel was expressed in digital number (DN), proportional to the image irradiance. For each wavelength in the monochromator sweep, we averaged pixels within the center region of the monochromator window and divided this average value by the power in the monochromator output beam (measured with an optical power meter). This process resulted in a relative response curve (sampled at 5-nm intervals) that accounted for the spectral variation in the lamp output. Each set of measurements was normalized to its peak value. FIG. 22 shows the RSR function for the RGB channels, each normalized to its maximum value. Images were recorded at ⅛₀₀₀ s exposure time for both cameras, at ISO 50 for the Sony α7s and ISO 100 for the Nikon D700 (the lens aperture was wide open at f/3.5 for all measurements).

Figure 23:
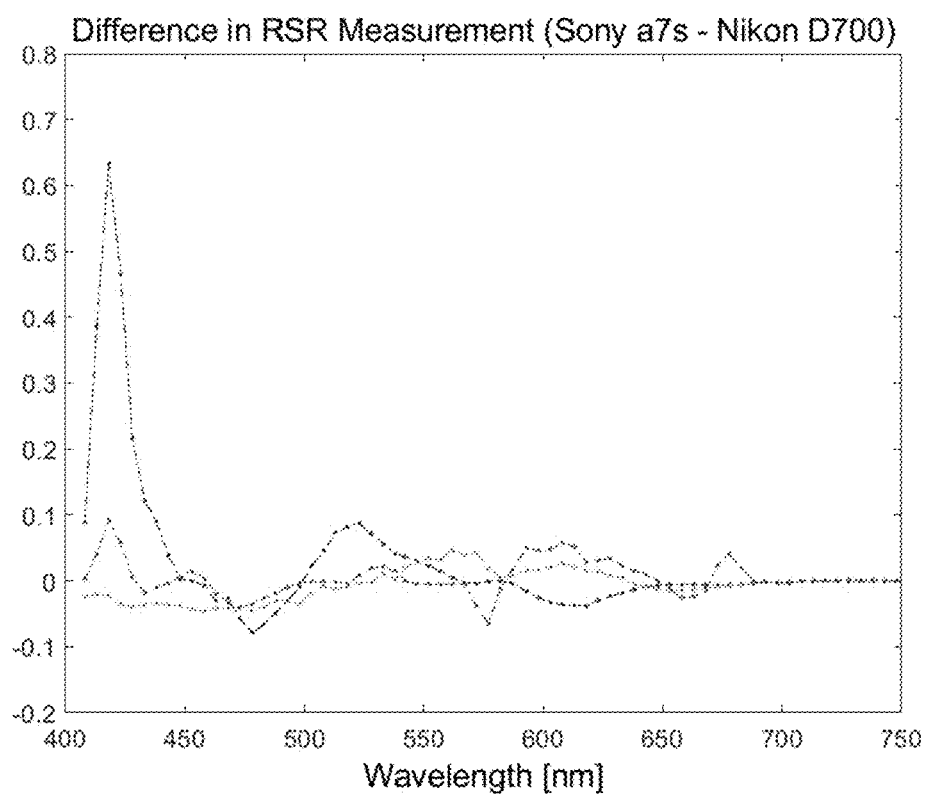
FIG. 23 is a plot of the relative spectral response (RSR) difference between the Sony α7s camera and the Nikon D700 camera, showing that at wavelengths higher than 450 nm, the two cameras had a maximum difference of approximately 0.1 between their measured RSRs.

For all conditions, the blue channel had about two times higher sensitivity than the red and green channels. There was also spectral channel crosstalk: the red channel exhibited a small sensitivity in the blue spectrum and the blue channel exhibited a similar small sensitivity in the red spectrum. The difference between the Nikon and Sony RSR functions can be viewed in FIG. 23. The maximum red, green, and blue peaks in the RSR measurements (FIG. 22) corresponded to approximately 450 nm, 530 nm, and 600 nm, respectively.

Pixel-Angle Relationship

Figure 24:
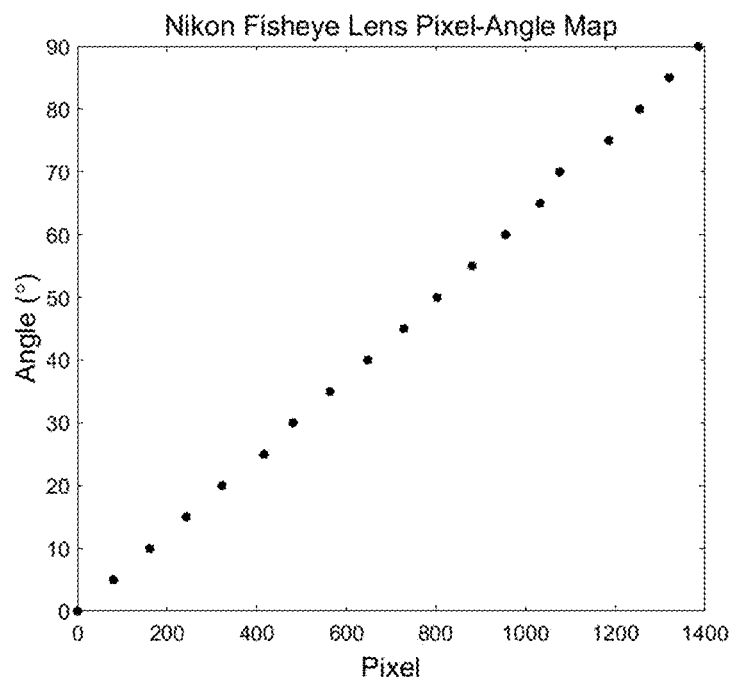
FIG. 24 is a pixel-angle map (from the center point of the lens) for a Sigma 8-mm, f/3.5 fisheye lens coupled with a linear polarizer to a Nikon D700 camera.

In addition to determining the RSR of each camera, we mapped the pixel-angle relationship for each system to enable calibration of the polarization effects of the fisheye lens. A fisheye lens bends incident light from a full 180° field-of-view onto a flat image plane, meaning that light incident on the horizon is rotated 90°, while light incident at the zenith is not. The amount of rotation can be determined by the zenith angle of the incident light. A mapping between the angle and the corresponding location on the image plane (expressed in pixels) can be found by taking an image of a physical checkerboard pattern. The pixel-angle relationship for the Nikon camera is given in FIG. 24. The angle relates to the measured distance from the camera to the center of the reference checkerboard and the measured distance from the center of the checkboard to a corresponding square. The pixel parameter in FIG. 24, relates to the number of pixels in the recorded image which correspond to the measured distance from the center of the checkboard to a corresponding square.

Figure 25:
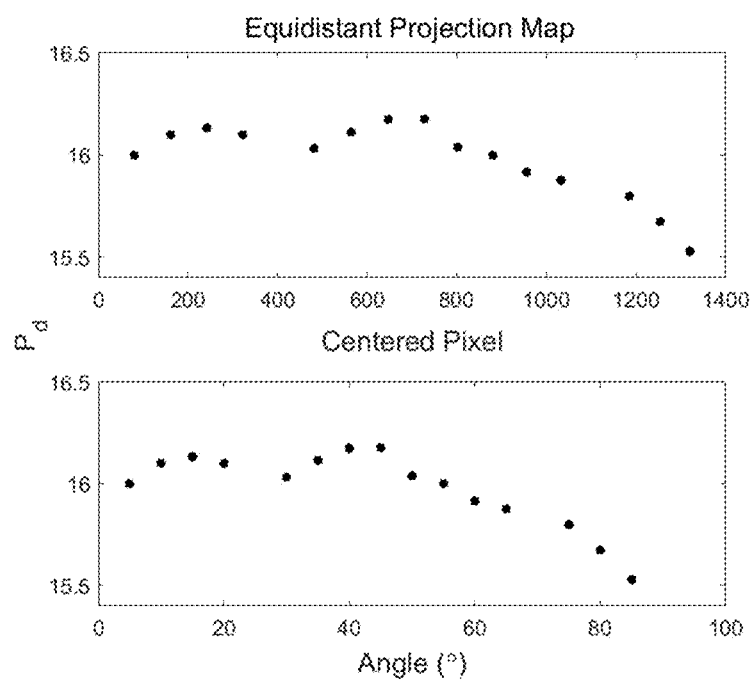
FIG. 25 are equidistant maps from the from the center point of the lens (Top) and angle (Bottom) for a Sigma 8-mm, f/3.5 fisheye lens coupled with a linear polarizer to a Nikon D700 camera.

The radial pixels from the center of the lens have an equidistant projection related to the pixel-angle map. A projection map relates distance in the image to a zenith angle and can be described by Equation 17, $$D = P_d \times \theta, \quad (17)$$

where D is the distance from the center of the image (in pixels), θ is the zenith angle of the incident light for an upward-viewing fisheye lens, and $P_d$ is a factor that relates the two. This projection must be known in order to rotate pixels between reference frames and to properly compare all-sky images to polarized radiative transfer models. FIG. 25 represents the equidistant projection map for the Nikon cameras.

Radiometric Calibration

Figure 26:
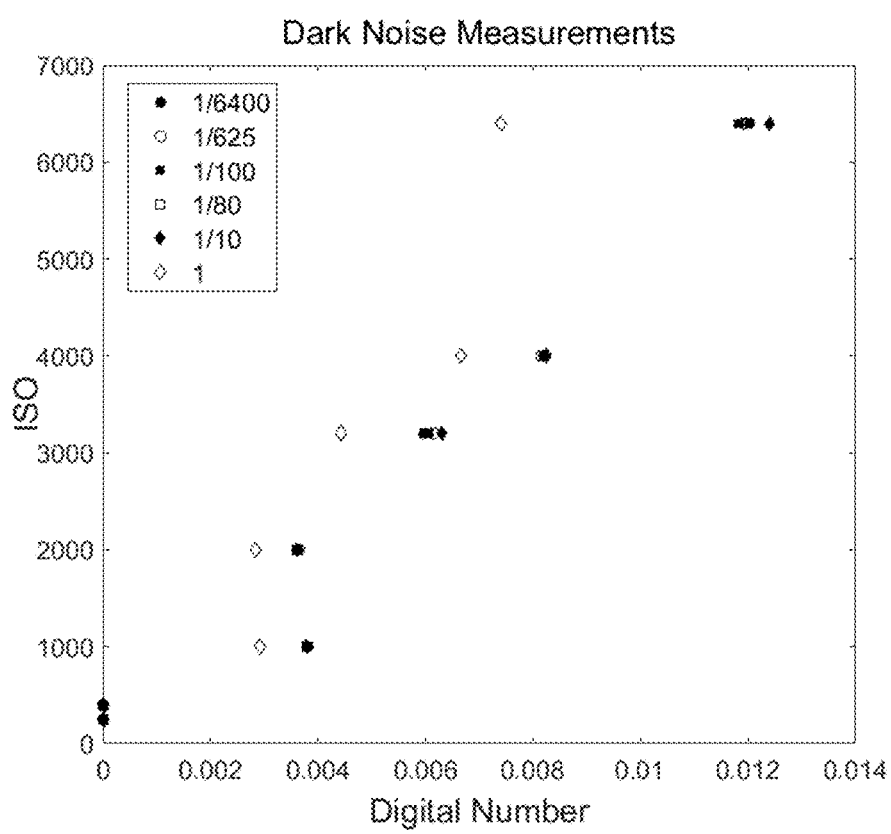
FIG. 26 is a plot of dark noise measurement from the Nikon D700 camera with an internal reference polarizer orientation of 0°. Similar measurements were observed for cameras with internal reference polarizer orientations of 60° and 120°. The legend corresponds to the exposure time in seconds.

Dark Noise. For each measurement, dark noise was subtracted from the measured image. For the Nikon cameras, dark noise was found to depend on both the ISO and exposure settings, as observed in FIG. 26. Generally, a low dark noise corresponded to low ISO settings. As the exposure time increased, the dark noise became slightly lower. The dark noise for each measurement was adjusted based on the ISO and exposure time. The measured values were converted to double-precision format scaled from 0 to 1, which is why decimal values are observed for digital number.

Figure 27:
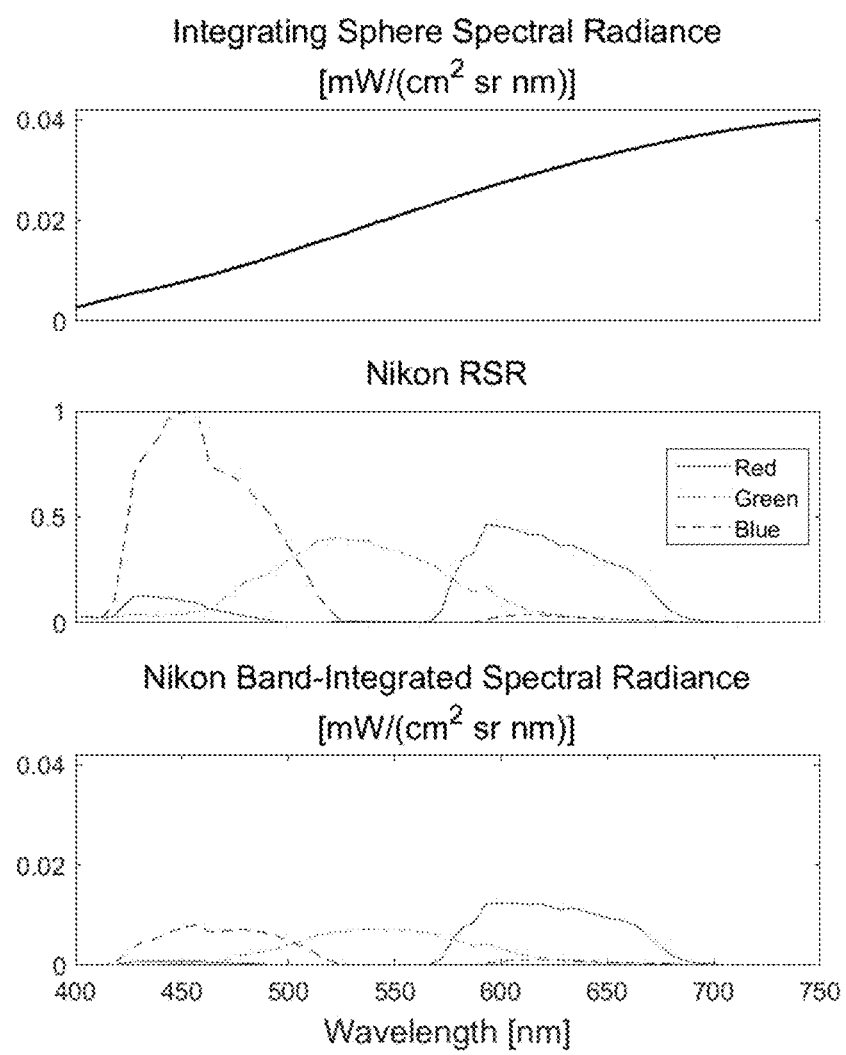
FIG. 27 are plots showing the spectral radiance from the integrating sphere (Top), which was multiplied by the Nikon RSR curves for each channel (Middle), to find the spectral band-integrated radiance for the red, green, and blue channels of the Nikon camera in units of mW/(cm$^2$ sr nm) (Bottom). The band-integrated radiance ($L_{VA=0}$) in units of mW/(cm$^2$ sr) was then found for each red, green, and blue channel to be 1.08, 0.76, and 0.62, respectively, by using the "trapz" function in Matlab to estimate the numerical spectral integral. The variable attenuator of the integrating sphere was fully opened at this measurement.

Digital Number Relationship to Radiance (Linear Radiance Calibration). A linear equation relating digital number (DN) to radiance was experimentally determined for each camera using a calibrated integrating sphere as a uniform and unpolarized source. This calibration was applied to all measurements after subtracting the dark noise. To create the linear calibration curve relating radiance and DN, the variable attenuator (VA) of the integrating sphere was adjusted from closed to open in equally spaced intervals. This corresponded to a change in the output current of the integrating sphere's calibrated optical detector. For each adjustment, the detected output current was then converted to a band-integrated radiance using Equation 18, $$L_{VA} = \frac{\text{amps}}{\text{amps\_factor}} \cdot L_{VA=0}, \quad (18)$$

where $L_{VA}$ is the measured band-integrated radiance corresponding to a specific variable attenuator position, and "amps" is the detector current measured at that specific position. The "amps_factor" relates to the detector current measured when the integrating sphere was calibrated at the factory and the VA was fully open (VA=0). $L_{VA=0}$ is the band-integrated radiance found when relating the spectral distribution of the camera to the radiance of the calibrated sphere. $L_{VA=0}$ was found by multiplying the RSR of the camera by the spectral radiance curve of the integrating sphere (FIG. 27). The band-integrated radiance ($L_{VA=0}$) in units of (mW cm$^{-2}$ sr$^{-1}$) was then found for each red, green, and blue channel to be 1.08, 0.76, and 0.62, respectively (for the wide-open variable aperture on the integrating sphere) by using the "trapz" function in Matlab to estimate the numerical spectral integral for each channel. Once found, the parameters $L_{VA=0}$ and "amps_factor" are assumed to not change within approximately 100 hours of calibration. The "amps_factor" and spectral output can be found in the integrating sphere's calibration report.

Figure 28:
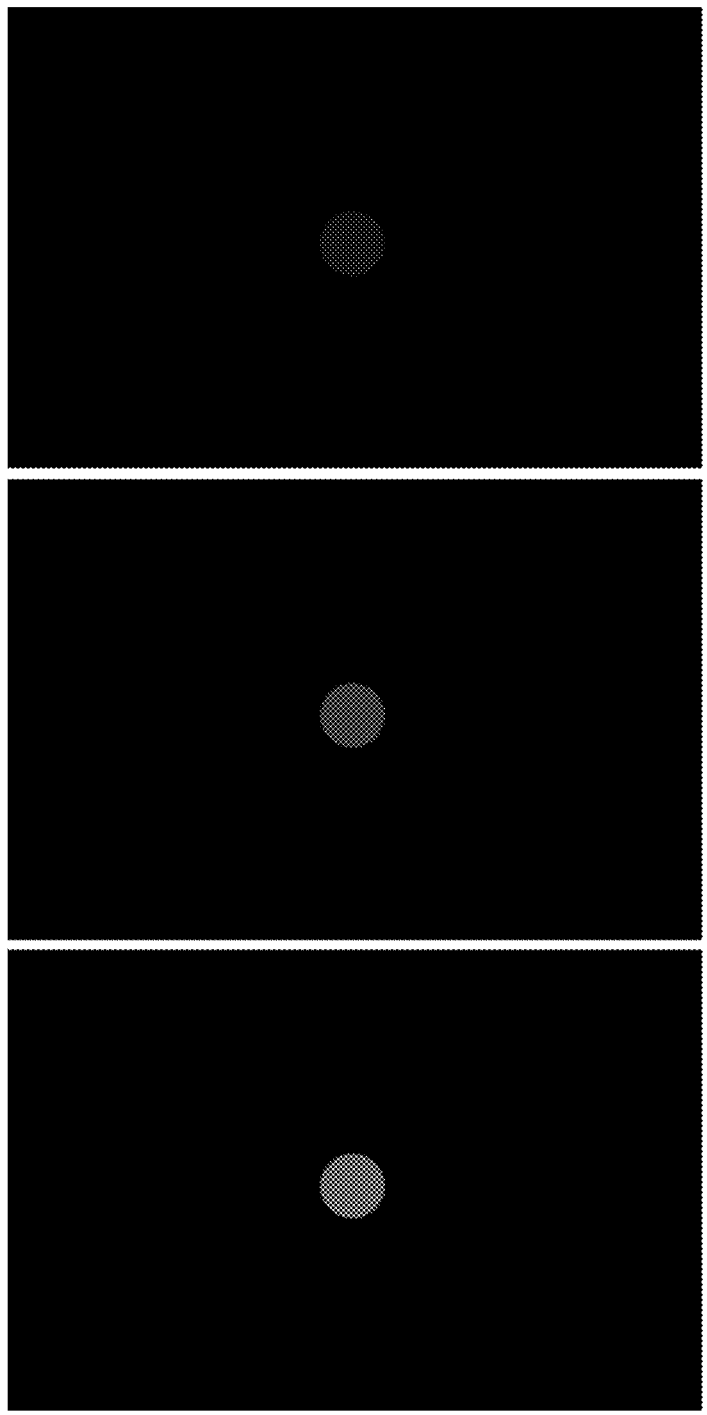
FIG. 28 are images from the Nikon D700 camera as the variable attenuator adjusted the integrating sphere's output current. To create a linear calibration, the center digital numbers (~400 pixels) were averaged and plotted against the band-integrated radiance in units of mW/(cm$^2$ sr), calculated using Eq. 18.
Figure 29:
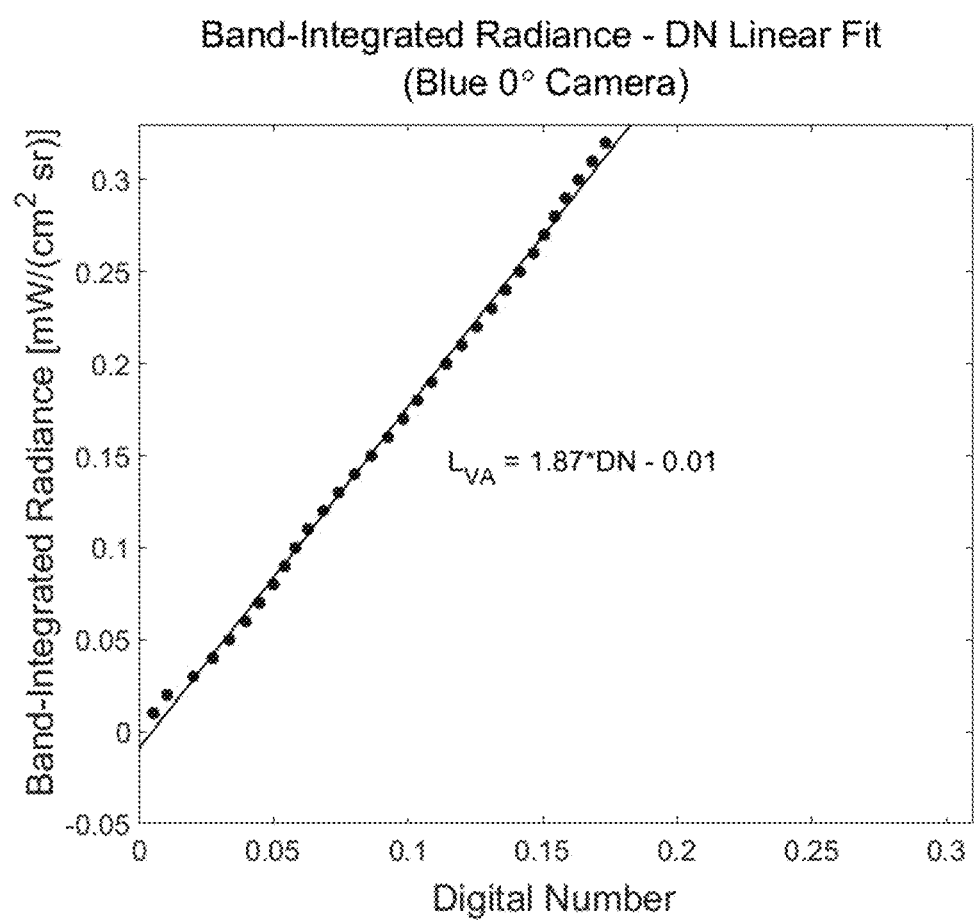
FIG. 29 is a plot of the radiometric linear calibration curve for the blue channel, 0° camera. A linear fit was applied to find the gain and offset coefficients, which were then used to relate the measured DN to band-integrated radiance (L). This process was done for each camera and each filter. The calibration coefficients can be found in Table 3.
Figure 30:
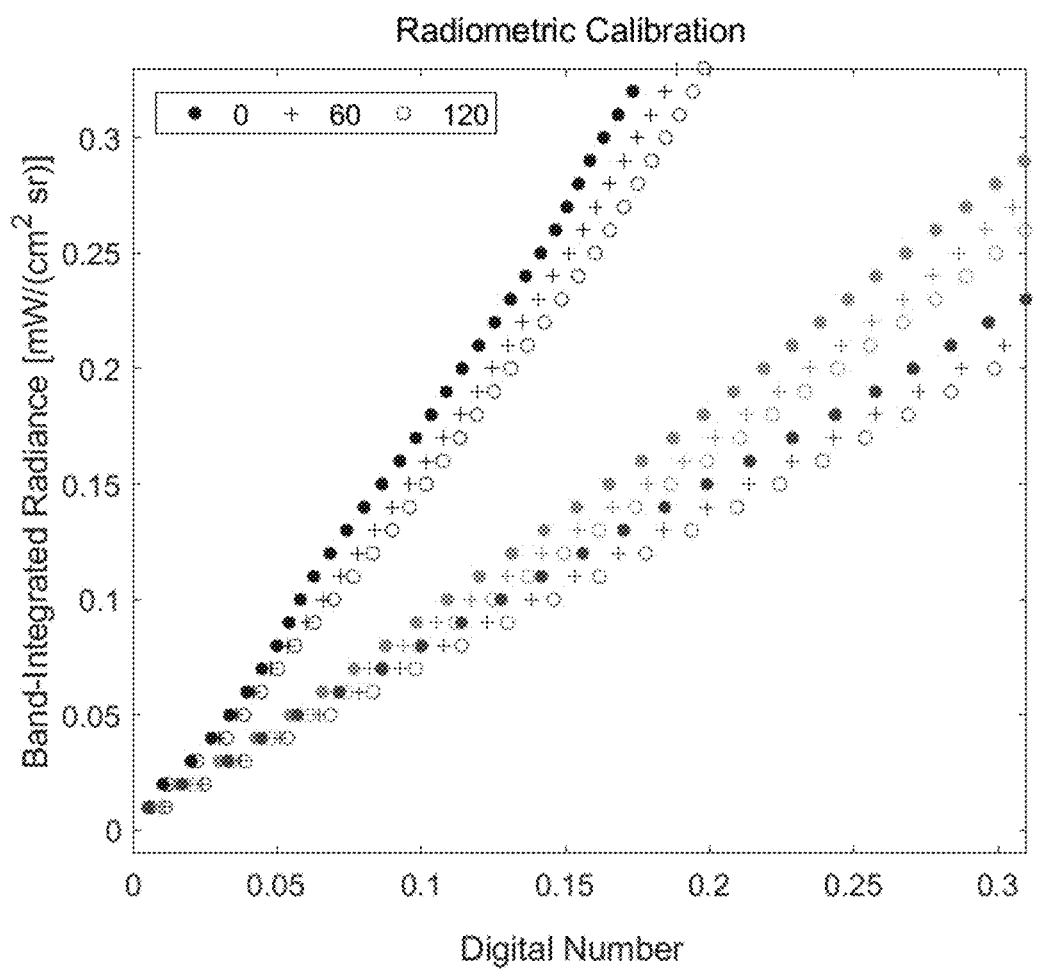
FIG. 30 is a plot of the linear radiometric calibration data for the red, green, and blue channels of the cameras and fisheye lenses with 0°, 60°, and 120° polarizers.

As the variable attenuator was changed for each measurement, an image of the integrating sphere's output was recorded and the band-integrated radiance ($L_{VA}$) for that specific VA position was calculated with the center pixels in the measured image averaged (~400 pixels). FIG. 28 shows a series of images as the position of the variable attenuator was changed. A linear fit between the calculated band-integrated radiances and corresponding measured digital numbers (DNs), at different variable attenuator positions was then found for each spectral channel of each camera. An example linear fit for the blue channel of the 0°-polarizer camera is shown in FIG. 29. The y-axis corresponds to the calculated band-integrated radiance in units of mW/(cm² sr) and the x-axis corresponds to the averaged DNs recorded in each measurement. Calibration coefficients (gain and offset) for all cameras and filters are given in Table 3. By using the slope (gain) and intercept (offset) from the linear fits, the measured DN was then converted to band-integrated radiance. FIG. 30 shows the averaged DNs of each measurement and the calculated band-integrated radiance in units of mW/(cm$^2$ sr) for each camera and filter as the variable attenuator was adjusted. Each camera was aligned so that the fisheye lens was centered with respect to the integrating sphere's port.

Table 3 shows the all-sky polarimeter radiometric calibration coefficients for each Nikon camera and filter.

TABLE 3

|  | Gain | | | Offset | | |
| --- | --- | --- | --- | --- | --- | --- |
|  | Red | Green | Blue | Red | Green | Blue |
| 0° Camera | 0.8442 | 0.9398 | 1.8698 | −0.0139 | −0.0019 | −0.0101 |
| 60° Camera | 0.8407 | 0.9191 | 1.7966 | −0.0171 | −0.0036 | −0.0120 |
| 120° Camera | 0.7787 | 0.8206 | 1.5726 | −0.0253 | −0.0061 | −0.0101 |

Figure 32:
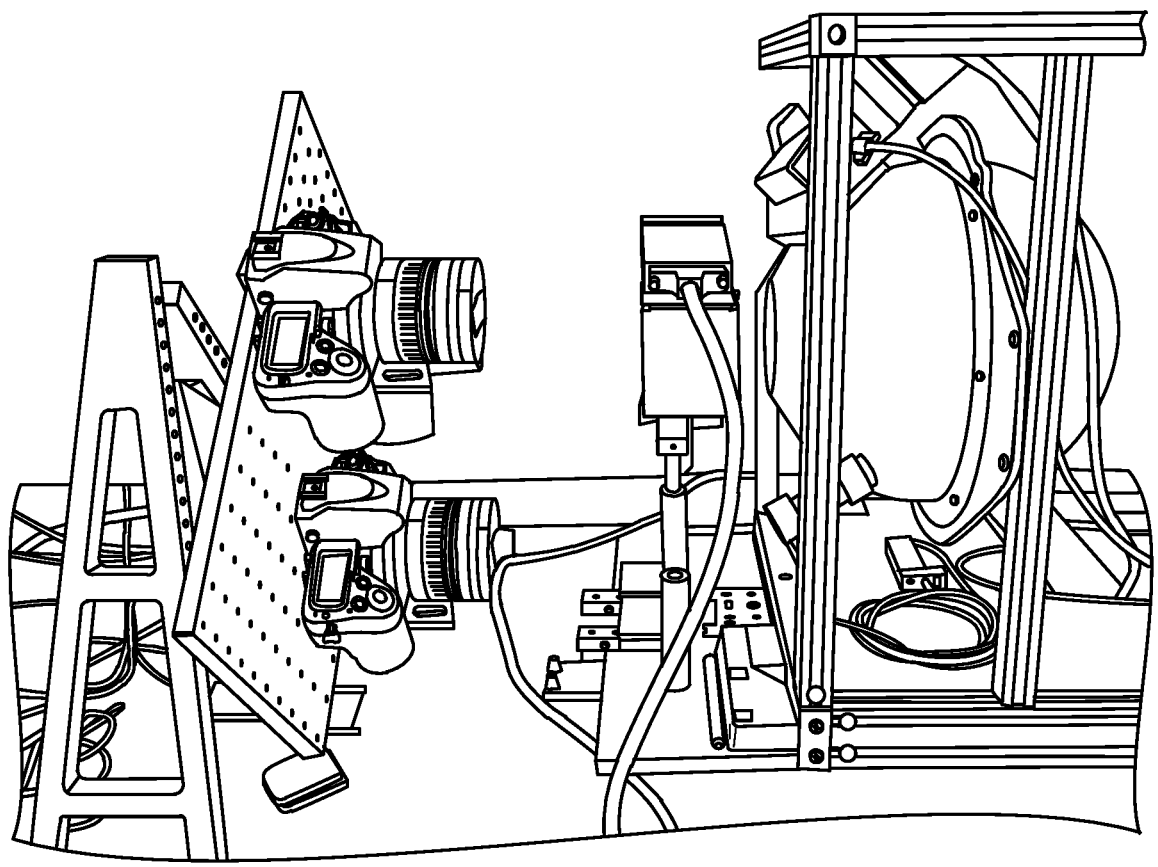
FIG. 32 is a photograph showing the polarimetric calibration setup. The three-camera Nikon all-sky polarimeter is on the left, with the integrating sphere on the right. The analyzing polarizer is located between the integrating sphere and the camera system.

Fisheye Calibration Methodology. A polarimetric calibration of the fisheye lens (for each pixel) was completed in piecewise angle steps following the methods presented in N. J. Pust and J. A. Shaw, "Dual-field imaging polarimeter using liquid crystal variable retarders," Appl. Opt. 45, 5470-5478 (2006), which describes the calibration process for the LCVR polarimeter. For the fisheye calibration, the integrating sphere and analyzing polarizer were placed on an optical breadboard that could be rotated about a fixed-axis as shown in FIG. 32. To build the calibrated piecewise image, the integrating sphere and analyzing polarizer were rotated about the center of the fisheye lens, while the polarimeter was physically rotated 0°, 45°, 90°, and 135° between each measurement. Unlike this single-camera polarimeter, the three-camera all-sky polarimeters each contained three separate cameras; therefore, the calibration process involved calibrating each individual camera separately to build the fisheye system matrix. A system matrix corresponding to each measurement location was created by recording images with each camera as the analyzing polarizer was rotated 0°, 60° and 120°, respectively. In Table 4, the camera and rotation angles are given for each cell of the individual system matrix. The measurements recorded with each camera correspond to a specific row in the raw system matrix.

Figure 31:
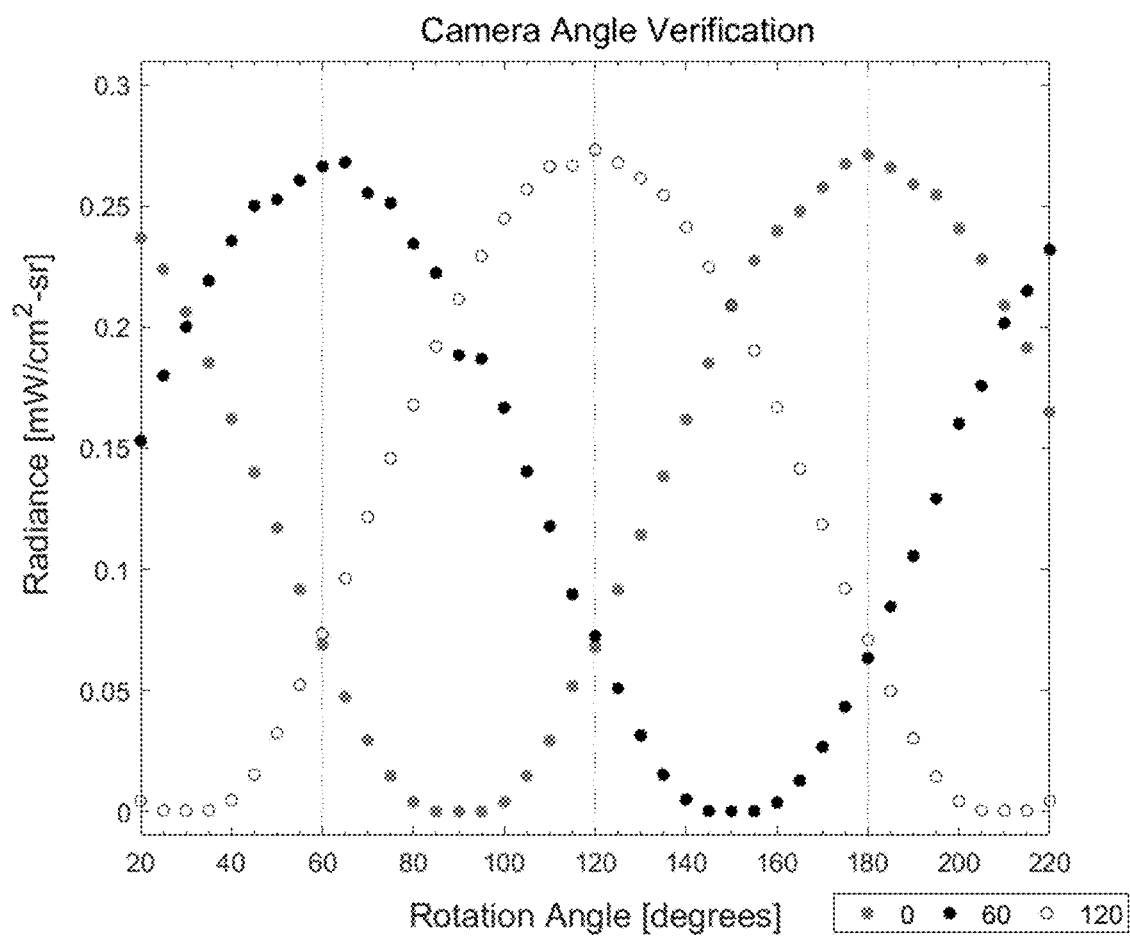
FIG. 31 is a plot showing the verification of the polarization orientation aligned in each camera.

Polarizer Alignment. At the back of each fisheye lens in the three-camera all-sky polarimeters, a high-quality 2.54-cm square linear polarizer was mounted with its transmission axis orientated at 0°, 60°, or 120° relative to a reference axis (the 0° polarizer was referenced perpendicular to the top-to-bottom axis of the camera). The polarizers were models: PC-100×100-VIS-0 and PC-100×100-VIS-60, from Meadowlark Optics and were precision cut at the factory to achieve the specified orientation. On the back side of the fisheye lens, there were four set screws used to hold the retaining plate surrounding the polarizers in place. A 10-cm-diameter rotating analyzing polarizer (Meadowlark Optics model: PC-109MM-VIS), placed between the camera being measured and the integrating sphere, was used to verify the position of each polarizer. In FIG. 31, the polarization orientations for each camera correspond to maximum radiance values at 180° (0°), 60°, and 120°, respectively, verifying the polarizers within each camera were correctly aligned. The measured values in FIG. 31 correspond to the radiance of the averaged center pixels in each measurement.

Table 4 shows the system matrix configuration. Each camera was used to build a separate row of the system matrix as the analyzing polarizer was rotated 0°, 60°, 120°, respectively. The matrix cells describe the camera and rotation angle of the analyzing polarizer. A full fisheye system matrix was created by piecing together each individual system matrix and interpolating between the data points.

TABLE 4

| 0° Camera, | 0° Camera, | 0° Camera, |
| --- | --- | --- |
| 0° Rot. Angle | 60° Rot. Angle | 120° Rot. Angle |
| 60° Camera, | 60° Camera, | 60° Camera, |
| 0° Rot. Angle | 60° Rot. Angle | 120° Rot. Angle |
| 120° Camera, | 120° Camera, | 120° Camera, |
| 0° Rot. Angle | 60° Rot. Angle | 120° Rot. Angle |

Figure 33:
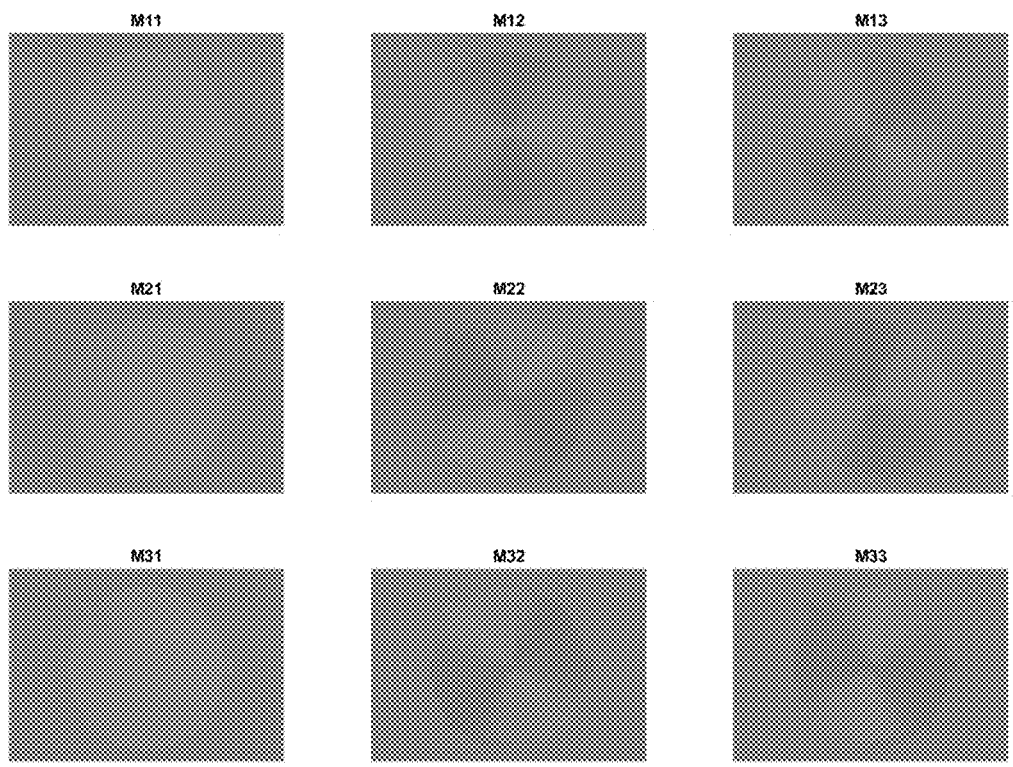
FIG. 33 shows the system Mueller matrix for the visible three-camera all-sky polarimeter (each pixel of these images represents the corresponding element of a Mueller matrix unique to that pixel).

It was important to align each camera with respect to the same position so that the overall field of view was consistent between each measurement. In post-processing, calibrated slices were created over the entire fisheye field of view. An interpolation was then applied between the slices to build the system Mueller matrix of the polarimeter, which is shown in FIG. 33. The Stokes vectors corresponding to 0°, 60°, and 120° are given in Table 5. Since we only had three linear polarizers, our system matrix was a 3×3 linear Mueller matrix, which did not include circular polarization. The maximum linear error of the Nikon system was observed to be ±4%. The maximum error of the LCVR system was ±1.1%. The larger error associated with the Nikon all-sky polarimeter most likely comes from the alignment during calibration.

TABLE 5

| Stokes Parameters at Specific Polarization Angles | | |
| --- | --- | --- |
| 0° | 60° | 120° |
| 1 | 1 | 1 |
| 1 | −0.5 | −0.5 |
| 0 | 0.866 | −0.866 |

Image Alignment

Figure 34:
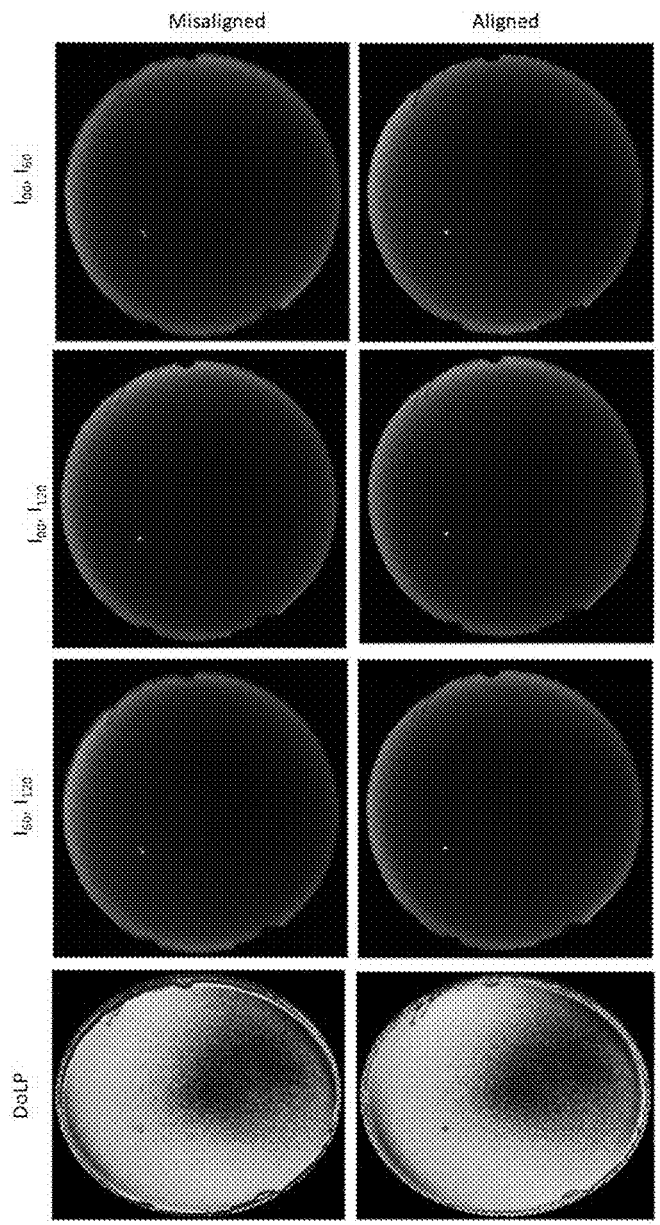
FIG. 34 are images taken with the three-camera all-sky polarimeter showing examples of spatially aligning the images. Misalignment images are shown on the left with aligned images on the right. $I_{00}$, $I_{60}$ represents aligning the image with the 0° reference to the image with the 60° reference.

For each measurement, the all-sky systems were leveled so that the focal plane of each camera was approximately perpendicular to the zenith plane. The pixel-to-tilt-angle error associated with the zenith alignment was found to be 10 pixels with an angle uncertainty of 0.01°. The detectors in this system were also spatially registered so that the field of view of the detector elements on each focal plane were well aligned. The images were aligned with respect to two points in the far-field using the Matlab functions "imtranslate" and "imrotate." In FIG. 34, misaligned and aligned examples are shown for the 2017 solar eclipse in Rexburg, Id. The DoLP in the aligned image corresponds to a minimum point at the sun, while the DoLP in the misaligned image has a distribution of skylight polarization at the sun. The misalignment is noticeable in the comparison images $I_{00}$, $I_{60}$, and $I_{60}$, $I_{120}$.

All-Sky Polarization Imaging of Cloud Thermodynamic Phase

A study that used measurements from the LCVR-based all-sky polarimeter for determining cloud thermodynamic phase is now described.

Background Summary

Knowing the cloud thermodynamic phase (if a cloud is composed of ice crystals or liquid droplets) is crucial for many cloud remote sensing measurements and can help in simulating and interpreting cloud radiation measurements to better understand the role of clouds in climate, weather, and optical propagation. Knobelspiesse et al. showed that for simulated zenith observations, the algebraic sign of the $S_1$ Stokes parameter (related to the difference between perpendicular and parallel linear polarization in the scattering plane) can be used to detect cloud thermodynamic phase when observed with a ground-based passive polarimeter. The solar scattering plane contains the directions of incident sunlight and scattered light. A positive or slightly negative $S_1$ value indicates a liquid cloud with linear polarization parallel to the scattering plane, while a more negative $S_1$ value indicates an ice cloud with linear polarization perpendicular to the scattering plane. They provided initial validation of simulation results using zenith-pointing, polarization-sensitive Cimel radiometers from the NASA Aerosol Robotic Network (AERONET).

The objective of this study was to detect cloud thermodynamic phase using a ground-based, all-sky imaging polarimeter following the same method. The Knobelspiesse et al. simulations suggested that the optimal measurement for cloud thermodynamic phase was not at the zenith, but in a direction in the solar principal plane approximately 55° from the sun. With our calibrated visible LCVR-based all-sky polarimeter operating in 10-nm-wide wavelength bands centered at 450 nm, 490 nm, 530 nm, 670 nm, and 780 nm, we were able to verify this. We were also able to verify this method using our visible three-camera Nikon all-sky polarimeter using the RGB channels. We detected ice, liquid, and multi-layered ice and liquid clouds using the measured $S_1$ Stokes parameter and we independently verified our results using dual-polarization lidar measurements at the zenith. Since we used all-sky polarization images from a multi-month campaign and did not focus solely on principal-plane measurements at the zenith, we found similarities and differences from what was described in their paper and we also observed similarities and differences between our two instruments. These will be addressed further in the results and discussion sections.

Dual-Polarization Lidar Overview

A dual-polarization lidar was used to validate zenith cloud thermodynamic phase measurements taken with the all-sky polarimeter. This lidar uses a liquid crystal variable retarder in the receiver to alternate between co-polarized and cross-polarized polarization states of the backscattered signal from alternate laser pulses at a rate of 30 pulses/s. The laser source is linearly polarized and the two received signals are either parallel (co-polarized) or orthogonal (cross-polarized) to the laser signal. The cross-polarization ratio (δ) was measured as a ratio of the cross-polarized and co-polarized signals. This ratio identifies the presence of ice crystals in the clouds since light scattered from polyhedral ice crystals has a significant fraction of cross-polarized light, while light singly scattered from water droplets does not.

Visible LCVR-Based All-Sky Polarimeter Measurements

Figure 35:
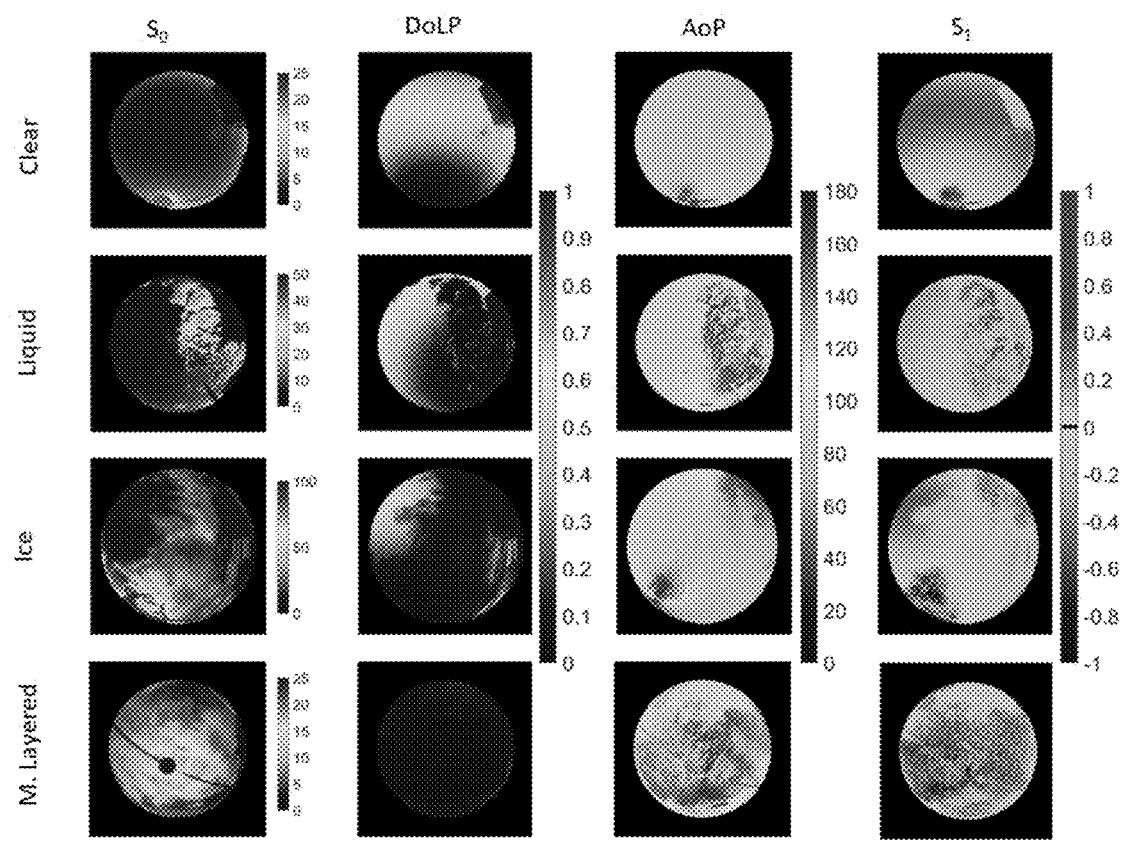
FIG. 35 shows visible LCVR-based all-sky polarimeter $S_0$, $S_1$, DoLP and AoP images referenced to the scattering plane. The measured $S_1$ values for the entire sky-dome indicate the presence of ice clouds on 25 Oct. 2016, a liquid cloud on 28 Aug. 2018, and multi-layered (ice and liquid) clouds on 5 Jul. 2016. The solar zenith angles for these measurements were 65.9°, 41.4°, 23.1°, and 58.4°, respectively. Generally, negative values of $S_1$ indicate ice and positive values of $S_1$ indicate liquid cloud phase. A clear-sky on 15 Feb. 2017 is representative of a Rayleigh atmosphere where positive values of $S_1$ indicate linear polarization parallel to the scattering plane and negative values of $S_1$ indicate linear polarization perpendicular to the scattering plane. For the all-sky images, the top of the image represents north and the right side of the image represents west. Measurements were recorded in Bozeman, Mont.
Figure 36:
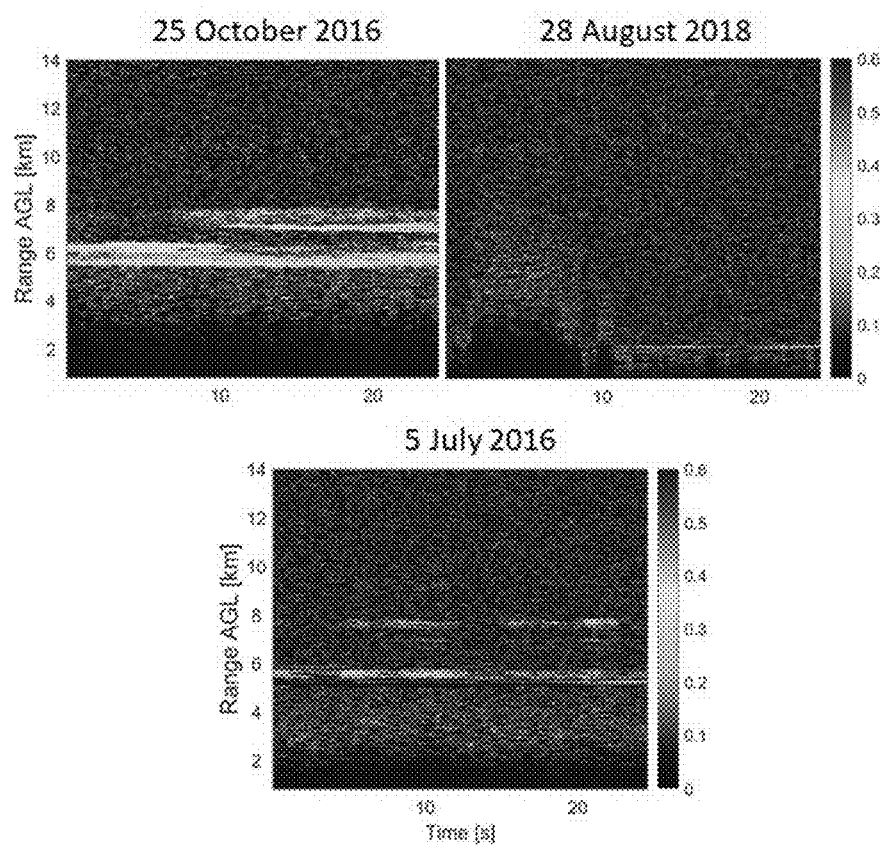
FIG. 36 shows dual-polarization lidar cross-polarization ratio measurements for 25 Oct. 2016 (ice), 28 Aug. 2018 (liquid), and 5 Jul. 2016 (multi-layered). Measurements were taken at the zenith with the lidar running simultaneously with the visible LCVR-based all-sky polarimeter. The range on the y-axis represents the height of the clouds in the sky with respect to ground level (AGL). The color bar scaling represents the cross-polarization ratio. A cross-polarization ratio above 0.08 represents ice, while a cross-polarization below 0.08 represents liquid. Ideally, the cross-polarization ratio should be approximately zero for liquid; however, multiple scattering within the cloud layers can cause the cross-polarization to be greater than zero.
Figure 37:
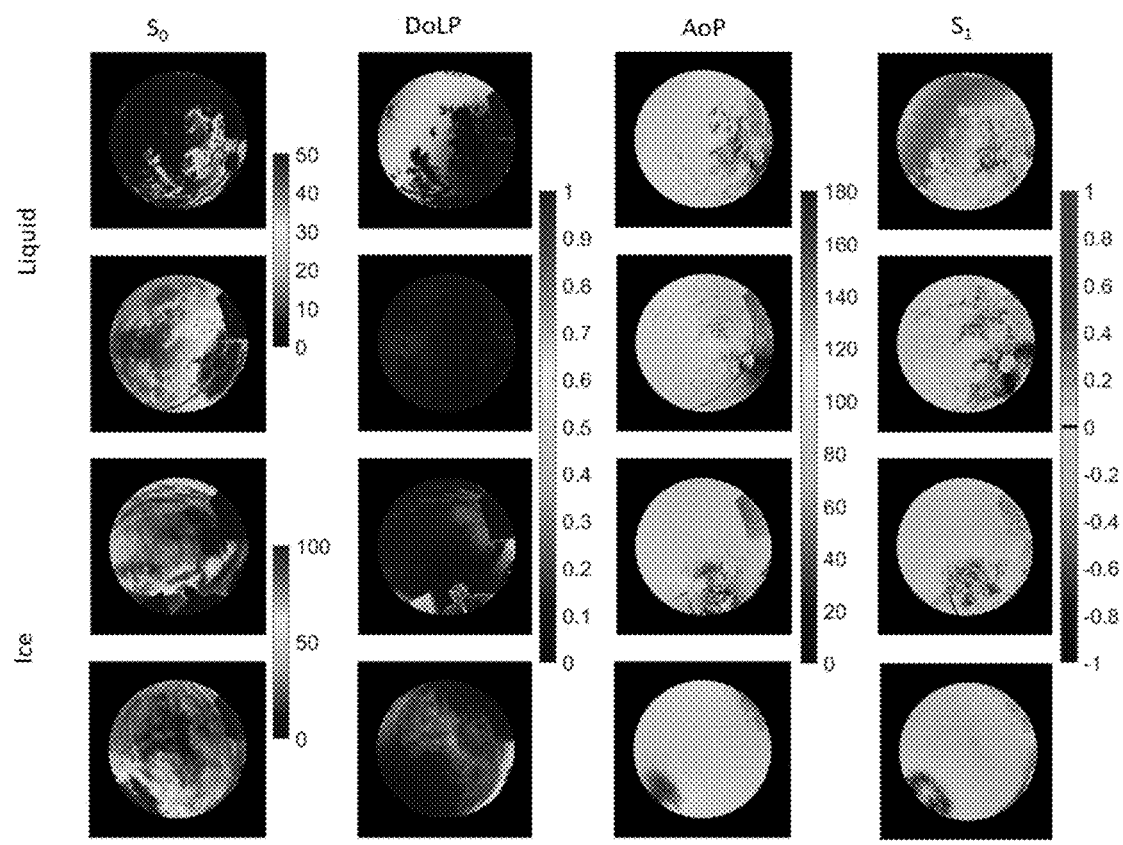
FIG. 37 shows visible LCVR-based all-sky polarimeter $S_0$, $S_1$, DoLP and AoP images referenced to the scattering plane. The measured $S_1$ values for the entire sky-dome indicate the presence of liquid clouds and ice clouds. Liquid clouds were observed on 20 Sep. 2018 (First Row) and 22 Aug. 2018 (Second Row) and ice clouds were observed on 28 Sep. 2018 (Third Row) and 7 Nov. 2016 (Fourth Row). The solar zenith angles for these measurements were 67°, 62°, 72°, and 50°, respectively. Generally, negative values of $S_1$ indicate ice and positive values of $S_1$ indicate liquid cloud phase. For the all-sky images, the top of the image represents north and the right side of the image represents west.
Figure 38:
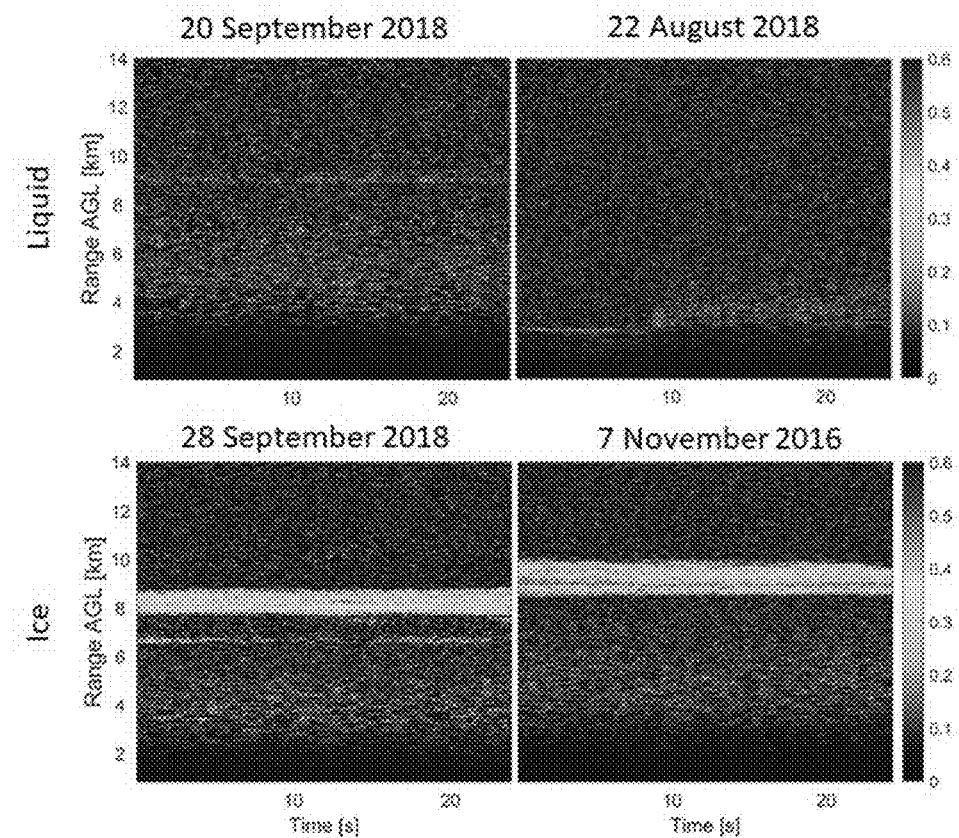
FIG. 38 shows dual-polarization lidar cross-polarization ratio measurements for 20 Sep. 2018 (liquid), 22 Aug. 2018 (liquid), 28 Sep. 2018 (ice), and 7 Nov. 2016 (ice). Measurements were taken at the zenith with the lidar running simultaneously with the visible LCVR-based all-sky polarimeter. The range on the y-axis represents the height of the clouds in the sky with respect to ground level (AGL). The color bar scaling represents the cross-polarization ratio. A cross-polarization ratio above 0.08 represents ice, while a cross-polarization below 0.08 represents liquid. Ideally, the cross-polarization ratio should be approximately zero for liquid; however, multiple scattering within the cloud layers can cause the cross-polarization to be greater than zero.

The visible LCVR-based all-sky polarimeter and dual-polarization lidar were operated together at times when ice, liquid, and multi-layered clouds were present throughout a multi-month period in Bozeman, Mont. Example images showing $S_0$, $S_1$, DoLP, and AoP measured at 530 nm are displayed in FIGS. 35 and 37 with corresponding lidar cross-polarization ratios given in FIGS. 36 and 38, respectively. In FIG. 35, examples of an ice cloud from 25 Oct. 2016, a liquid cloud from 28 Aug. 2018, multi-layered clouds from 5 Jul. 2016, and clear sky from 15 Feb. 2017 are shown. The solar zenith angles for these measurements were 65.9°, 41.4°, 23.1°, and 58.4°, respectively. In FIG. 37, examples of liquid clouds from 20 Sep. 2018 and 22 Aug. 2018 and ice clouds from 28 Sep. 2018 and 7 Nov. 2016 are shown. The solar zenith angles for these measurements were 67°, 62°, 72°, and 50°, respectively. The images are shown with the top of the image representing north and the right side of the image representing west, and with angles measured relative to the scattering plane.

Stokes $S_0$ and DoLP images were used to determine the presence of clouds. Cloudy pixels were identified by higher radiance values in the $S_0$ images or lower values in the DoLP images relative to the background sky because of multiple scattering within the cloud. However, because the AoP for ice clouds is aligned perpendicular to the scattering plane, the same as the clear sky, polarization angle alone is not a reliable indicator of clouds or cloud phase. The $S_1$ images, however, look significantly different for the different cloud types. Most importantly, in agreement with the theoretical predictions, the ice cloud in FIG. 35 produced negative $S_1$ values (average value=−0.056), while the liquid cloud produced positive values (average value=0.003). The multi-layered cloud in FIG. 35 showed positive $S_1$ values for the liquid clouds and negative $S_1$ values for the ice clouds seen through the gaps in the liquid clouds (average ice value=−0.016; average liquid value 0.001). In this figure, the ice clouds are identified by the negative $S_1$ values (corresponding to an AoP perpendicular to the scattering plane), while the liquid clouds are identified by the positive $S_1$ values (corresponding to an AoP parallel to the scattering plane). The background skylight in all cases was polarized perpendicular to the scattering plane. In the examples presented, notice that cloud phase can be observed in the entire image, not just at the zenith.

Zenith Measurements

Figure 39:
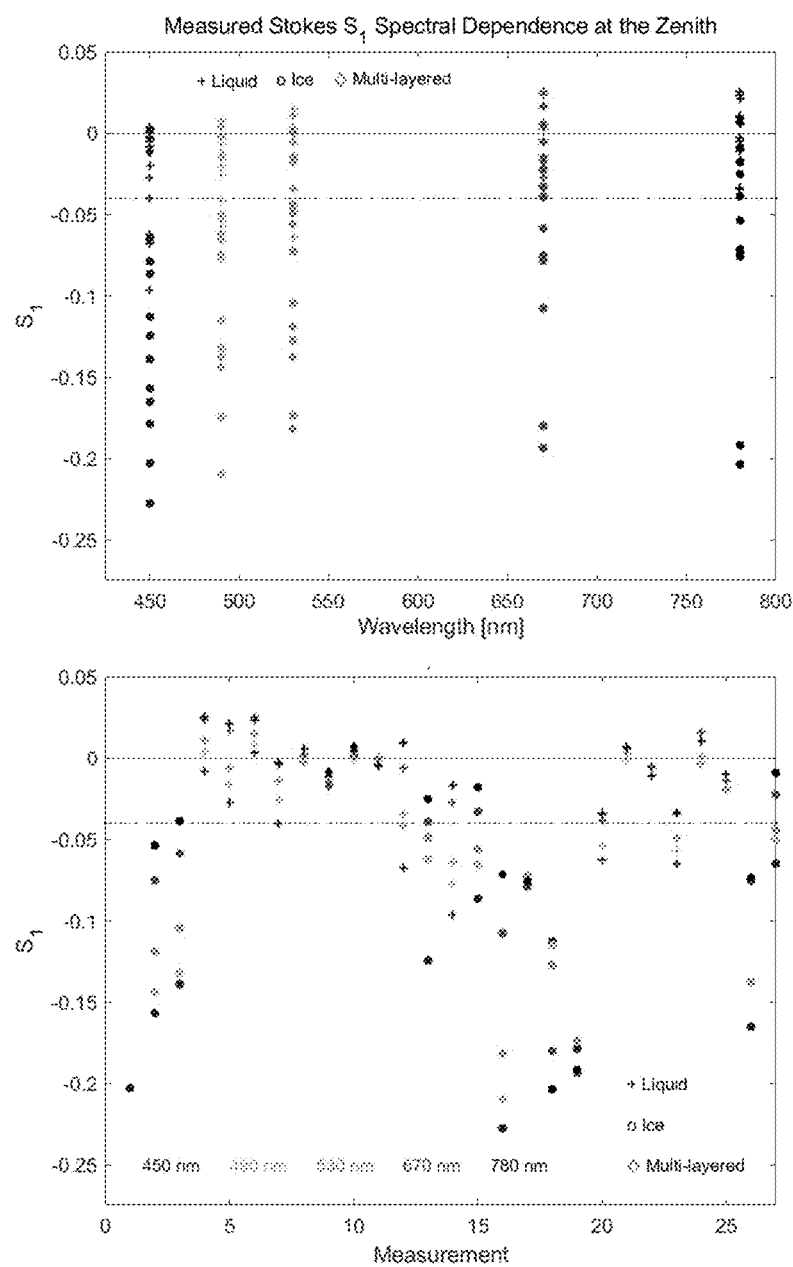
FIG. 39 are plots showing multi-wavelength all-sky polarimeter measurements validated with a dual-polarization lidar at the zenith. Liquid clouds are represented by the plus (+) symbols, ice clouds are represented by the unfilled circles (o), multi-phase clouds are represented by diamonds (♦). The 450, 490, 530, 670, and 780 nm measurements are represented by blue, cyan, green, red, and black colors, respectively. Ice clouds were generally found to have $S_1$ values less than −0.04 (dashed line) and liquid clouds tended to be both positive and slightly negative (at scattering angles larger than 60°).

A summary of 27 different zenith measurements at each all-sky polarimeter wavelength, validated with the dual-polarization lidar, are shown in FIG. 39, with corresponding data listed in Table 6. The listed $S_1$ parameters were calculated by masking a region of clouds near the zenith (in a cone of 5° radius) and by averaging the masked $S_1$ values for the cloud pixels. A mask of the cloud pixels was created by normalizing the $S_0$ image and selecting values greater than the background skylight. In Table 6, the zenith angles correspond to the scattering angles in the solar principal plane, similar to the simulations presented in Knobelspiesse et al. (the scattering angle is defined as the angle between the solar illumination direction and the scattered direction). The zenith angles in parentheses correspond to cloud pixels measured off-axis (i.e. not at the zenith) with the same cloud-identification procedure applied. A positive or slightly negative $S_1$ value theoretically indicates a liquid cloud, while a more negative value indicates an ice cloud. Accordingly, we measured negative $S_1$ values for ice clouds (verified at the zenith with the lidar) and both negative and positive values for verified liquid clouds. We detected cloud phase for multiple days with solar zenith angles ranging from 23° to 72°. Lidar validation measurements are presented in FIG. 40. A lidar cross-polarization ratio less than 0.08 indicates liquid, while a cross-polarization ratio greater than 0.08 indicates ice (the cross-polarization ratio for liquid phase should be approximately zero; however, multiple scattering can lead to cross-polarization ratios above zero). Notice that in FIG. 40 there is a clear separation between the verified liquid and ice $S_1$ values.

TABLE 6

| | | Solar Geometry | | Polarimeter ($S_1$) | | | | | Lidar | AERONET |
|---|---|---|---|---|---|---|---|---|---|---|
| | Date | Time | Ze | 450 nm | 490 nm | 530 nm | 670 nm | 780 nm | δ | AOD |
| | | | | | | 2016 | | | | |
| 1 | 0123 | 2101 | 68 | −0.202 | | | | | 0.47 | 0.20 |
| 2 | 0304 | 1953 | 52 | −0.156 | −0.143 | −0.119 | −0.075 | −0.053 | 0.40 | 0.19 |
| 3 | 0304 | 2024 | 53 | −0.139 | −0.132 | −0.104 | −0.058 | −0.038 | 0.40 | 0.08 |
| 4 | 0401 | 2056 | 45 | −0.008 | 0.003 | 0.010 | 0.023 | 0.025 | 0.03 | 0.03 |
| 5 | 0401 | 2115 | 47 | −0.027 | −0.016 | −0.006 | 0.016 | 0.021 | 0.02 | 0.07 |
| 6 | 0401 | 2150 | 51 (46) | 0.003 | 0.007 | 0.014 | 0.025 | 0.023 | 0.02 | 0.07 |
| 7 | 0401 | 2234 | 57 (50) | −0.040 | −0.026 | −0.014 | −0.004 | −0.003 | 0.02 | 0.02 |
| 8 | 0630 | 1811 | 27 | −0.002 | −0.001 | 0.001 | 0.002 | 0.005 | 0.03 | 0.36 |
| 9 | 0705 | 1941 | 23 | −0.011 | −0.014 | −0.016 | −0.017 | −0.009 | 0.39 | 0.66 |
| 10 | 0705 | 1941 | 23 | 0.001 | 0.004 | 0.001 | 0.004 | 0.006 | 0.02 | 0.66 |
| 11 | 0706 | 2016 | 25 | 0.000 | −0.001 | −7.2e−5 | −0.003 | −0.005 | 0.06 | 0.07 |
| 12 | 0902 | 1838 | 39 (73) | −0.067 | −0.041 | −0.034 | −0.005 | 0.009 | 0.03 | 0.21 |
| 13 | 1018 | 2158 | 67 | −0.125 | −0.062 | −0.049 | −0.039 | −0.025 | 0.40 | 0.01 |
| 14 | 1021 | 1607 | 70 | −0.096 | −0.077 | −0.064 | −0.027 | −0.016 | 0.03 | 0.36 |
| 15 | 1025 | 1649 | 66 | −0.086 | −0.065 | −0.056 | −0.033 | −0.017 | 0.41 | 0.04 |
| 16 | 1107 | 1629 | 72 | −0.227 | −0.209 | −0.181 | −0.107 | −0.071 | 0.34 | 0.17 |
| | | | | | | 2018 | | | | |
| 17 | 0731 | 1455 | 63 | −0.078 | −0.074 | −0.072 | −0.078 | −0.075 | 0.31 | 0.16 |
| 18 | 0803 | 1721 | 39 (73) | −0.112 | −0.115 | −0.127 | −0.180 | −0.203 | 0.11 | 0.47 |
| 19 | 0816 | 1525 | 59 | −0.178 | −0.174 | −0.173 | −0.193 | −0.191 | 0.18 | 0.24 |
| 20 | 0822 | 2232 | 62 | −0.062 | −0.053 | −0.034 | −0.038 | −0.033 | 0.04 | 0.47 |
| 21 | 0828 | 2059 | 41 (24) | 0.002 | −0.001 | 0.003 | 0.005 | 0.006 | 0.05 | 0.08 |
| 22 | 0830 | 2019 | 39 | −0.004 | −0.006 | −0.005 | −0.005 | −0.011 | 0.03 | 0.20 |
| 23 | 0919 | 1918 | 44 | −0.065 | −0.057 | −0.049 | −0.033 | −0.034 | 0.04 | 0.27 |
| 24 | 0920 | 1543 | 65 | −0.003 | −0.002 | 0.001 | 0.015 | 0.010 | 0.03 | 0.12 |
| 25 | 0920 | 2307 | 67 (20) | −0.020 | −0.020 | −0.018 | −0.013 | −0.009 | 0.02 | 0.10 |
| 26 | 0926 | 1735 | 52 | −0.165 | −0.137 | −0.137 | −0.075 | −0.073 | 0.33 | 0.08 |
| 27 | 0928 | 2012 | 50 | −0.064 | −0.050 | −0.044 | −0.022 | −0.009 | 0.32 | 0.07 |

In our observations shown in FIG. 39, clouds were generally more polarizing at shorter wavelengths for ice clouds and at longer wavelengths for liquid clouds, in agreement with the Knobelspiesse predictions. From FIG. 39, we determined a threshold of $S_1=-0.04$ to distinguish between zenith-validated liquid and ice clouds. An $S_1$ value greater than −0.04 indicates liquid phase, while a $S_1$ value less than −0.04 indicates ice phase.

Figure 41:
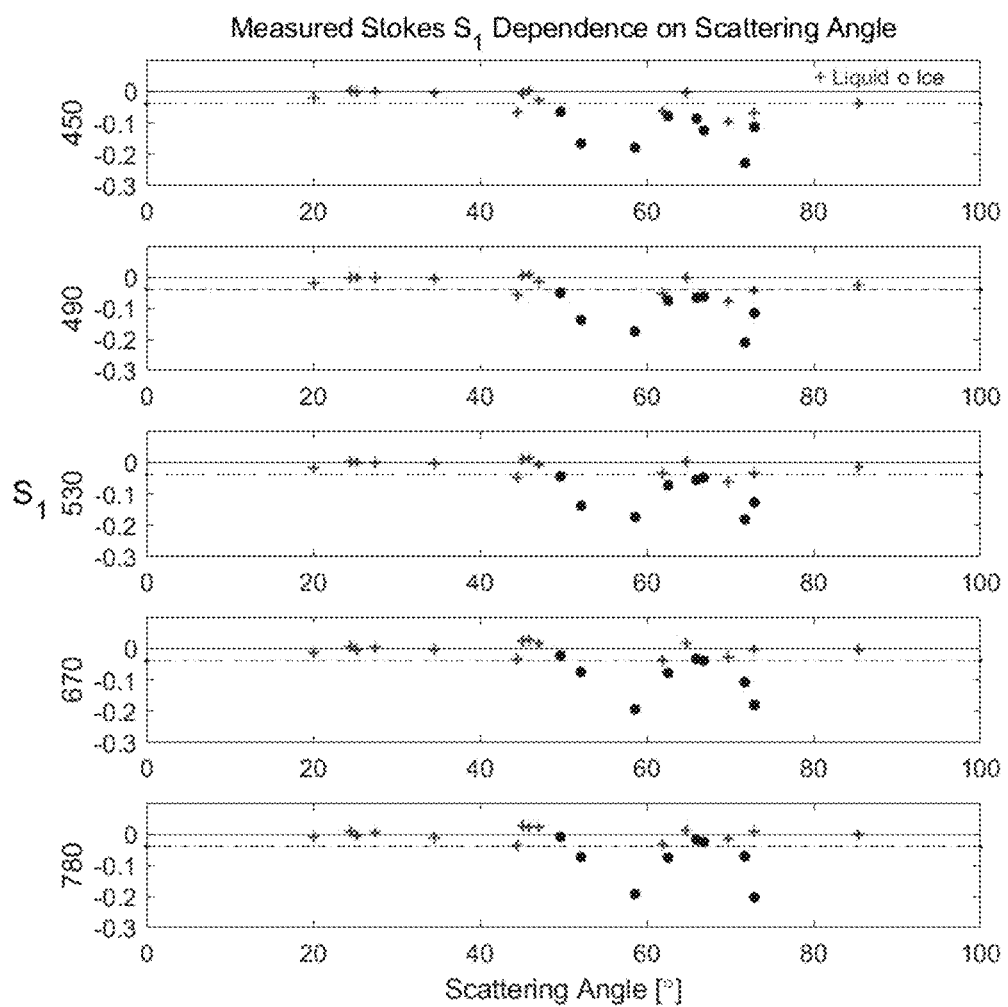
FIG. 41 are plots showing the observed relationship between the Stokes $S_1$ parameter in the scattering plane at the zenith and the corresponding scattering angle for each wavelength.

Polarimetric cloud phase determination was also observed to depend on scattering angle, especially for liquid clouds. The simulations of Knobelspiesse et al. showed that ice clouds could be detectable between scattering angles of approximately 10° and 150°, while liquid clouds could only be reliably detected between scattering angles of 10° and 70° (using the baseline that ice clouds are negative and liquid clouds are positive). For liquid clouds, measured $S_1$ values were greatest between scattering angles of 10° and 60°, as observed in FIG. 41, which shows the $S_1$ scattering angle dependence with wavelength (for measurements validated at the zenith). Our optimal scattering angle was observed to be closer to 45°, not 55° as predicted by Knobelspiesse. For scattering angles greater than 60°, the classification of liquid phase was observed to vary with wavelength. For clouds determined to be liquid with zenith lidar observations, $S_1$ measurements at 670 and 780 nm were greater than −0.04, while measurements at 450, 490, and 530 nm were less than −0.04. A diagonal threshold could also be used to enhance the detection of cloud phase at shorter wavelengths. In general, ice clouds could be determined reliably for scattering angles from 0° to beyond 70°. The scattering angle dependence for the measured pixels in the entire field of view will be discussed further in the All-Sky Measurement section.

Figure 42:
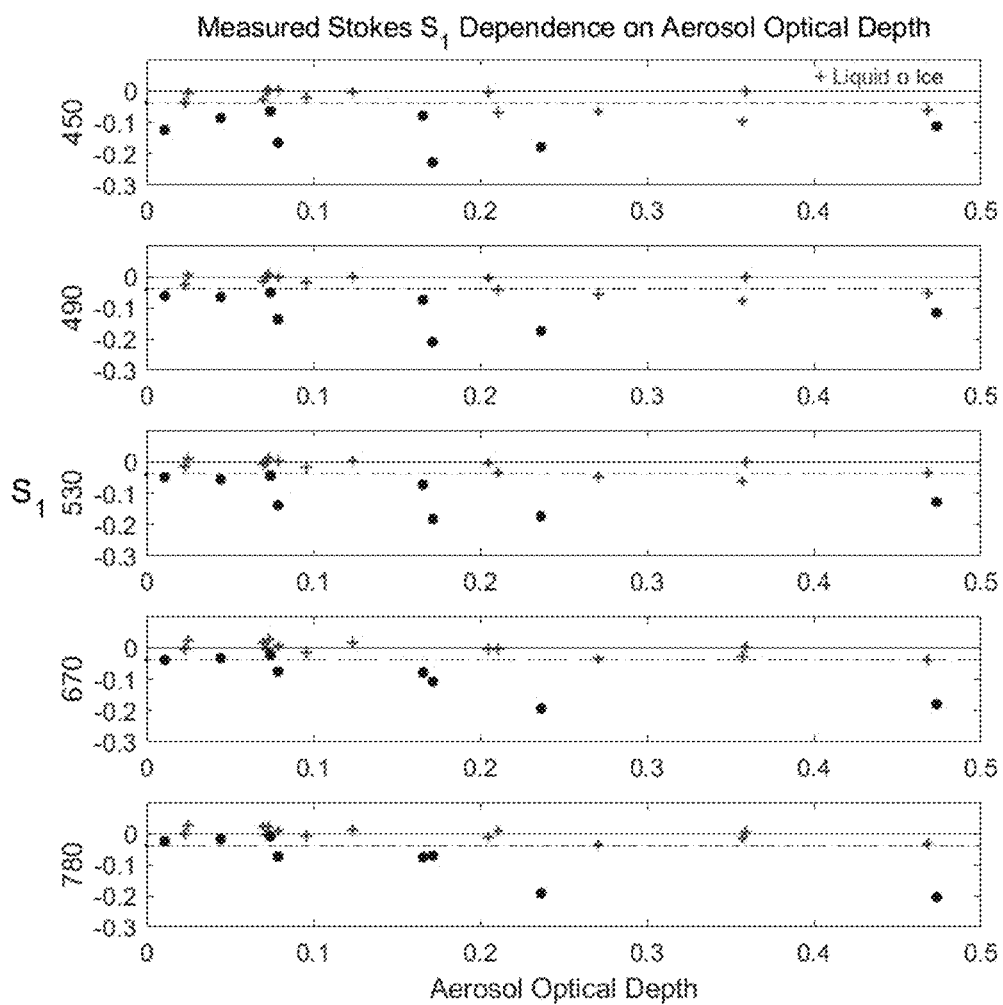
FIG. 42 are plots showing the observed relationship between the Stokes $S_1$ parameter in the scattering plane and the Aerosol Optical Depth (AOD) retrieved from AERONET for each wavelength. An observed switch in the spectral dependence was observed for ice clouds at AOD values greater than ~0.2. Below an AOD value of ~0.2, the $S_1$ value was greatest at shorter wavelengths. Above an AOD value of ~0.2, the $S_1$ value was greatest at longer wavelengths.

In FIG. 39, measurements 11, 18, and 19 were observed to have reverse wavelength dependence relative to the other measurements. Measurement 11 corresponds to verified liquid $S_1$ values, where measurements 18 and 19 correspond to verified ice $S_1$ values. These measurements were made on 6 Jul. 2016, 3 Aug. 2018, and 16 Aug. 2018, respectively. The liquid $S_1$ values in measurement 11 could suggest a minimum scattering angle needed to reliably detect liquid phase based on spectral measurements. In this case, the scattering angle was 25° and $S_1$ values were greatest at shorter wavelengths. In measurements 18 and 19 (made at scattering angles of 73° and 59°, respectively), the aerosol optical depth at 500-nm wavelength was 0.47 and 0.24, respectively, indicating the atmosphere was quite smoky. It seems likely that this spectral reversal arose because the smoke layer was selectively depolarizing the shorter-wavelength light scattered from the cloud above; however, an alternate idea to consider is that the smoke aerosols could have enhanced the long-wavelength polarization, as we recently observed at SWIR wavelengths for thick wildfire smoke, although in those previous observations the smoke only enhanced the polarization for wavelengths longer than 1 μm. The $S_1$ dependence on aerosol optical depth can be observed in FIG. 42.

All-Sky Measurements

Figure 43:
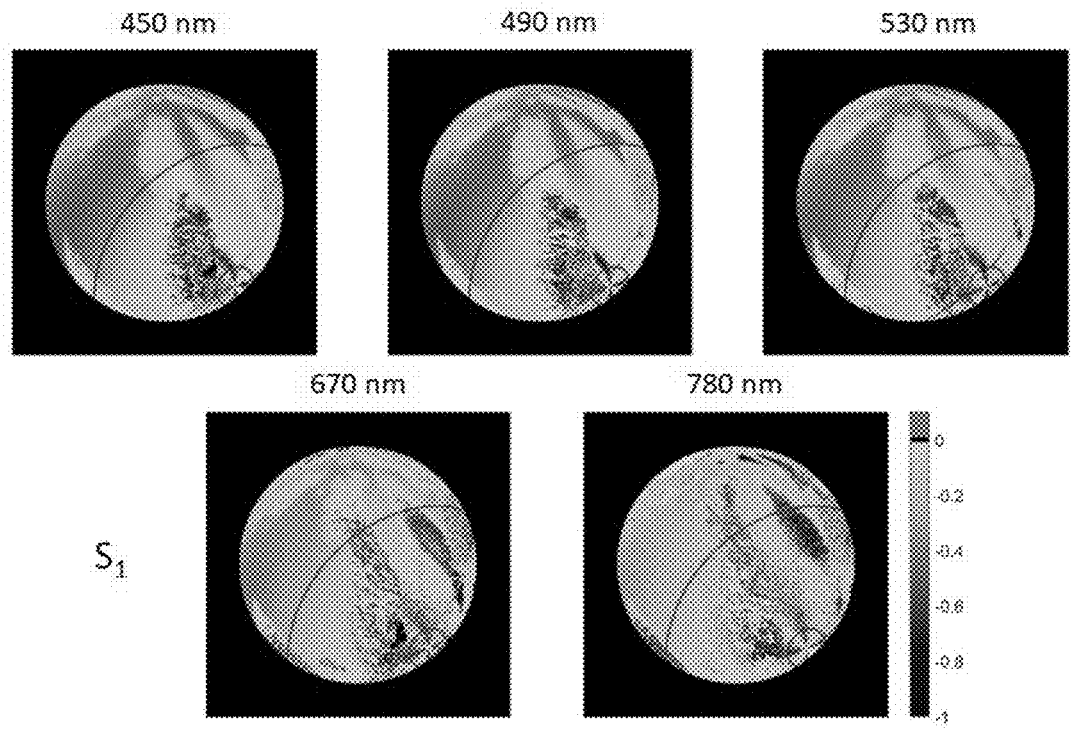
FIG. 43 are all-sky polarimeter images illustrating the observed variation with wavelength of the Stokes $S_1$ parameter expressed relative to the scattering plane for a liquid cloud on 1 Apr. 2016 for a solar zenith angle of 51°. Scattering angles of 10° and 70° are shown on the images with black lines.

In FIG. 43, all-sky images show the relationship between $S_1$ (referenced to the scattering plane) and scattering angle for the five polarimeter wavelengths in the entire sky-dome for a zenith-verified liquid example on 1 Apr. 2016. This multi-wavelength example shows liquid clouds having greater $S_1$ values and more of the cloud being detected in the image at longer wavelengths. Scattering angles of 10° and 70° are shown on the images with black lines to indicate the approximate angular range in which liquid phase can be reliably identified. All-sky polarimeter $S_1$ images at 530 nm from 1 Apr. 2016 and 31 Jul. 2018 are also shown in FIG.

Figure 44:
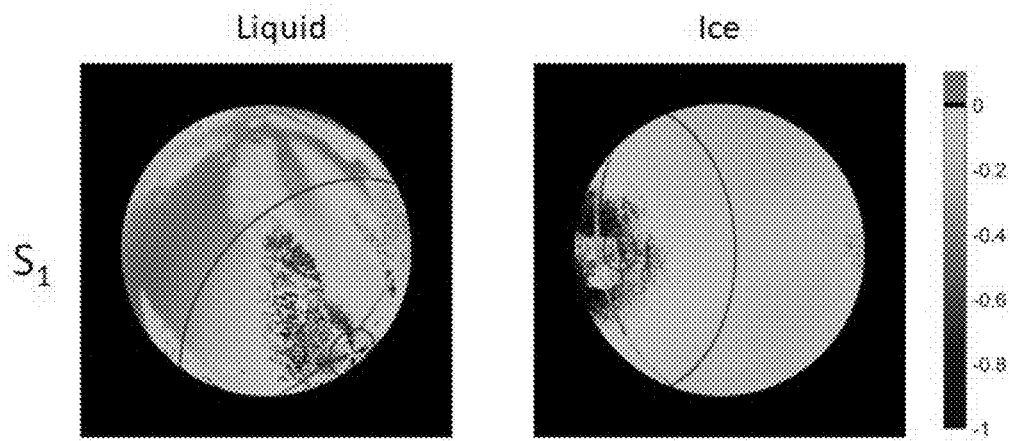
FIG. 44 are all-sky polarimeter $S_1$ images at 530 nm from 1 Apr. 2016 and 31 Jul. 2018 showing liquid and ice clouds for solar zenith angles of 51° and 63°, respectively. Scattering angles of 10° and 70° are shown on the images with black lines.

44 with scattering angles of 10° and 70°. FIGS. 43 and 44 show the significance of measuring cloud phase with respect to scattering angle when detecting liquid phase. Ice phase can be detected in the entire image of an all-sky Stokes $S_1$ image, where liquid phase detection is mainly bound between scattering angles of 10° and 70° and depends on wavelength.

Figure 45:
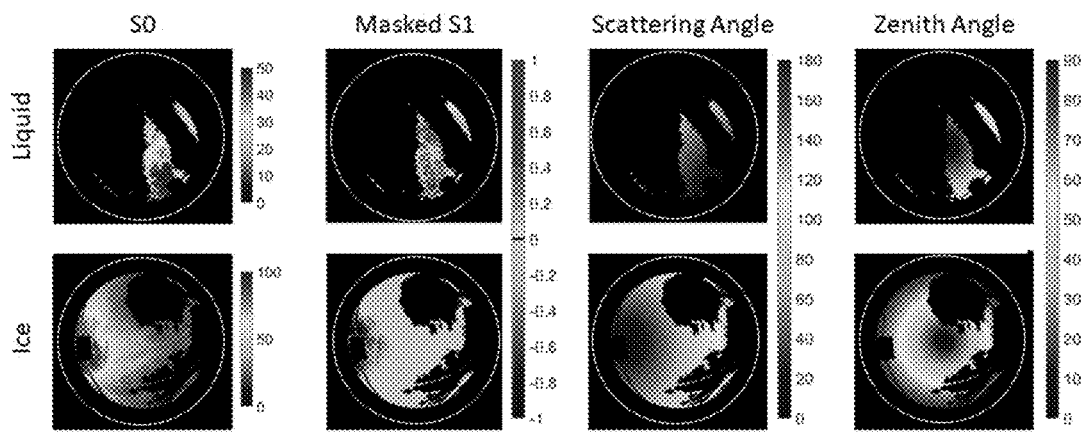
FIG. 45 shows an example of cloud pixel masking using the $S_0$ image to detect the presence of clouds, with corresponding masked cloud pixels in the $S_1$, scattering angle, and zenith angle images.
Figure 46:
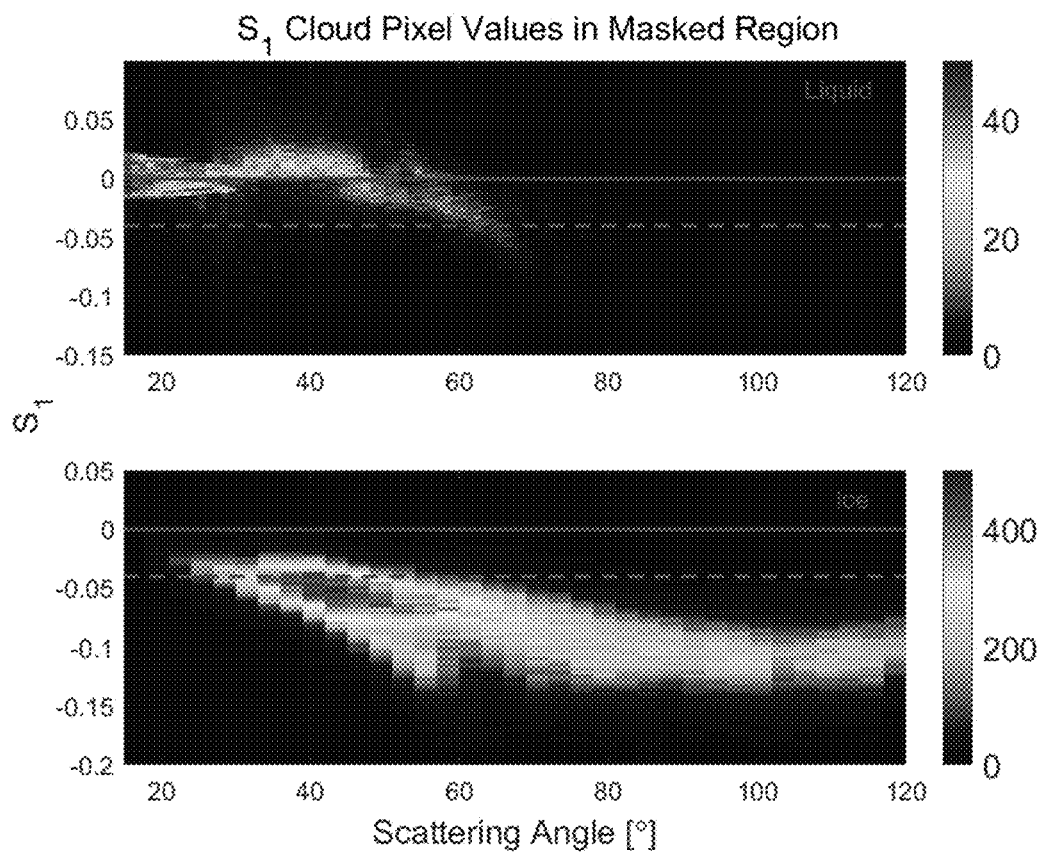
FIG. 46 shows the relationship between the measured cloud $S_1$ values (referenced to the scattering plane) and scattering angle for liquid clouds on 1 Apr. 2016 (top) and ice clouds on 31 Jul. 2018 (bottom) at 530 nm. Ice clouds were generally found to have $S_1$ values less than −0.04 (dashed line), where liquid clouds tended to be both positive and slightly negative. At scattering angles greater than 60°, liquid clouds were found to have $S_1$ values less than −0.04, thus overlapping with the range of $S_1$ values that would otherwise indicate ice clouds. The solar zenith angles were 51° and 63°, respectively.
Figure 47:
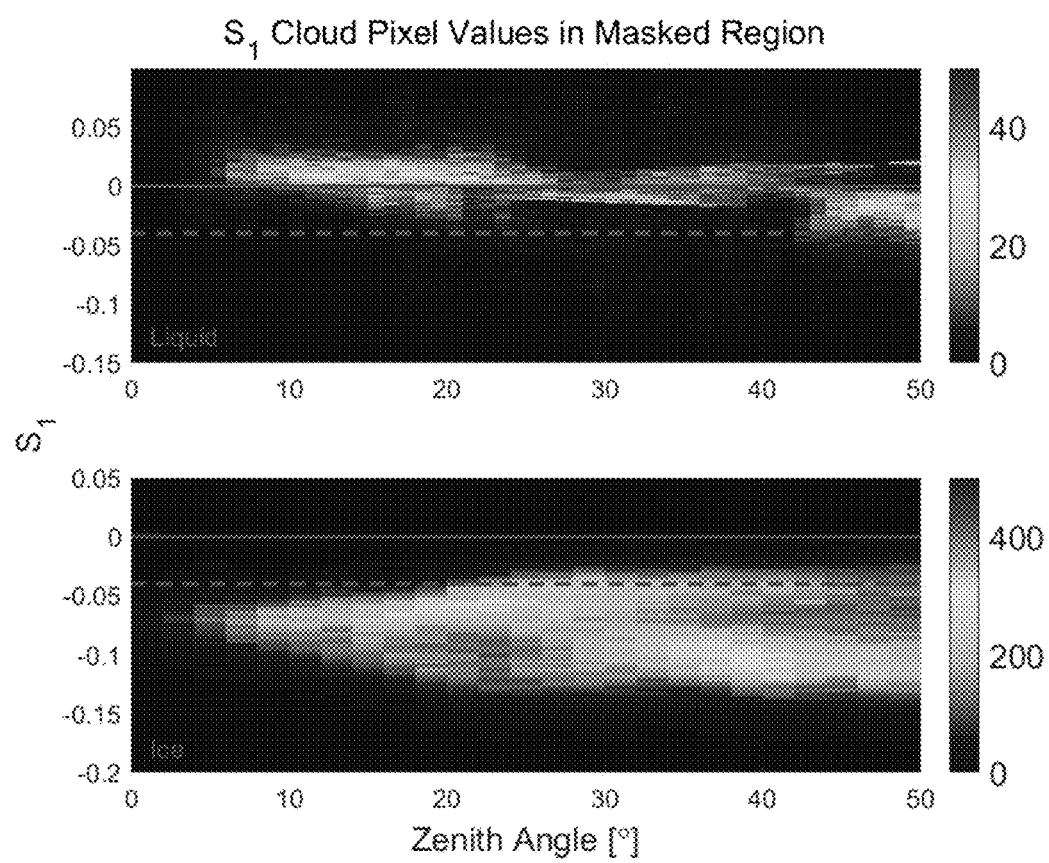
FIG. 47 shows the relationship between the measured cloud $S_1$ values (referenced to the scattering plane) and zenith angle for liquid clouds on 1 Apr. 2016 (top) and ice clouds (bottom) on 31 Jul. 2018 at 530 nm. Ice clouds were generally found to have $S_1$ values less than −0.04 (dashed line), where liquid clouds tended to be both positive and slightly negative. Liquid clouds tended to be more positive for zenith angles less than 25°. Ice clouds were negative for all zenith angles. The solar zenith angles were 51° and 63°, respectively.

A mask of the cloud pixels in FIG. 45 was created by normalizing the $S_0$ image and masking out values greater than the background skylight (if using a RGB camera system, cloud masking could be done using methods presented by M. S. Ghonima, B. Urquhart, C. W. Chow, J. E. Shields, A. Cazorla, and J. Kleissl, "A method for cloud detection and opacity classification based on ground based sky imagery," Atmos. Meas. Tech. Discuss. 5, 4535-4569 (2012), "Ghonima el al." hereinafter). We did not use a red/blue ratio to find clouds with the visible LCVR-based all-sky imager because there is a multi-second delay between image sets at different wavelengths (this system provides rapid calculation of a polarimetric image sequence, but with a larger delay between spectral channels). The masked regions were then applied to the $S_1$ image, scattering angle image, and zenith angle image (FIG. 45) to visualize the measured $S_1$ dependence with scattering angle (FIG. 46) and zenith angle (FIG. 47) in the entire all-sky image. Ice clouds were generally found to have $S_1$ values less than −0.04 (dashed line), where liquid clouds tended to be both positive and slightly negative. At scattering and zenith angles greater than 60° and 25°, respectively, liquid clouds were found to have $S_1$ values less than −0.04.

Discussion

Figure 48:
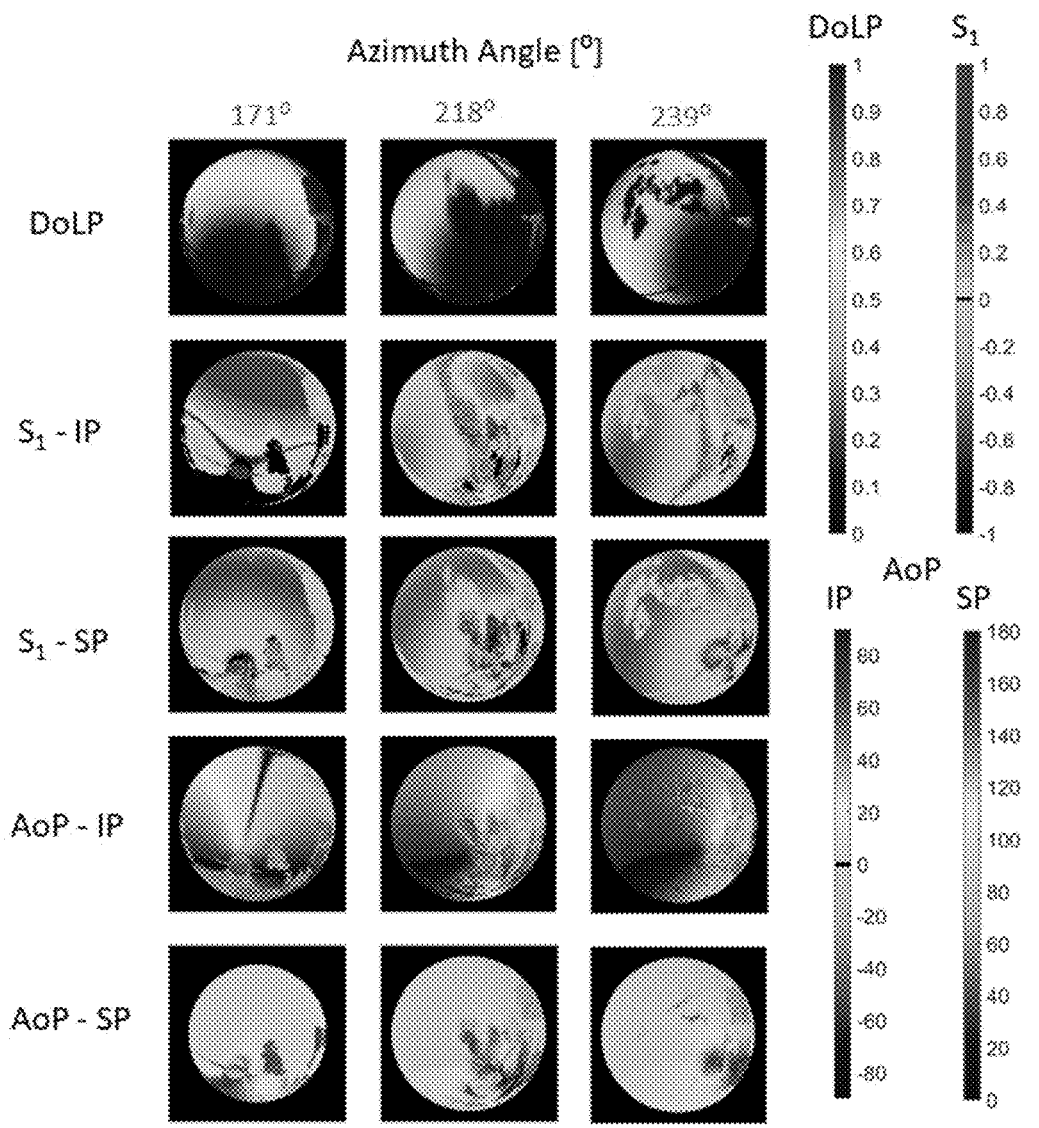
FIG. 48 shows DoLP, $S_1$, and AoP images in the instrument plane (IP) and scattering plane (SP) from 1 Apr. 2016 with solar azimuth angles of 171°, 218°, and 239° and zenith angles of 41°, 47°, and 57°, respectively. This figure demonstrates the importance of aligning the polarimeter's reference frame to the scattering plane. In the polarimeter's reference frame, both phases are detected depending on the scattering geometry whereas in the scattering plane, liquid phase is detected over the scattering angles of 10° and 70° (the lidar's cross-polarization ratio was approximately 0.02 at a cloud height of 3.5 km (AGL), indicating liquid phase).

Careful observation guidelines must be considered when measuring cloud phase in the entire sky dome. First, the sun-cloud-observer geometry significantly affects the measured $S_1$ image. If the polarimeter's reference frame is not aligned to the scattering plane, the determination of cloud phase cannot be made accurately, as illustrated in FIG. 48. With $S_1$ expressed in the polarimeter's reference plane (IP), cloud phase is ambiguous and depends on the scattering geometry. However, expressing $S_1$ relative to the scattering plane (SP) for each pixel allows us to reliably detect liquid phase over the scattering angles of 10° to 70° (for FIG. 48, the lidar's cross-polarization ratio was approximately 0.02 at a cloud height of 3.5 km, indicating liquid-phase clouds). In other words, for a fisheye image it is necessary to rotate the polarimeter's frame of reference into the scattering plane reference, as described above, to determine cloud phase in the entire image, not just the principal plane. For measurements with a point-source polarimeter, the instrument could be deployed on an azimuthal mount so that the polarimeter's reference frame was always aligned with respect to the solar scattering plane (i.e. the reference polarizer would be parallel to the scattering plane). With the instrument aligned in this fashion, the polarimetric reference plane at each point would be the solar scattering plane unique to that position.

Figure 40:
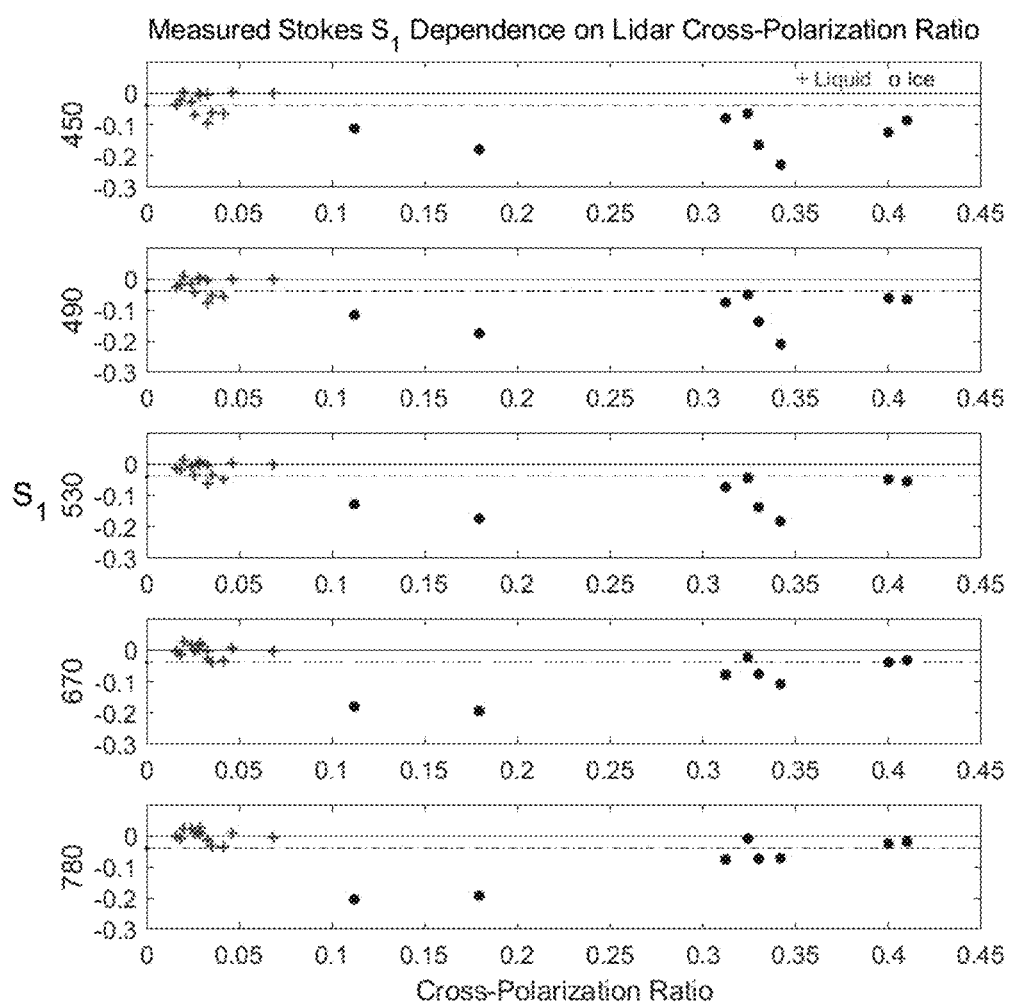
FIG. 40 are plots showing the observed relationship between the Stokes $S_1$ parameter in the scattering plane and the lidar's measured cross-polarization ratio at the zenith for each wavelength. Liquid clouds are represented by the red plus (+) symbols, ice clouds are represented by the blue, filled circles (o).
Figure 49:
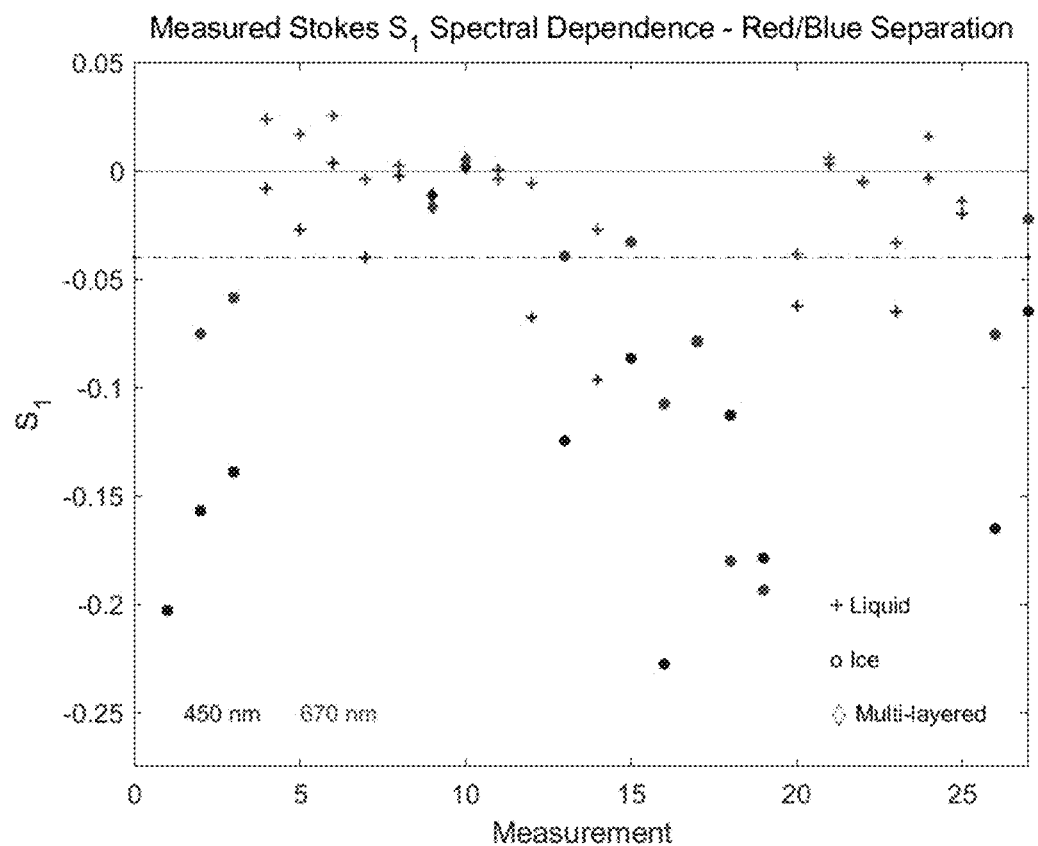
FIG. 49 is a plot showing red/blue wavelength all-sky polarimeter measurements validated with a dual-polarization lidar at the zenith. Liquid clouds are represented by the plus (+) symbols, ice clouds are represented by the unfilled circles (o), and multi-phase clouds are represented by diamonds (+). The 450 and 670 nm measurements are represented by blue and red colors, respectively.

The spectral distribution of $S_1$ values in FIG. 40 suggests that it might be possible to use an RGB polarimeter for fast spectral and polarimetric acquisition, possibly employing a red/blue ratio to identify clouds. Using the threshold of −0.04 for measurements made with the narrow-band LCVR polarimeter, ice phase was correctly identified 80% of the time for the 670 nm and 780 nm channels and 100% of the time for the 450 nm, 690 nm, and 530 nm wavelength channels. Liquid phase was correctly identified 100% of the time for the 670 nm and 780 nm channels and 70%, 77%, and 85% for the 450 nm, 690 nm, and 530 nm channels, respectively. FIG. 49 shows that it may be possible to enhance the cloud phase identification by using two wavelengths, such as red and blue, because ice clouds tend to have larger $S_1$ magnitudes at shorter wavelengths (blue), where liquid clouds tend to have larger $S_1$ magnitudes at longer wavelengths (red). A common threshold of approximately −0.04 could be used or possibly separate thresholds could be found for the red and blue channels to identify cloud phase. However, these initial data suggest this classification may not always work for multi-layered clouds or for measurements at scattering angles greater than approximately 60°.

Three-Camera All-Sky Polarimeter Measurements

To supplement the results observed with the LCVR-based all-sky polarimeter, the visible three-camera all-sky polarimeter was used to detect cloud thermodynamic phase for multiple days ranging from July 2018 to September 2018 in Bozeman, Mont. RGB images were analyzed and with this polarimeter a red/blue ratio was applied to mask cloud pixels in the $S_1$ image. The cloud pixels were calculated by masking a region of clouds near the zenith (in a cone of 5° radius). By using three DSLR cameras with polarization filters aligned to 0°, 60°, and 120°, simultaneous spectral and polarimetric acquisition could be achieved. Two limitations exist with this system. The first is that it currently is not housed in a weather proof case. For each measurement, the system needs to be set up; however, this is not a huge issue since the system is compact, portable, and is controlled with a laptop. The second limitation is that currently there is no sun occulter on the system. A manual occulter was tested, but with three cameras this blocked a large piece of the field of view. Operating without an occulter leads to minor ghost artifacts that sometimes can be observed in the solar principal plane, above and below the sun, in the Stokes $S_1$ and AoP images. These artifacts were not observed in the LCVR-polarimeter images because on that instrument a sun occulter was always used.

Figure 50:
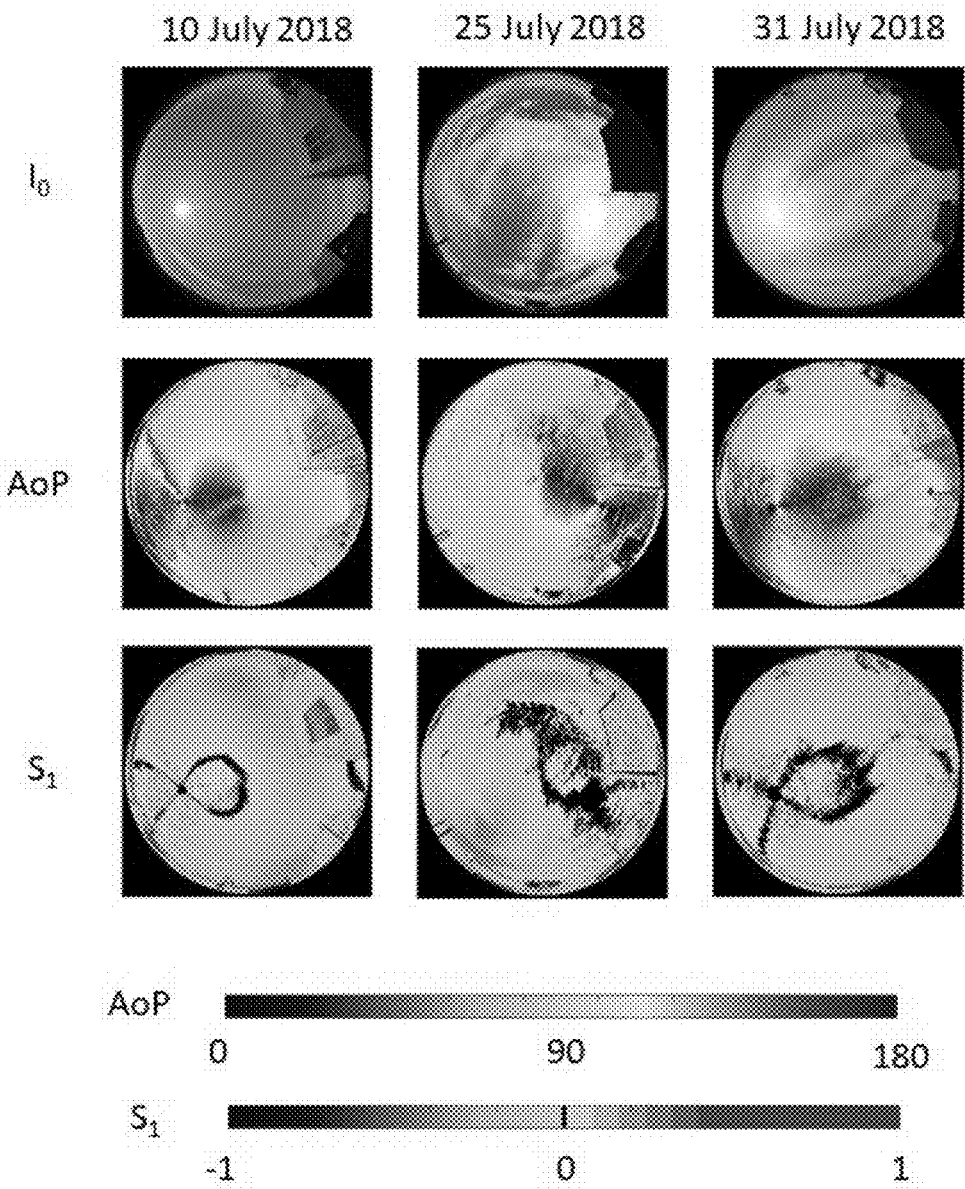
FIG. 50 shows three-camera Nikon all-sky polarimeter $I_0$, AoP, and $S_1$ images referenced to the scattering plane. Ice clouds were observed on 10 Jul. 2018 (Left), 25 Jul. 2018 (Middle), and 31 Jul. 2018 (Right). The solar zenith and azimuth angles were 49°, 43°, 47°, and 99°, 247°, 110°, respectively. Negative values of $S_1$ indicate ice. For the all-sky images, the top of the image represents north and the right side of the image represents west. Measurements were recorded in Bozeman, Mont. Notice in the $I_0$ image at the upper right that a 22° halo adds additional evidence of ice.
Figure 51:
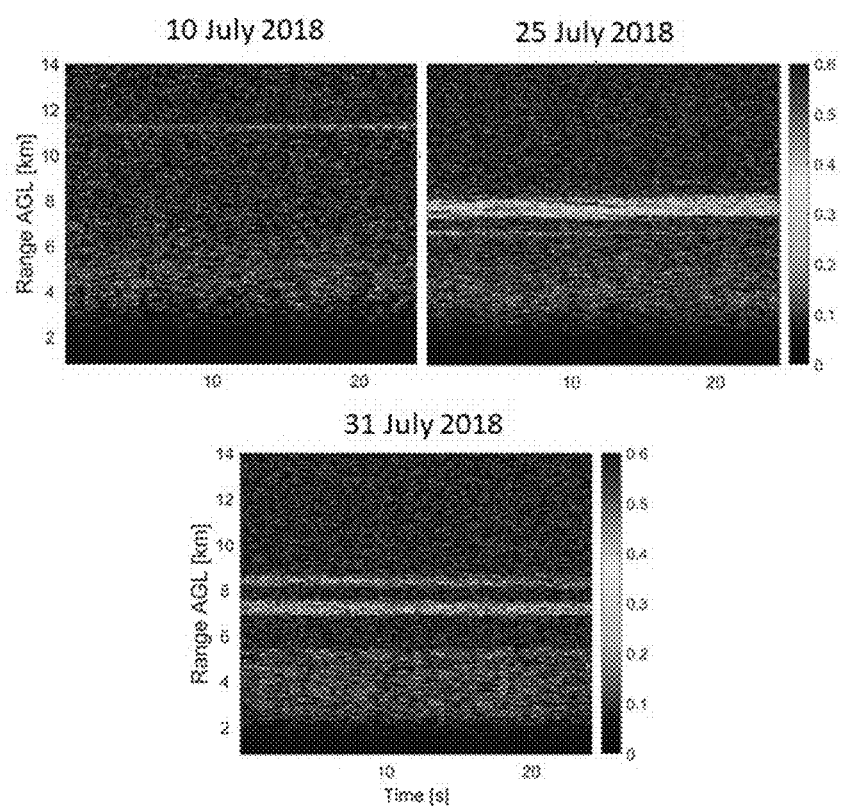
FIG. 51 are dual-polarization lidar cross-polarization ratio measurements from 10 Jul. 2018, 25 Jul. 2018, and 31 Jul. 2018 showing ice phase. Measurements were taken at the zenith with the lidar running simultaneously with the three-camera Nikon all-sky polarimeter. The range on the y-axis represents the height of the clouds in the sky with respect to ground level (AGL). The color bar scaling represents the cross-polarization ratio. A cross-polarization ratio above 0.08 represents ice, while a cross-polarization below 0.08 represents liquid. Ideally, the cross-polarization ratio should be approximately zero for liquid; however, multiple scattering within the cloud layers can cause the cross-polarization to be greater than zero.
Figure 52:
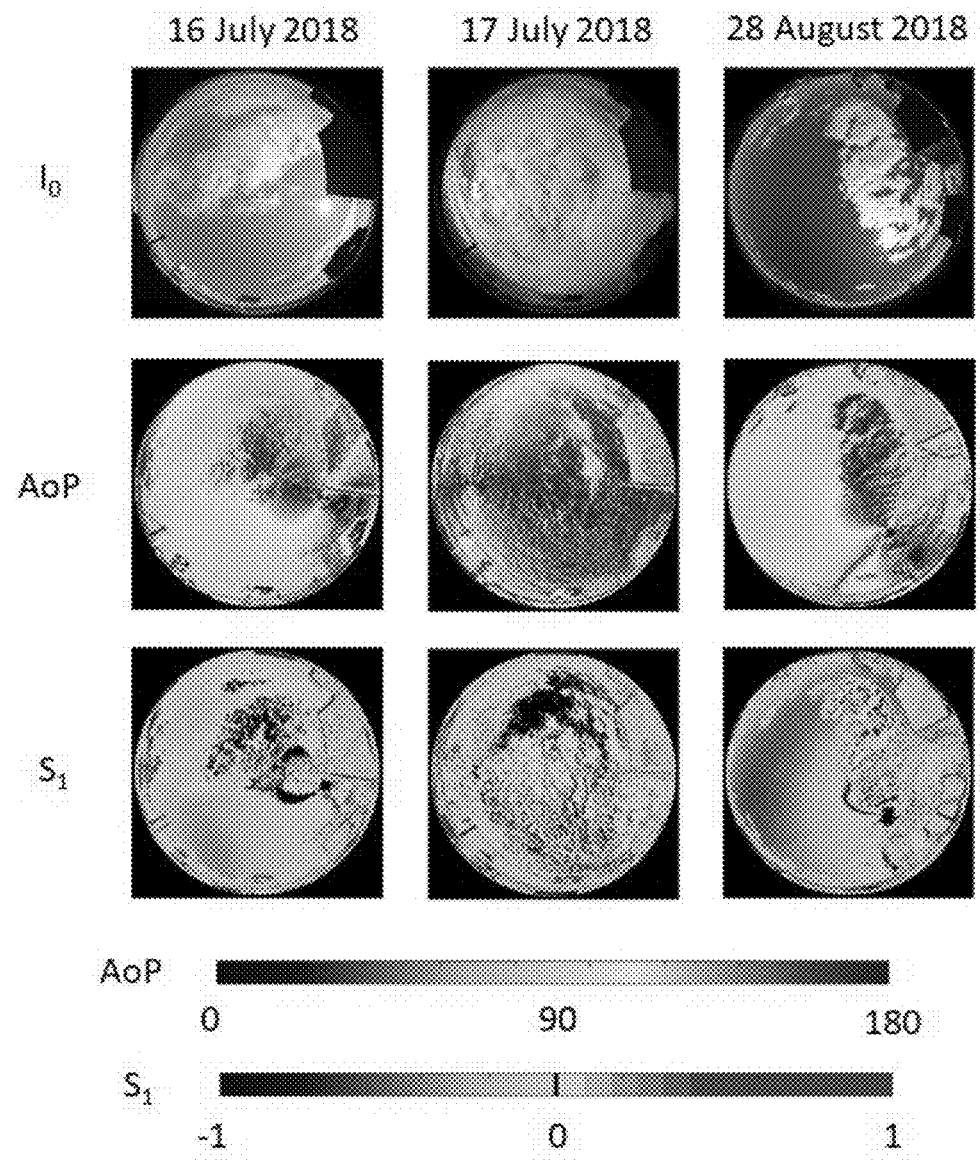
FIG. 52 shows three-camera Nikon all-sky polarimeter $I_0$, AoP, and $S_1$ images referenced to the scattering plane. Liquid clouds were observed on 16 Jul. 2018 (Left), 17 Jul. 2018 (Middle), and 28 Aug. 2018 (Right). The solar zenith and azimuth angles were 50°, 60°, 42°, and 260°, 90°, 217° respectively. Positive values of $S_1$ indicate liquid. For the all-sky images, the top of the image represents north and the right side of the image represents west. Measurements were recorded in Bozeman, Mont.
Figure 53:
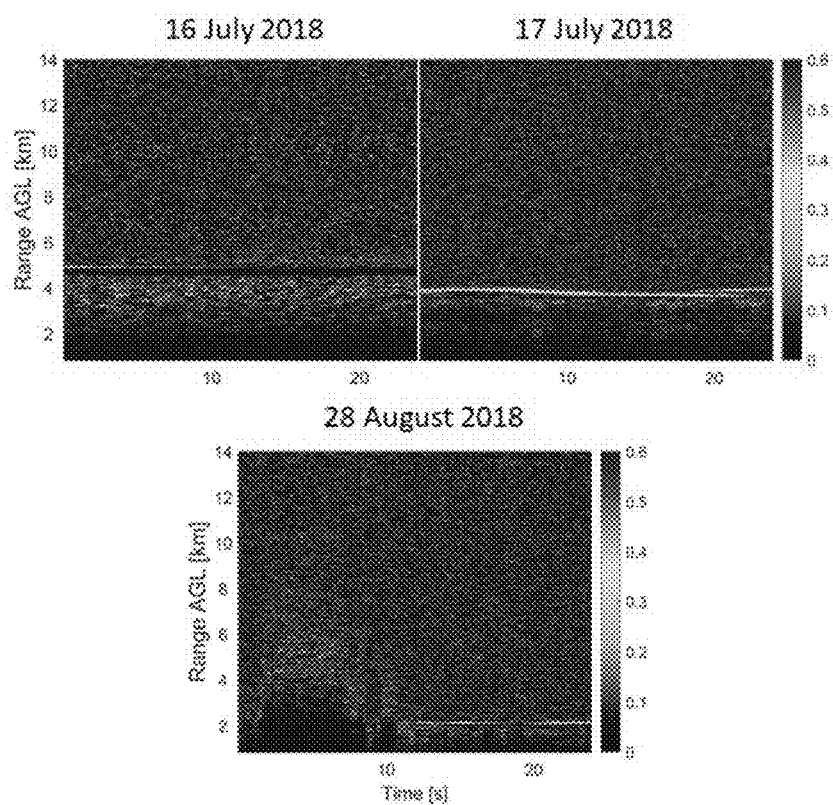
FIG. 53 are dual-polarization lidar cross-polarization ratio measurements from 16 Jul. 2018, 17 Jul. 2018, and 28 Aug. 2018 showing liquid phase. Measurements were taken at the zenith with the lidar running simultaneously with the three-camera Nikonall-sky polarimeter. The range on the y-axis represents the height of the clouds in the sky with respect to ground level (AGL). The color bar scaling represents the cross-polarization ratio. A cross-polarization ratio above 0.08 represents ice, while a cross-polarization below 0.08 represents liquid. Ideally, the cross-polarization ratio should be approximately zero for liquid; however, multiple scattering within the cloud layers can cause the cross-polarization to be greater than zero.
Figure 54:
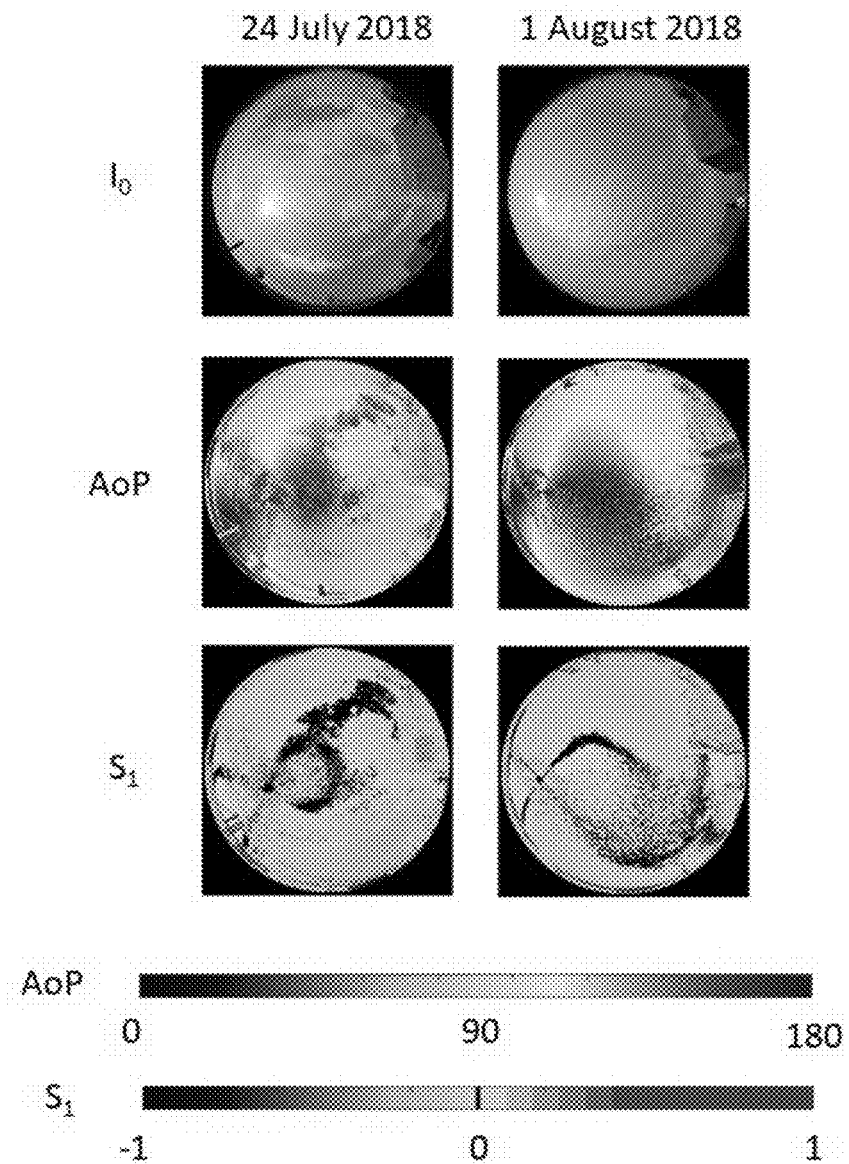
FIG. 54 shows three-camera Nikon all-sky polarimeter $I_0$, AoP, and $S_1$ images referenced to the scattering plane. Multi-layered clouds containing both liquid and ice phase were observed on 24 Jul. 2018 (left) and 1 Aug. 2018 (right). The solar zenith and azimuth angles were 46°, 58°, and 108°, 97°, respectively. Positive values of $S_1$ indicate liquid and negative values indicate ice. For the all-sky images, the top of the image represents north and the right side of the image represents west. Measurements were recorded in Bozeman, Mont.
Figure 55:
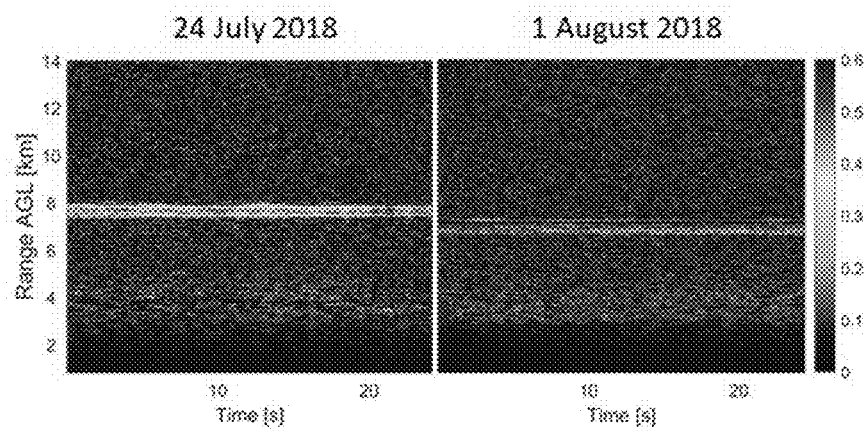
FIG. 55 are dual-polarization lidar cross-polarization ratio measurements from 24 Jul. 2018 and 1 Aug. 2018 showing liquid and ice phase. Measurements were taken at the zenith with the lidar running simultaneously with the visible three-camera all-sky polarimeter. The range on the y-axis represents the height of the clouds in the sky with respect to ground level (AGL). The color bar scaling represents the cross-polarization ratio. A cross-polarization ratio above 0.08 represents ice, while a cross-polarization below 0.08 represents liquid. Ideally, the cross-polarization ratio should be approximately zero for liquid; however, multiple scattering within the cloud layers can cause the cross-polarization to be greater than zero.

Example $I_0$, AoP, and $S_1$ images measured in the blue channel are displayed in FIGS. 50, 52, and 54 for verified ice, liquid, and multi-layered clouds (containing both ice and liquid phase), respectively. Corresponding lidar cross-polarization ratio measurements are given in FIGS. 51, 53, and 55, respectively. These all-sky polarization images are aligned with north at the top and west to the right and the Stokes parameters and AoP images presented in this section are referenced relative to the scattering plane.

Results obtained with the Nikon system were similar to those obtained with the LCVR system. In general, liquid clouds were observed to rotate the AoP by 90° from the polarization orientation found in ice clouds and the clear sky. Ice clouds were observed to not deviate significantly from clear-sky AoP. In the Stokes $S_1$ images, ice clouds produced negative $S_1$ values, while the liquid clouds produced positive values. The background skylight in all cases was observed to be polarized perpendicular to the scattering plane. In FIG. 89, the detection of ice phase was generally independent of scattering angle; however, ghost effects from the sun resulted in positive $S_1$ values above and below the sun in the solar principal plane, limiting the detection of ice clouds in this region. In FIG. 91, the liquid clouds were sometimes dependent on scattering angle, similar to the results observed with the visible LCVR-based all-sky polarimeter; however, in most cases, the liquid phase could be determined in the entire all-sky image. In FIG. 93, both liquid and ice phase could be observed and were not dependent on scattering angle. Ghost effects were observed in all cases and could have been removed by using a sun occulter; however, this would limit the all-sky field of view. With this system, off-zenith measurements beyond a scattering angle of approximately 50° gave the most reliable results.

Zenith Measurements

A summary of 35 different three-camera Nikon all-sky polarimeter measurements (for each wavelength) validated with the dual-polarization lidar at the zenith are shown in FIG. 56 with corresponding data given in Table 7. The listed $S_1$ parameters were calculated by masking a region of clouds near the zenith (radial cone of 5°) and by averaging the masked $S_1$ cloud pixels. A mask of the cloud pixels was created using a red/blue ratio, similar to the method presented in Ghonima et al. In Table 7, the zenith angles correspond to the scattering angles in the solar principal plane (similar to the simulations presented by Knobelspiesse et al.). We measured negative $S_1$ values for ice clouds (verified at the zenith with the lidar) and both negative and positive values for verified liquid clouds. We detected cloud phase for multiple days with solar zenith angles ranging from 27° to 111°. Lidar validation measurements are presented in FIG. 57.

In contrast to the LCVR polarimeter measurements, the Stokes $S_1$ parameters for liquid phase were generally positive, except for four cases where the scattering angles were greater than 79°. For liquid clouds, the measured $S_1$ values were greatest between scattering angles of 40° and 50°, as observed in FIG. 58, which shows the $S_1$ scattering angle dependence with wavelength for measurements made at the zenith. Between scattering angles of 60° and 80°, the Stokes $S_1$ values for liquid phase turn negative. For ice clouds, as the scattering angle increases, the Stokes $S_1$ values become more negative, agreeing with the results found using the LCVR all-sky polarimeter.

In our observations in FIG. 56, clouds were generally more polarizing at longer wavelengths for ice clouds, which is opposite of the general trend observed with the measurements made with the visible LCVR-based all-sky polarimeter. However, this is in agreement with the LCVR-based polarimeter observations made when the 500-nm AOD was greater than ~0.2, which was the case for the wavelength-reversed data in FIG. 56. A large AOD at the Bozeman AERONET site typically signifies smoke in the atmosphere. Liquid clouds were observed to be more polarizing at longer wavelengths when the AOD was less than ~0.2 agreeing with the measurements presented with the visible LCVR-based all-sky polarimeter. In this study, when the AOD was greater than ~0.2, liquid clouds were observed to be less polarizing at longer wavelengths, although this trend was observed to reverse as the scattering angle increased past a scattering angle of 79° (liquid clouds were more polarizing at longer wavelengths when the AOD was greater than ~0.2 and less polarizing at longer wavelengths when the AOD was less than ~0.2). These results generally agree with the observed measurements made with the visible LCVR-based all-sky polarimeter and stress the importance of knowing the aerosol conditions and the scattering angle at which each measurement is made. Maximum error for the Nikon Stokes $S_1$ and $S_2$ parameters was estimated as ±4% with 100% linear input.

TABLE 7

| | Solar Geometry | | | Polarimeter ($S_1$) | | | | |
|---|---|---|---|---|---|---|---|---|
| | Date | Time | Ze | R | G | B | Av | Lidar δ | AERONET AOD |
| | | | | 2018 | | | | | |
| 1 | 0710 | 1552 | 50 | −0.022 | −0.021 | −0.003 | −0.013 | 0.40 | 0.19 |
| 2 | 0712 | 1303 | 79 | −0.177 | −0.250 | −0.269 | −0.240 | 0.03 | 0.06 |
| 3 | 0716 | 2306 | 50 | 0.014 | 0.005 | 0.002 | 0.007 | 0.03 | 0.11 |
| 4 | 0717 | 1456 | 60 | 0.020 | 0.019 | 0.021 | 0.021 | 0.02 | 0.20 |
| 5 | 0717 | 2251 | 48 | 0.049 | 0.041 | 0.036 | 0.042 | 0.04 | 0.13 |
| 6 | 0718 | 2209 | 41 | 0.023 | 0.022 | 0.025 | 0.024 | 0.04 | 0.14 |
| 7 | 0721 | 2125 | 35 | 0.020 | 0.019 | 0.022 | 0.021 | 0.02 | 0.19 |
| 8 | 0724 | 1624 | 46 | −0.003 | −0.009 | −0.007 | −0.006 | 0.35 | 0.26 |
| 9 | 0724 | 1624 | 46 | 0.002 | −0.001 | 0.001 | 0.001 | 0.05 | 0.26 |
| 10 | 0724 | 1641 | 43 | 0.009 | 0.007 | 0.011 | 0.009 | 0.03 | 0.21 |
| 11 | 0724 | 2001 | 27 | 0.024 | 0.025 | 0.028 | 0.027 | 0.06 | 0.21 |
| 12 | 0725 | 1542 | 53 | −0.168 | −0.190 | −0.151 | −0.167 | 0.18 | 0.09 |
| 13 | 0725 | 2218 | 43 | −0.070 | −0.058 | −0.048 | −0.060 | 0.42 | 0.18 |
| 14 | 0727 | 2202 | 41 | 0.011 | 0.006 | −0.003 | 0.004 | 0.04 | 1.58 |
| 15 | 0728 | 0549 | 111 | −0.124 | −0.144 | −0.162 | −0.142 | 0.05 | 0.09 |
| 16 | 0731 | 1534 | 56 | −0.024 | −0.017 | −0.008 | −0.016 | 0.32 | 0.27 |
| 17 | 0731 | 1751 | 34 | −0.058 | −0.033 | −0.024 | −0.037 | 0.31 | 1.17 |
| 18 | 0731 | 1854 | 29 | −0.010 | −0.010 | −0.005 | −0.008 | 0.30 | 0.38 |
| 19 | 0731 | 2050 | 32 | −0.055 | −0.053 | −0.054 | −0.055 | 0.40 | 0.22 |
| 20 | 0801 | 1509 | 60 | 0.008 | 0.008 | 0.004 | 0.007 | 0.03 | 0.36 |
| 21 | 0801 | 1509 | 60 | −0.076 | −0.061 | −0.041 | −0.057 | 0.37 | 0.36 |
| 22 | 0803 | 1714 | 40 | −0.080 | −0.031 | −0.016 | −0.038 | 0.26 | 0.53 |
| 23 | 0812 | 1630 | 49 | 0.038 | 0.045 | 0.049 | 0.046 | 0.04 | 0.65 |
| 24 | 0813 | 0256 | 94 | −0.277 | −0.272 | −0.203 | −0.240 | 0.07 | 0.55 |
| 25 | 0813 | 0308 | 96 | −0.145 | −0.108 | −0.074 | −0.100 | 0.05 | 0.55 |
| 26 | 0816 | 1521 | 61 | −0.091 | −0.070 | −0.057 | −0.071 | 0.22 | 0.24 |
| 27 | 0816 | 2138 | 42 | 0.004 | 0.008 | 0.017 | 0.011 | 0.04 | 0.62 |
| 28 | 0816 | 2138 | 42 | −0.035 | −0.019 | −0.004 | −0.017 | 0.35 | 0.62 |
| 29 | 0824 | 1350 | 78 | −0.144 | −0.090 | −0.070 | −0.097 | 0.32 | 0.49 |
| 30 | 0825 | 1449 | 68 | −0.083 | −0.072 | −0.078 | −0.077 | 0.19 | 0.33 |
| 31 | 0828 | 2101 | 42 | 0.031 | 0.022 | 0.019 | 0.024 | 0.04 | 0.08 |
| 32 | 0830 | 2006 | 38 | 0.025 | 0.023 | 0.023 | 0.024 | 0.02 | 0.20 |
| 33 | 0830 | 2006 | 38 | −0.035 | −0.049 | −0.042 | −0.042 | 0.40 | 0.20 |
| 34 | 0906 | 1458 | 69 | −0.114 | −0.094 | −0.061 | −0.086 | 0.32 | 0.17 |
| 35 | 0906 | 1548 | 60 | −0.105 | −0.067 | −0.045 | −0.068 | 0.34 | 0.18 |

Discussion

Our measurements with both the LCVR and Nikon all-sky polarimeters are in good agreement with the Knobelspiesse et al. predictions when the 500-nm AOD is less than ~0.2. Generally, the measured Stokes $S_1$ values are negative for ice clouds and positive for liquid clouds (the threshold was set to −0.04 for the LCVR all-sky polarimeter). The difference of filter bandwidth between each system could explain the differences observed between each measurement system in regards to the threshold; however, both polarimeters measured similar trends. For example, the measured $S_1$ values for liquid phase were predominately smaller in magnitude than the measured values for ice phase. The simulations presented by Knobelspiesse et al. were shown to work better for clouds with smaller optical depths. Ice clouds generally have lower optical depths and therefore should have larger $S_1$ magnitudes. Using the threshold of −0.04 for measurements made with the narrow-band LCVR polarimeter, ice phase was correctly identified 80% of the time for the 670 nm and 780 nm channels and 100% of the time for the 450 nm, 690 nm, and 530 nm wavelength channels. Liquid phase was correctly identified 100% of the time for the 670 nm and 780 nm channels and 70%, 77%, and 85% for the 450 nm, 690 nm, and 530 nm channels, respectively. Using the threshold of zero for measurements made with the Nikon polarimeter, ice phase was correctly identified 100% of the time for all channels and liquid phase was correctly identified 77% for the red and green channels and 72% for the blue channel.

Measurements observed with both all-sky polarimeters depended on scattering angle. In agreement with the Knobelspiesse et al. simulations, the measured $S_1$ values for liquid clouds tended to become more negative (below the threshold of −0.04 for the LCVR-based all-sky polarimeter) at scattering angles greater than 60° and the measured $S_1$ values for ice clouds increased in magnitude as the scattering angle increased. Liquid phase was observed to generate the largest-magnitude $S_1$ between scattering angles of 40° and 50° for each system. For both phases, a reversal in wavelength dependence was observed as the AOD became greater than ~0.2, which could be a result of the smoke aerosols selectively depolarizing the short-wavelength light. For scattering angles greater than 60°, a wavelength reversal for liquid clouds was also observed (in general agreement with the Knobelspiesse et al. simulations).

The measurements presented in this section demonstrate the significance of knowing the surrounding environmental conditions, as well as the solar scattering geometry. If using point-source polarimeters, the direction at which the instrument is pointed, as well as the orientation of the internal polarizer, are critical in detecting cloud thermodynamic phase. Measurements should be rotated into the scattering plane to ensure correct analysis. In the simulations presented by Knobelspiesse et al, $S_1$ values varied depending on solar geometry and cloud characteristics. To fully compare our results to the simulations presented by Knobelspiesse et al, we would have to use their model and incorporate the environmental conditions and solar and observational geometries from our measured days.

Our main objective was to verify that the ground-based all-sky polarimeter systems reliably determined cloud thermodynamic phase, as validated at the zenith with a dual-polarization lidar. The results of this study strongly suggest this method could be used to determine cloud thermodynamic phase from all-sky polarimetric images, although further validation and study is warranted. This study was limited to days in which the all-sky polarimeter was running at the same time as our dual-polarization lidar. Sixty-two measurements of cloud phase were presented overall in this chapter. An expanded study could make use of a more continuously operated all-sky polarimeter and dual-polarization lidar to more completely explore the potential of this method being applied throughout an annual cycle. Such a study would also benefit from the use of a scanning lidar system to measure the off-zenith cross-polarization ratio. Cloud-base heights along with temperature profiles also can be used to help verify cloud phase. Knobelspiesse et al. showed that a cloud was more polarizing with a smaller cloud optical thickness, full validation of which would require high-quality cloud optical depth retrievals.

Finally, to more completely compare our results to the simulations presented by Knobelspiesse et al, we would have to use their model and incorporate the environmental conditions and solar and observational geometries from our measured days. This work is crucial for many cloud remote sensing applications and can help in simulating and interpreting cloud radiation measurements to better understand the role of clouds in climate, weather, and optical propagation.

Although the foregoing refers to particular embodiments, it will be understood that the disclosure is not so limited. It will occur to those of ordinary skill in the art that various modifications may be made to the disclosed embodiments and that such modifications are intended to be within the scope of the disclosure. Compatibility is presumed among all embodiments that are not alternatives of one another. The word "comprise" or "include" contemplates all embodiments in which the word "consist essentially of" or the word "consists of" replaces the word "comprise" or "include," unless explicitly stated otherwise. Where an embodiment using a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art. All publications, patents and patent applications referred to herein are incorporated by reference in their entirety to the same extent as if each individual publication, patent or patent application was specifically and individually indicated to be incorporated by reference in its entirety.

The invention claimed is:

1. A method for imaging a thermodynamic phase of at least one cloud, comprising:
    obtaining a spatially-resolved polarimetric image of a region of the sky containing the at least one cloud using a multipixel image sensor having multiple channels corresponding to different wavelength bands;
    determining a value of a Stokes $S_1$ polarization parameter of incident light on each pixel corresponding to a portion of the image containing the at least one cloud for multiple channels corresponding to different wavelength bands; and
    determining the thermodynamic phase of the at least one cloud within the image based on the values of the Stokes $S_1$ polarization parameter, wherein the Stokes $S_1$ polarization parameter values determined for a first channel corresponding to a first wavelength band is used to determine a liquid thermodynamic phase, and the Stokes $S_1$ polarization parameter values determined for a second channel corresponding to a second wavelength band is used to determine an ice thermodynamic phase, and the first wavelength band has an average wavelength that is longer than the average wavelength of the second wavelength band;

wherein the step of determining the value of the Stokes $S_1$ polarization parameter comprises:

measuring an Angle of Polarization (AoP) of the incident light in an instrument plane of the multipixel image sensor;

transforming the AoP measured in the instrument plane to a scattering plane at each pixel; and determining the value of the Stokes $S_1$ polarization parameter for each pixel with the AoP referenced to the scattering plane.

2. The method of claim 1, wherein the scattering plane for each pixel is dependent on a current position of the sun in the sky.

3. A method for imaging a thermodynamic phase of at least one cloud, comprising:

obtaining a spatially-resolved polarimetric image of a region of the sky containing the at least one cloud using a multipixel image sensor having multiple channels corresponding to different wavelength bands;

determining a value of a Stokes $S_1$ polarization parameter of incident light on each pixel corresponding to a portion of the image containing the at least one cloud for multiple channels corresponding to different wavelength bands; and determining the thermodynamic phase of the at least one cloud within the image based on the values of the Stokes $S_1$ polarization parameter, wherein the Stokes $S_1$ polarization parameter values determined for a first channel corresponding to a first wavelength band is used to determine a liquid thermodynamic phase, and the Stokes $S_1$ polarization parameter values determined for a second channel corresponding to a second wavelength band is used to determine an ice thermodynamic phase, and the first wavelength band has an average wavelength that is longer than the average wavelength of the second wavelength band;

wherein determining the thermodynamic phase of the at least one cloud within the image based on the values of the Stokes $S_1$ polarization parameter comprises comparing the value of the Stokes $S_1$ polarization parameter to a threshold value, wherein values greater than the threshold value indicate a liquid phase, and values less than the threshold value indicate an ice phase; and wherein the threshold value for different pixels of the multipixel image sensor varies as a function of a scatter angle of the incident light.

4. A system for imaging a thermodynamic phase of at least one cloud, comprising:

a polarimeter comprising a multipixel image sensor having multiple channels corresponding to different wavelength bands that is configured to obtain a spatially-resolved polarimetric image of a region of the sky containing the at least one cloud; and a processor coupled to the multipixel image sensor and configured to determine a value of a Stokes $S_1$ polarization parameter of incident light on each pixel corresponding to a portion of the image containing the at least one cloud for multiple channels corresponding to different wavelength bands and to determine the thermodynamic phase of the at least one cloud within the image based on the values of the Stokes $S_1$ polarization parameter, wherein the Stokes $S_1$ polarization parameter values determined for a first channel corresponding to a first wavelength band is used to determine a liquid thermodynamic phase, and the Stokes $S_1$ polarization parameter values determined for a second channel corresponding to a second wavelength band is used to determine an ice thermodynamic phase, and the first wavelength band has an average wavelength that is longer than the average wavelength of the second wavelength band;

wherein the system determines the values of the Stokes $S_1$ parameters by:

measuring an Angle of Polarization (AoP) of the incident light in an instrument plane of the multipixel image sensor;

transforming the AoP measured in the instrument plane to a scattering plane at each pixel; and determining the value of the Stokes $S_1$ parameter for each pixel with the AoP referenced to the scattering plane.

* * * * *